US011046257B1

(12) United States Patent
Fattouche

(10) Patent No.: US 11,046,257 B1
(45) Date of Patent: Jun. 29, 2021

(54) SNAP-ON AUTOMOTIVE GRILLE OVERLAY WITH COMPLETE SURROUND AND METHOD FOR MANUFACTURING THE SAME

(71) Applicant: Naje Fattouche, Bowie, MD (US)

(72) Inventor: Naje Fattouche, Bowie, MD (US)

(73) Assignee: Neo Design, LLC, Bowie, MD (US)

( * ) Notice: Subject to any disclaimer, the term of this patent is extended or adjusted under 35 U.S.C. 154(b) by 0 days.

(21) Appl. No.: 17/132,909

(22) Filed: Dec. 23, 2020

Related U.S. Application Data

(63) Continuation-in-part of application No. 16/873,784, filed on Jul. 2, 2020.

(51) Int. Cl.
*B60R 13/00* (2006.01)

(52) U.S. Cl.
CPC .................. *B60R 13/005* (2013.01)

(58) Field of Classification Search
CPC .. B60R 13/005; B60R 19/52; B60R 2019/525
USPC ............. 296/193.1; 293/115; 180/68.1, 68.6; D12/163, 166, 171, 216
See application file for complete search history.

(56) References Cited

U.S. PATENT DOCUMENTS

| | | | |
|---|---|---|---|
| 3,811,989 A * | 5/1974 | Hearn | B32B 15/085 428/122 |
| 4,087,141 A * | 5/1978 | Roberts | A47B 95/02 16/412 |
| 5,487,575 A | 1/1996 | Chase | |
| 6,027,150 A | 2/2000 | Flewitt et al. | |
| 6,167,645 B1 * | 1/2001 | Gasko | B60R 13/105 293/115 |
| 6,322,115 B1 * | 11/2001 | Devilliers | B60R 19/18 293/120 |
| 6,422,643 B1 * | 7/2002 | Pease | B60R 19/52 24/297 |
| 6,702,343 B1 | 3/2004 | Stull | |
| 7,073,849 B1 | 7/2006 | Nunes | |

(Continued)

OTHER PUBLICATIONS

Catalog page from Trenz Grilles, Stylinconcepts Sports Truck Accessories (Year: 2004).*

*Primary Examiner* — Hilary L Gutman
(74) *Attorney, Agent, or Firm* — Chauncey B Johnson, Esq.; Law Offices of Chauncey B. Johnson

(57) ABSTRACT

An improved snap-on grille overlay with complete surround and method for manufacturing the same, comprising interior regions containing the snap-on technology used for snapping over corresponding exterior regions of a manufacturer's existing grille, wherein upon engagement of a rigid polymer upper lip and a rigid polymer lower lip and a rigid polymer connecting lip of the present invention's improved automotive grille overlay with the corresponding portions of a manufacturers grille, the present invention's improved automotive grille overlay is firmly affixed to said manufacturer's grille without the use of double-sided tape or clips as taught by the prior art. In addition, a three dimensional (3D) scanned imaging of the individual embodiment component parts is generated, after rigorous testing, and is transferred to an injection molding computer to generate the injection molding designed precisely corresponding to each individual component parts of the present invention.

17 Claims, 42 Drawing Sheets

(56) References Cited

U.S. PATENT DOCUMENTS

| | | | | |
|---|---|---|---|---|
| 7,309,090 | B2 * | 12/2007 | Troton | B60R 19/52 296/1.08 |
| 7,597,371 | B2 * | 10/2009 | Gidcumb, Jr. | B60R 13/0206 296/1.08 |
| 8,118,337 | B2 * | 2/2012 | Nakayama | F16B 5/0635 293/115 |
| 9,194,156 | B2 * | 11/2015 | Simon | E05B 1/0069 |
| 10,059,293 | B2 * | 8/2018 | Sharif | B60R 19/52 |
| 10,518,721 | B1 * | 12/2019 | Nowakowski | G09F 21/048 |
| D885,998 | S * | 6/2020 | Platto | D12/163 |
| D887,318 | S * | 6/2020 | Platto | D12/163 |
| D887,927 | S * | 6/2020 | Platto | D12/183 |
| D888,620 | S * | 6/2020 | Dewitt | D12/163 |
| D902,092 | S * | 11/2020 | Park | D12/163 |
| D907,538 | S * | 1/2021 | Gittin, Jr. | D12/163 |
| D907,539 | S * | 1/2021 | Kirsch | D12/163 |
| 2009/0066096 | A1 | 3/2009 | Doroghazi et al. | |
| 2010/0287843 | A1 * | 11/2010 | Oh | E05B 1/0015 49/460 |
| 2013/0125345 | A1 * | 5/2013 | Specht | F24C 15/024 16/413 |
| 2017/0021786 | A1 | 1/2017 | Lee | |
| 2020/0010027 | A1 * | 1/2020 | Fattouche | E05B 85/10 |

* cited by examiner

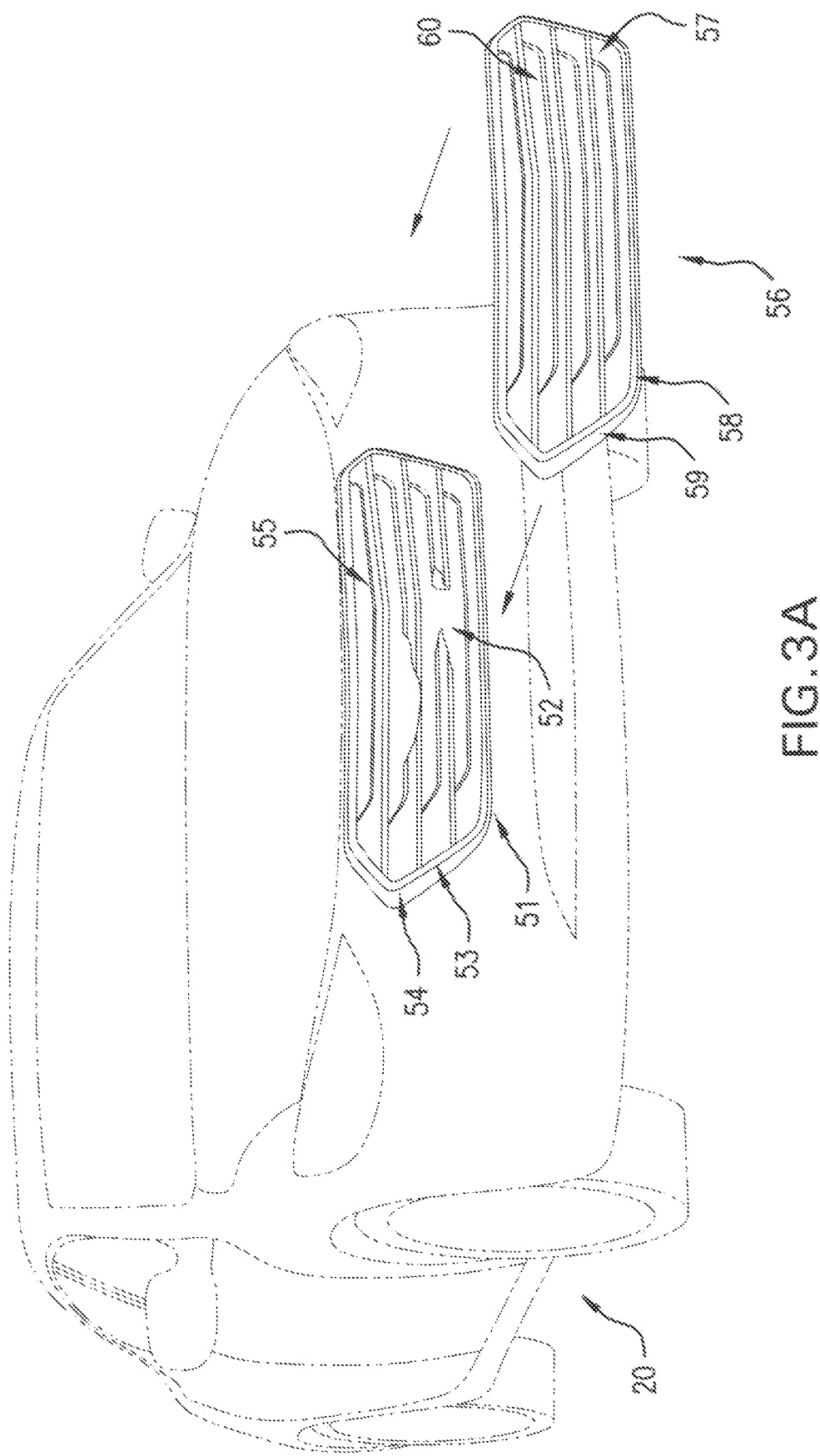

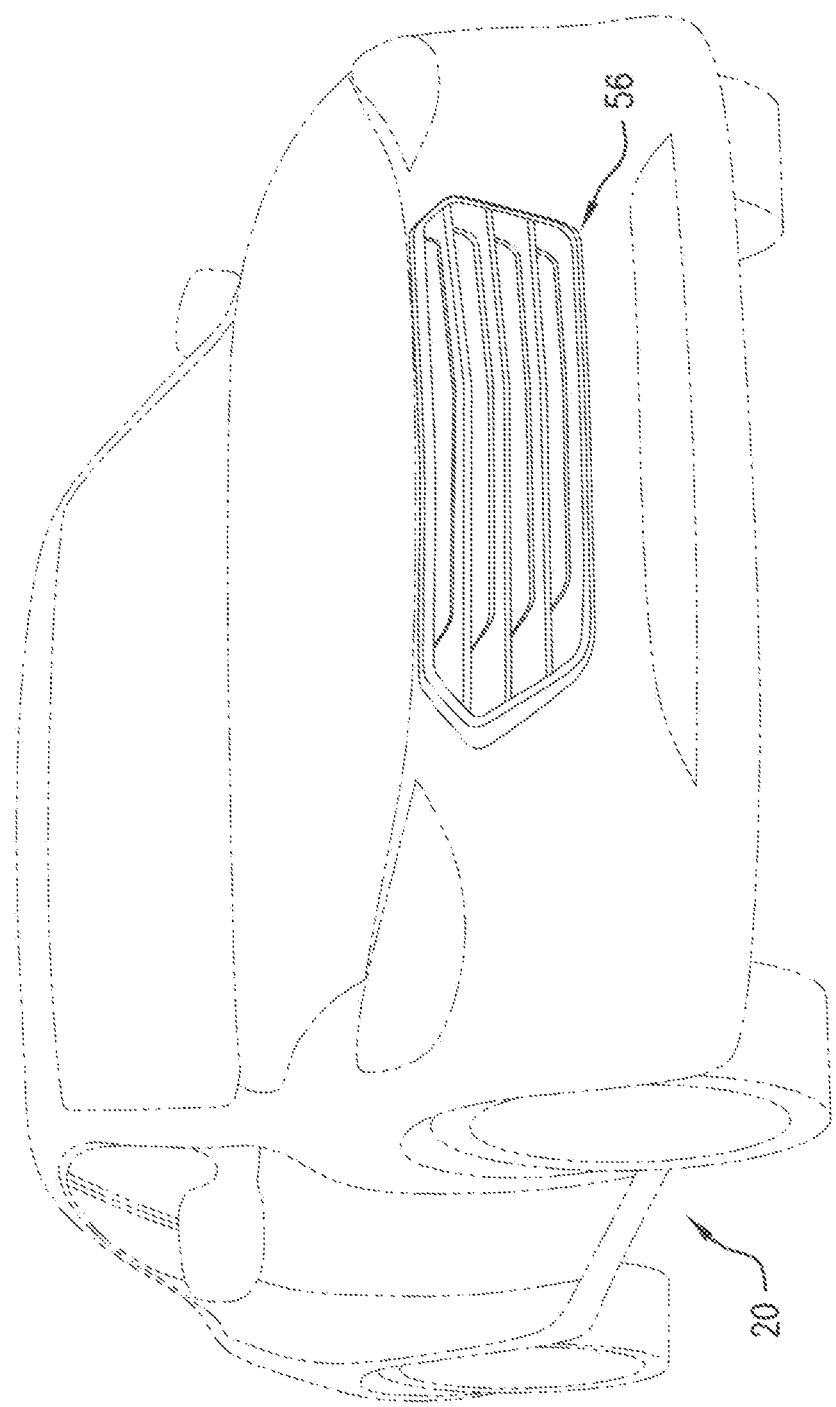

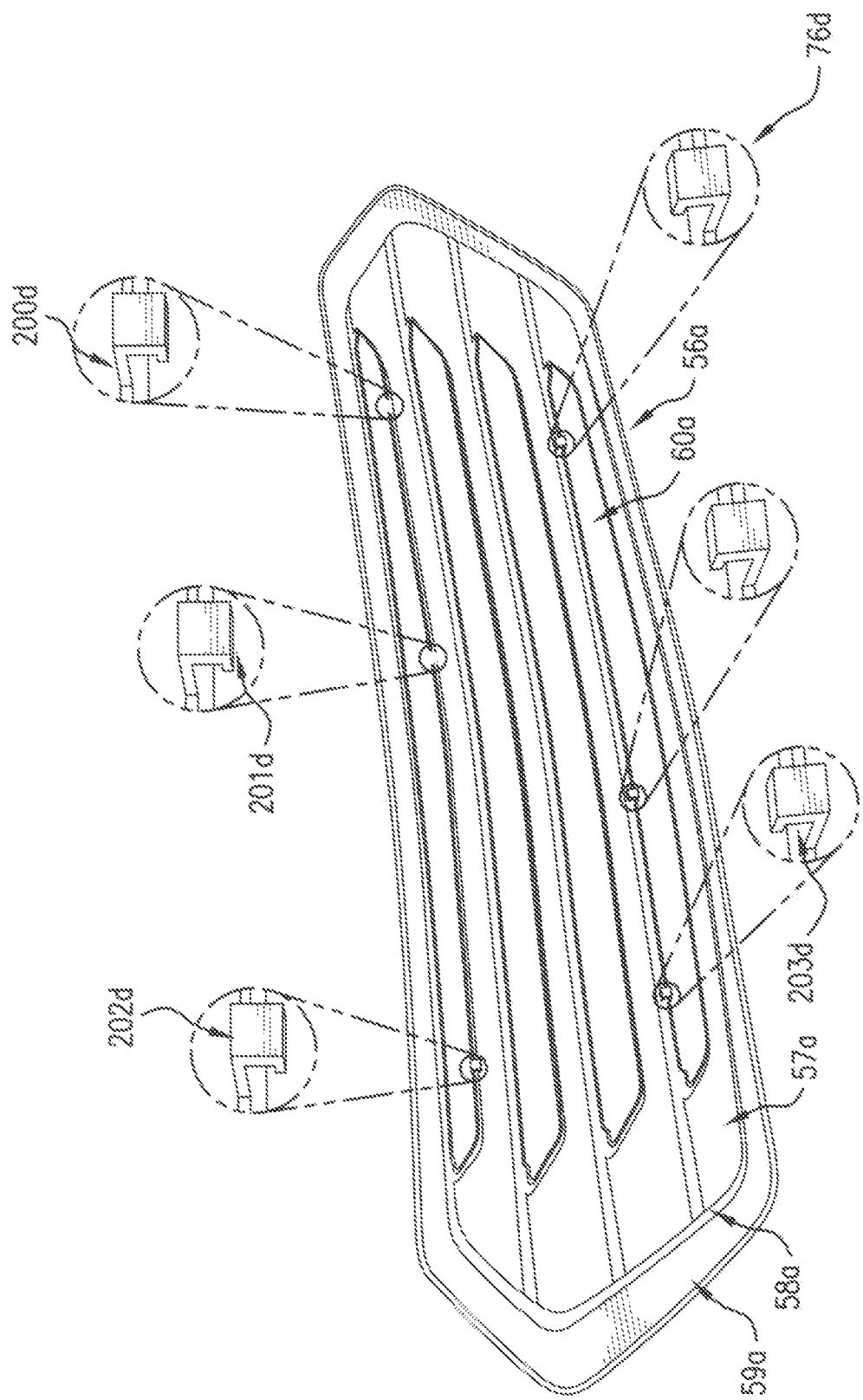

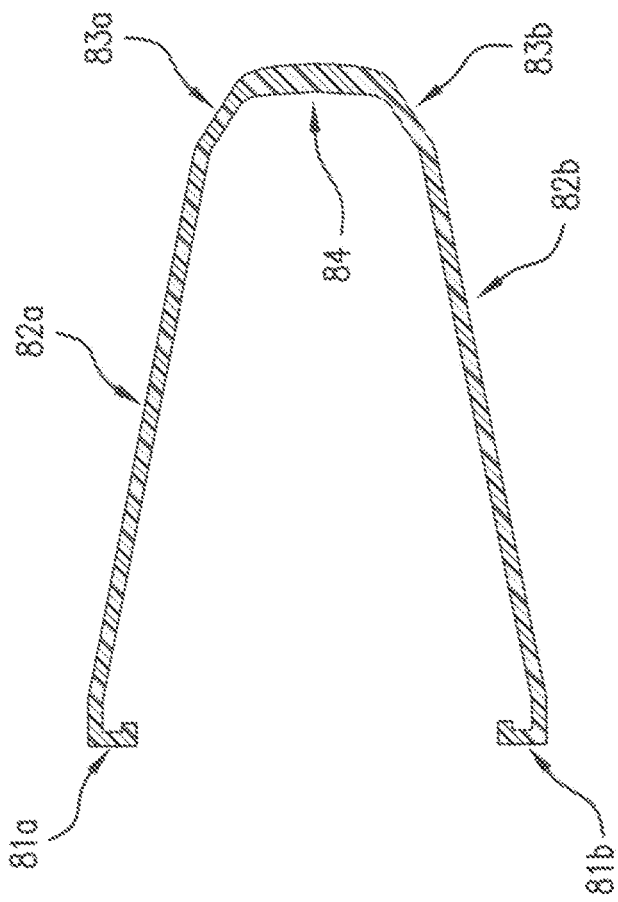
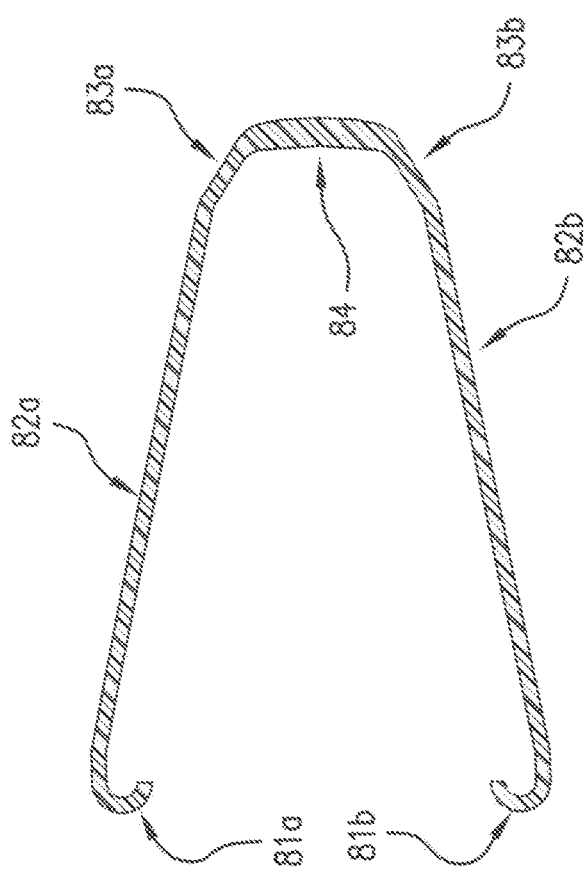

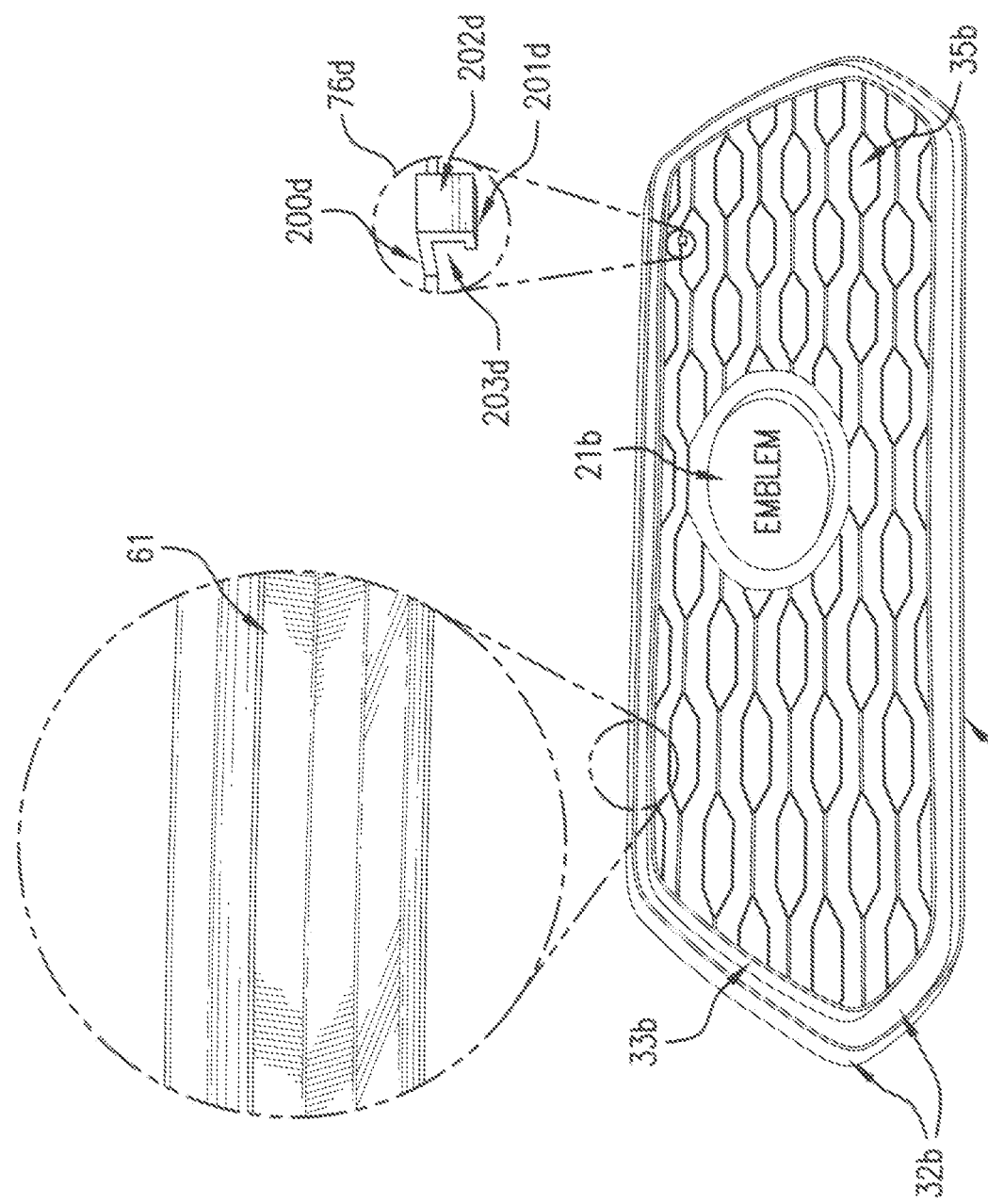

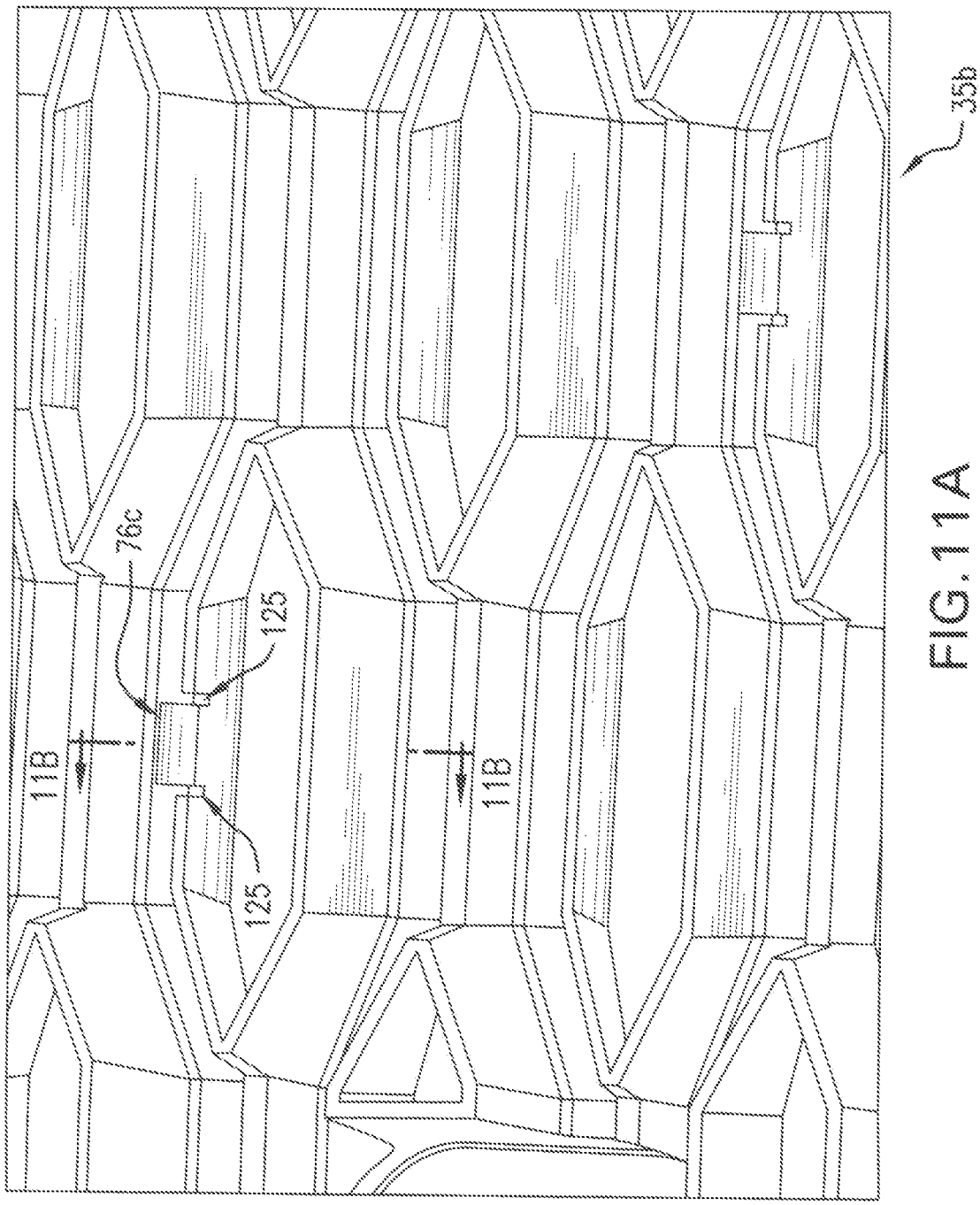

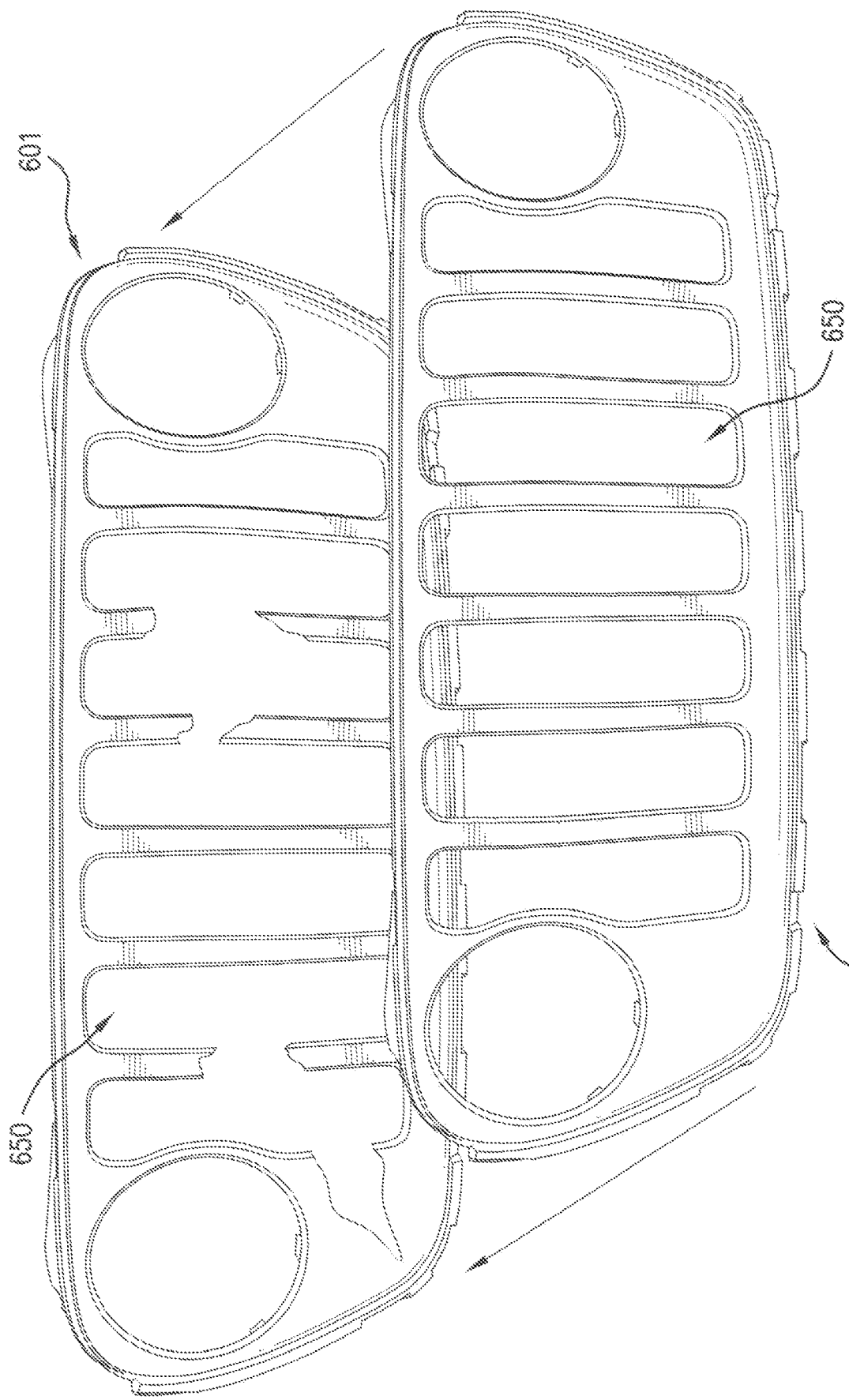

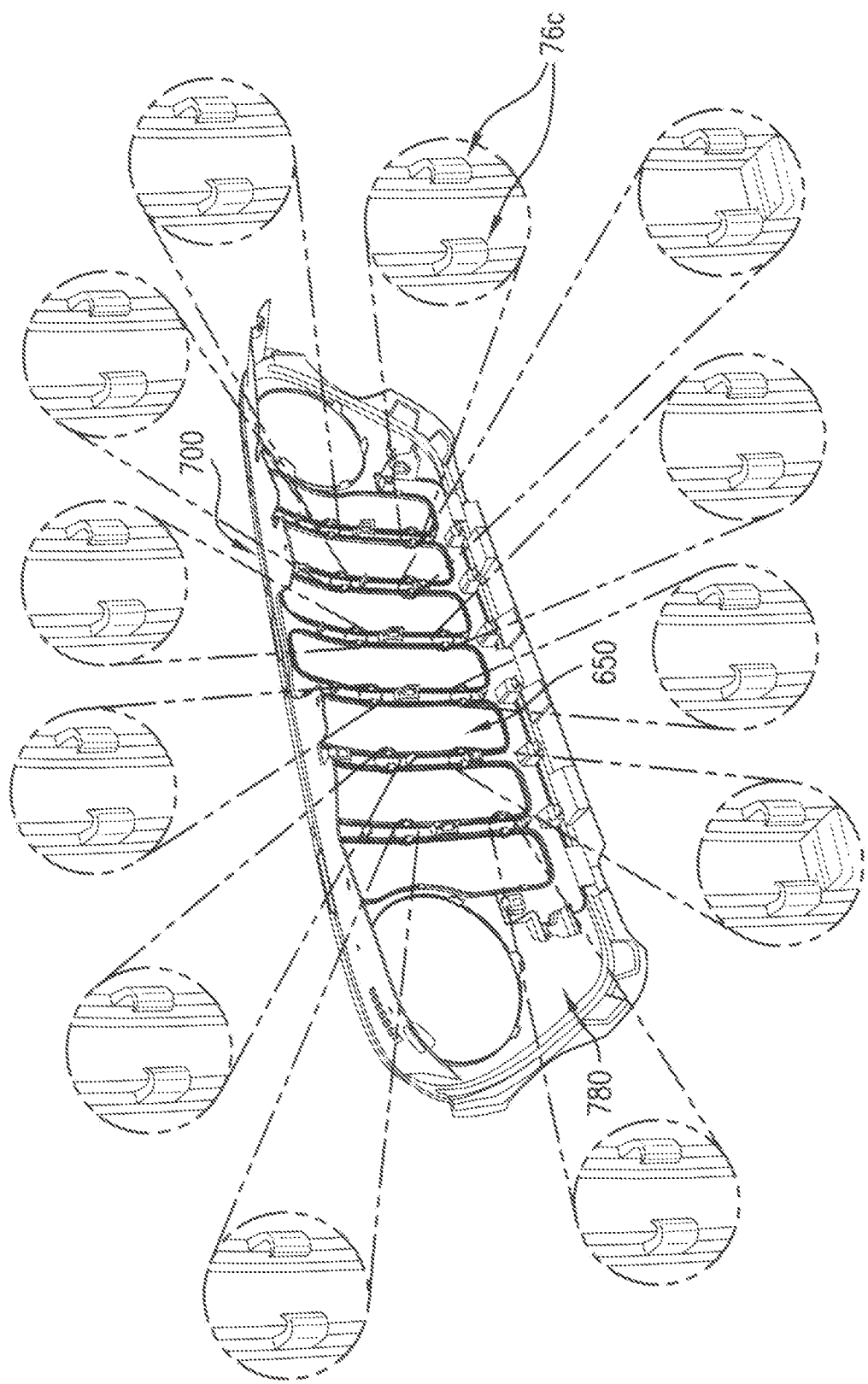

SNAP-ON AUTOMOTIVE GRILLE OVERLAY WITH COMPLETE SURROUND AND METHOD FOR MANUFACTURING THE SAME

This continuation in part application benefits and claims priority from a previously filed application U.S. patent application Ser. No. 16/873,784.

TECHNICAL FIELD

The presently disclosed subject matter generally pertains to an improved automotive grille overlay, and more specifically to an improved automotive grille overlay with a complete or 360 degrees surround capable of snapping over an identical, previously installed automotive grille of an automobile. The purpose of the formerly described automobile grille overlay with surround is to cover up completely, with no surface exposed, the latterly described manufacturer's automobile grille which was damaged, for example, during an automobile collision, or in the absence of an automobile collision but in the presence of other non-collision damage, is to provide a snap-on automobile grille overlay with a complete or 360 degrees surround of the present invention with an enhanced cosmetic finish and an attractive appearance.

BACKGROUND

In general, after-market components are used to enhance automobile cosmetic appearances which can be added to an automobile to add decoration and customization to a vehicle beyond what is supplied by the vehicle manufacturer. One component is an automobile grille overlay without a surround or an overlay with an incomplete or partial surround which fits over the manufacturer's installed automobile grille and provides a customized look. An after-market automobile grille overlay without a surround or an overlay with an incomplete or partial surround is typically custom manufactured to precisely fit over a specific one or more grille of a specific vehicle or vehicles. Said present after-market automobile grille overlay without a surround or an overlay with an incomplete or partial surround lacks the ability to cover the entire outer periphery of the pre-installed damaged manufacturer's grille. Commonly, after-market automobile grille overlays without surrounds or with incomplete or partial surrounds are often not finished, and often do not provide a new look to the automobile installed thereon. But more importantly, said after-market automobile grille overlays do not cover the complete pre-installed damaged manufacturer's grille when installed thereon.

After-market automobile grille overlays without surround or with incomplete or partial surrounds are comprised of different shapes and designs and are used to fit over automobile factory grilles primarily as inserts or partial overlays when said grilles are damaged, for example, in an automobile collision or when said grilles demonstrate severe wear and tear and are unattractive due to being exposed to the environmental elements for a significant amount of time. When installed, the grille overlays without surrounds or with incomplete or partial surrounds cover the damaged grilles inserts and partial periphery and sometimes but not often provide the automobiles with new cosmetic and new decorative finishes which enhance said automobiles' appearances and increase their resale value.

Other than the use as an insert or partial periphery covers, most after-market automobile grilles which are known in the prior art are typically designed to replace the damaged manufacturer's grilles all together. Replacing the manufacturer's grille altogether requires expending significant resources on labor needed to first remove the manufacturer's grille and second to replace the manufacturer's grille with the replacement after-market grille. Similarly, replacing manufacturer's grille insert only without surround or with incomplete or partial surround requires expending significant resources on labor needed to continuously refit and reinforce said installed insert overlay without surround or with incomplete or partial surround overtime, due to frequent separation of said installed insert or partial surround from the damaged manufacturer's grille. Expending of significant resources are compounded, as said replacement grille insert overlay without surround or with incomplete or partial surround is painted so as to blend the newly installed grille overlay insert without surround or incomplete or partial surround with the appearance of the rest of the vehicle.

Prior to 2006, the prior art taught automobile grilles without surround and method of manufacturing said grilles were used to outright replace manufacturers' grille when damaged, for example, during a automobile collision, or when damaged, for example, during long exposure to the environmental elements. Nunes in U.S. Pat. No. 7,073,849 describes these pre-2006 prior art automobile grilles used as outright replacement for damaged grilles whether said damage was caused by an automobile collision or by environmental degradation, and the manner in which they were manufactured or constructed.

First, Nunes in U.S. Pat. No. 7,073,849 describes Chase in U.S. Pat. No. 5,487,575 as leaching an automobile grille capable of withstanding a frontal collision impact which is chromium plated so as to promote flexural property of the automobile grille. Second, Nunes, in U.S. Pat. No. 7,073,849 describes Flewitt et al. in U.S. Pat. No. 6,027,150 as teaching an automobile radiator grille assembly comprising an upper edge that edges the hood of a vehicle and a lower edge that engages the bumper of a vehicle. According to Nunes. Flewitt et al. further teaches that resilient arms are used to secure the upper portion of the replaced automobile grille to the vehicle, and resilient means are used to bias the upper edge of the grille to the hood. Third, Nunes in U.S. Pat. No. 7,073,849 describes Stull in U.S. Pat. No. 6,702,343 as teaching a grille manufactured from aluminum and later power coated. Stull describes attaching to the leading edge of the grille multiple steel strips for reducing moisture within the coating and improving foe decorative appearance of the grille.

Post 2006, Nunes in U.S. Pat. No. 7,073,849, for its part teaches a snap-on chrome plated automotive grille overlay. Specifically, Nunes teaches a snap-on technology needing vertical and horizontal bars or slats configured to duplicate an existing automotive grille's insert when nested thereupon. According to Nunes, the overlay grille's insert is having protruding clips integrally formed on said grille overlay. Nunes further teaches said clips having a bevel on an interior surface allowing for deflection over the automotive grille, thereby permitting the grille overlay to be snapped into place.

Post Nunes, Doroghazi et al. in U.S. Patent Application Publication 2009/0066096 A1 teaches a vehicle grille including structural inner member and decorative outer member with snap-in features. It is important to note that Doroghazi et al. does not teach an overlay snap automotive grille. Doroghazi et al. teaches a grille comprising an outer member and an inner member. Said outer member including a plurality of molded-in snap features to engage with the inner member at a plurality of corresponding snap-receiving points or locations. The snap-in technology described by Doroghazi et al. is a lower tensioning foot comprising a part that hooks around another specified part and includes a retaining portion that is generally perpendicular to the ground, which rocks into position and helps hold the grille in place.

Rosen et al. in U.S. Pat. No. 7,537,253 teaches a method for attaching a polished metal grille surround. Rosen et al. teaches a shell formed from metal sheet and a backing structure wherein the backing structure is fixedly secured to the shell and the backing structure is fixedly secured to the vehicle. That the shell and the backing structure are held together by an adhesive and by inserting a threaded insert into a corresponding aperture. Another prior art Lee in U.S. Patent Application Publication 2017/0021786 teaches a multi-piece vehicle shield assembled by studs and apertures having snap-together feature.

Other than Nunes or U.S. Pat. No. 7,073,849, no other prior art teaches a snap-on grille overlay with an incomplete or partial surround. However, Nunes differs from the present invention in several ways. First, due to the limitations of Nunes' snap-on technology, Nunes' automotive grille overlay with an incomplete or partial surround is capable of only fitting a manufacturer's automotive grille partially, which comprises one or more horizontal slats and one or more vertical bars that are formed within a thin-walled overlay body, in contrast, the present invention's snap-on technology allows for installing an automotive grille overlay capable of fitting completely over a manufacturer's automotive grille of all shapes and styles in the present day market place.

Second, Nunes' snap-on technology teaches a plurality of inward-protruding clips integrally formed within the slats and bars for connecting the grille to the vehicle. In addition, to further support the plurality of inward-protruding clips and to prevent vibration from separating the overlay from the vehicle grille and to minimize noise levels, a cushioning material may be attached to an inside surface of the thin-walled grille overlay body. In contrast, the present invention teaches manufacturing and installing a snap-on technology within an interior region of a horizontal slat of an automotive grille overlay, teaches manufacturing and installing a snap on technology of the present invention within an interior region of a vertical bar of an automotive grille overlay, teaches manufacturing and installing a snap on technology of the present invention within an interior region of a parabolic bar of an automotive grille overlay, and teaches manufacturing and installing a snap-on technology of the present invention within an interior region of a polygon-based, interlocking mesh system of an automotive grille overlay.

The present invention does not require the use of protruding dips or cushioning material or the use of adhesive tapes to prevent vibration from separating the grille overlay from a vehicle's original grille or to minimize noise levels when a vehicle is in motion. Thus, the prior art automotive grille overlays require the application of secondary components for affixing to the original manufacturers automotive grilles (i.e. tape, glue, clips, etc.). This makes installation somewhat tedious, inconvenient, expansive and perhaps even messy. Furthermore, these prior art automotive grille overlays, in addition to providing incomplete coverage, are prone to loosen over time with repeated use of the automobile, and requiring numerous, labor intensive and costly repairs over the life span of the automobile.

GENERAL DESCRIPTION

A primary objective of the present invention is to provide an improved automotive grille overlay with complete 360 degrees surround that has the identical configuration of a damaged manufacturer's automotive grille capable of being securely snapped on into place over the latter, and providing the appearance of a new or enhance manufacturer's automotive grille without the need of removing the damaged automotive grille.

Another objective of the present invention is to provide an improved automotive grille overlay with complete surround capable of being snapped on to an existing manufacturer's automotive grille, without requiring the use of double-sided tape or other bonding materials, or clips, to hold the automotive grille overlay in place.

Another objective of the present invention is to provide an improved automotive grille overlay with complete surround constructed of rigid material capable of being flexed and optionally constructed of a single piece of polymer material capable of affixing over an existing manufacturer's automotive grille without any additional components.

Still another objective of the present invention is to provide an improved automotive grille overlay with complete surround capable of being snapped over a manufacturer's grille to cover up damage or wear and tear of the latter without being noticeable to consumers that said improved automotive grille overlay had been installed.

Yet another objective of the present invention is to provide an improved automotive grille overlay with complete surround capable of being snapped over a manufacturers grille to cover up damage or wear and tear of the latter without requiring numerous, labor intensive and costly repairs over the life span of the automobile.

In accordance with certain aspects of the presently disclosed subject matter, there is provided an improved automotive grille overlay with complete surround capable of being snapped over a manufacturer's existing grille to cover up damage or wear and tear of the latter, said improved automotive grille overlay with complete surround comprising horizontal slats, vertical bars and/or polygon-based interlocking mesh system with interior regions used tor snapping over corresponding regions of a manufacturer's existing grille in need of repair or appearance enhancement.

In accordance with further aspects and, optionally, in combination with other aspects of the presently disclosed subject matter, the interior regions of the present inventions improved automotive grille overlay with complete surround containing the snap-on technology used tor snapping over corresponding regions of a manufacturer's existing grille is comprised of a rigid polymer upper hooked-shaped lip protruding continuously along a rigid polymer upper longitudinal edge and a rigid polymer upper arm edge which is capable of having a curved shape, an oval shape, a parabolic shape, a linear shape or having a polygon shape with respect to the upper longitudinal edge, and a rigid polymer lower hooked-shaped lip protruding continuously along a rigid polymer lower longitudinal edge and a rigid polymer lower arm edge which is capable of having a curved shape, an oval shape, a linear shape or having a polygon shape with respect to the lower longitudinal edge.

In accordance with further aspects and, optionally, in combination with other aspects of the presently disclose subject matter, the interior regions of the present invention's improved automotive grille overlay with complete surround containing the snap-on technology used tor snapping over corresponding regions of a manufacturer's existing grille is comprised of an upper rigid polymer hook-shaped member that protrudes along the entire upper lip and defines an interior region which grippingly engages an upper portion of an existing manufacturers grille, and a lower rigid polymer hook-shaped member that protrudes along the entire lower lip and defines an interior region which grippingly engages a lower portion of an existing manufacturers grille.

Still, in accordance with further aspects and, optionally, in combination with other aspects of the presently disclose subject matter, the interior regions of the present invention's improved automotive grille overlay with complete surround containing the snap-on technology is used for snapping over corresponding regions of a manufacturer's existing grille, wherein upon engagement of said rigid polymer upper hooked-shaped lip and said rigid polymer lower hooked-shaped lip of the present invention's improved automotive grille overlay with the corresponding portions of a manufacturer's grille, the present invention's improved automotive grille overlay with surround is firmly affixed to said manufacturer's grille.

Still, in accordance with further aspects and, optionally, in combination with other aspects of the presently disclosed subject matter, a rear surface of said automotive grille overlay with complete surround of the present invention is contoured to precisely conform to the visible surface of an existing manufacturer's grille such that upon engagement of the upper hooked-shaped lip and lower hooked-shaped lip on said manufacturers automotive grille, said improved automotive grille overlay with surround of the present invention is intended to be flush against the manufacturers automotive grille.

Still, in accordance with further aspects and, optionally, in combination with other aspects of the presently disclosed subject matter, the horizontal slats, the vertical bars, the parabolic bars and the interlocking polygon-based mesh system, etc. of the improved automotive grille overlay with complete surround of the present invention may be composed of a rigid polymer material that can be temporarily flexed during installation of said automotive grille overlay with surround over an existing manufacturer's grille.

Yet, in accordance with further aspects and, optionally, in combination with other aspects of the presently disclosed subject matter, the horizontal slats, the vertical bars, the parabolic bars and the interlocking polygon-based mesh system, etc. are manufactured from a rigid material that allows for manipulation of the panels and interlocking system during installation over an existing manufacturers automotive grille to facilitate engagement of the upper hooked-shaped lip and lower hooked-shaped lip of the snap-on technology of the present invention with the upper portion and lower portion of an existing manufacturers grille respectively.

Yet still, in accordance with further aspects and, optionally, in combination with other aspects of the presently disclosed subject matter, the front surface of the improved automotive grille overlay with complete surround of the present invention is finished in a decorative finish.

Among advantages of certain embodiments of the presently disclosed subject matter is that the improved automotive grille overlay with complete surround of the present invention can be snapped on to an existing manufacturer's existing grille and held firmly in place by means of the upper hooked-shaped lip and lower hooked-shaped lip of the improved automotive grille overlay with complete surround of the present invention without requiring the use of double sided tape or clips to hold the automotive grille overlay in place.

BRIEF DESCRIPTION OF THE DRAWINGS

In order to understand the invention and to see how it can be carried out in practice, embodiments will be described, by the way of non-limiting examples, with references to accompanying drawings, in which:

FIG. 3A illustrates a front elevated perspective view of the improved snap-on automotive grille overlay with complete surround of the present invention prior to snap-on installation, and having horizontal slats and peripheral-hexagonal members with parabolic openings.

FIG. 3B illustrates a front elevated perspective view of the improved snap-on automotive grille overlay with complete surround of the present invention post snap-on installation, and having horizontal slats and peripheral-hexagonal members with parabolic openings.

FIG. 4D illustrates a rear elevated perspective view of the improved snap-on automotive grille overlay with complete surround of the present invention having horizontal slats and peripheral-hexagonal sideway parabolic members and a plurality of configuration of hook-shaped members of the present invention.

FIG. 5F illustrates a hook-shaped member of the snap-on technology of the present invention capable of being inserted in a cross-sectional area taken along an interior region of a section of FIG. 5A, thereby transforming the prior art insert without a surround with the hook-shaped member snap-on technology of the present invention.

FIG. 5G illustrates a hook-shaped member of the snap-on technology of the present invention capable of being inserted in a cross-sectional area taken along an interior region of a section of FIG. 5A, thereby transforming the prior art insert without a surround with the hook-shaped member snap-on technology of the present invention.

FIG. 9C illustrates a front elevated perspective view of the improved snap-on automotive grille overlay with complete surround, and having sideways parabolic surround members with polygon-based hexagonal interlocking mesh system, with an opening for an automotive emblem, and an exploded view of a region where tape is used during installation in combination with an exploded view of a region show ing where a hook-shaped member of the snap-on technology of the present invention is used during installation.

FIG. 11A illustrates an exploded rear cross sectional view of FIG. 10A with a polygon-based hexagonal interlocking mesh system showing a hook-shaped member of the snap-on technology of the present invention designed in said interlocking mesh system with a pre-cut section.

FIG. 15B illustrates a front elevated perspective view of the improved snap-on automotive grille overlay with complete surround of the present invention prior to snap-on installation over a damage manufacturer's grille, and having an opening for convective air flow between the engine and the environment.

17C illustrate a rear elevated perspective view of the automotive grille overlay with complete surround and having hook-shaped members of the present invention used to firmly affix said grille over a damaged manufacturers grille during installation.

17D illustrate a rear elevated perspective view of the automotive grille overlay with complete surround and having hook-shaped members of the present invention used to firmly affix said grille over a damaged manufacturer's grille during installation.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, and components have not been described in detail so as not to obscure the presently disclosed subject matter.

Figure 1A:
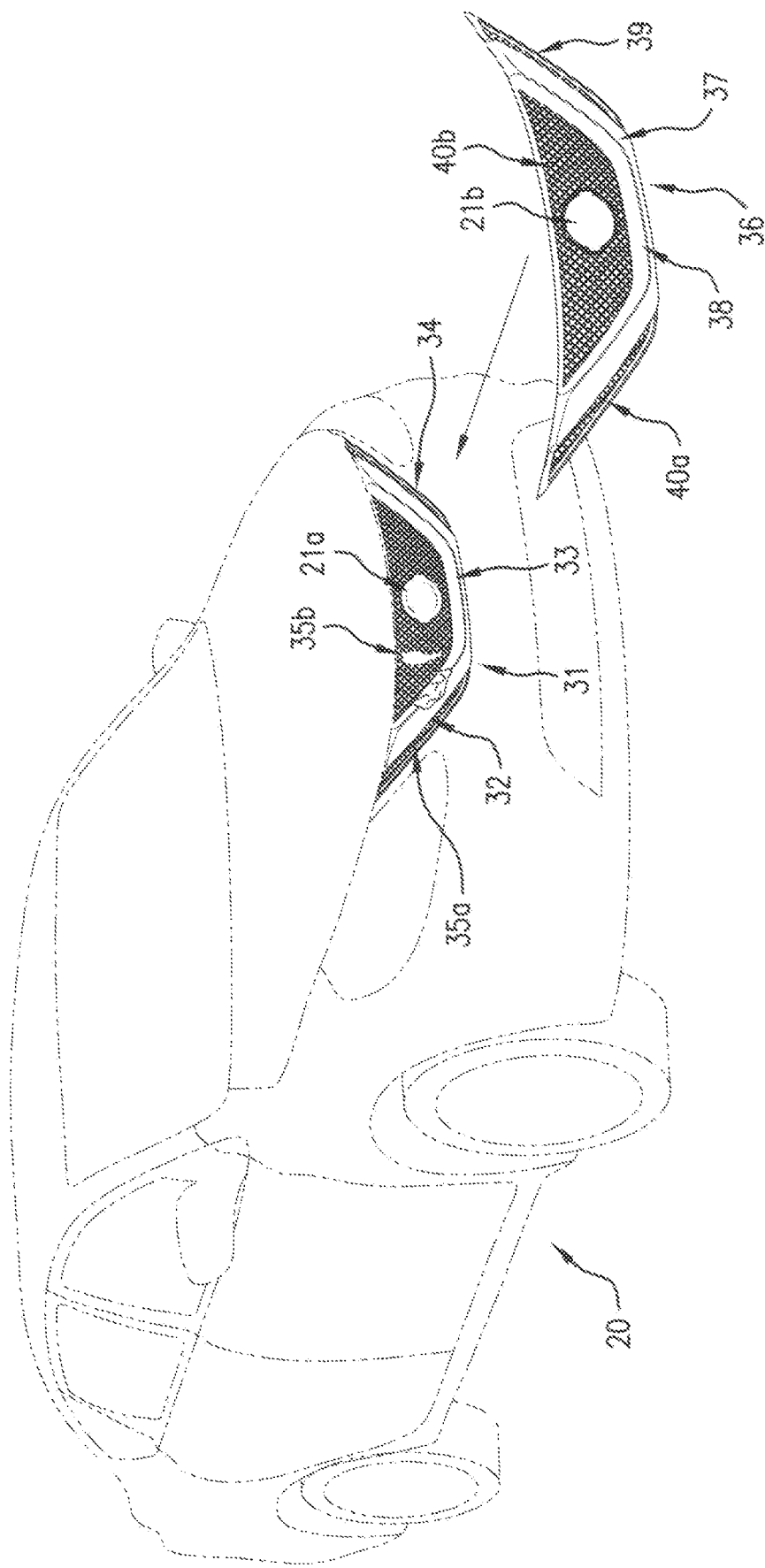
FIG. 1A illustrates a front elevated perspective view of the improved snap-on automotive grille overlay with complete surround of the present invention prior to snap-on installation, and having parabolic bias and a polygon-based interlocking mesh system.
Figure 1B:
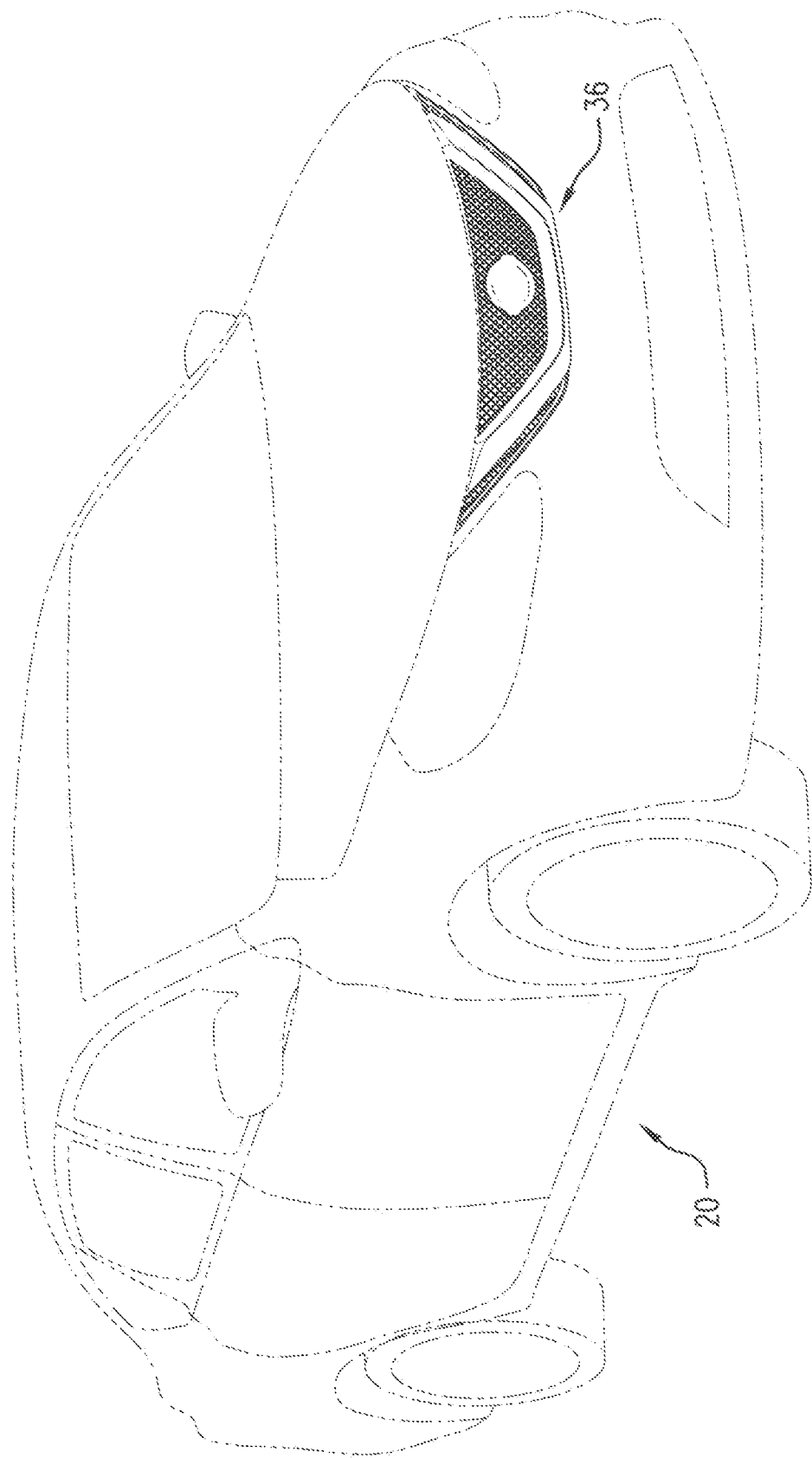
FIG. 1B illustrates a front elevated perspective view of the improved snap-on automotive grille overlay with complete surround of the present invention post snap-on installation, and having a parabolic bar and a polygon-based interlocking mesh system.

Bearing in mind, attention is drawn to FIGS. 1A and 1B illustrating an improved snap-on automotive grille overlay with complete surround of the present invention prior to installation and after installation respectively. Said improved snap-on automotive grille with complete surround is used for covering over a damaged manufacturer's grille resulting from an automobile accident or resulting from environmental wear and tear and without requiring numerous, labor intensive and costly repairs over the life span of the automobile.

As shown in FIG. 1A, an automobile 20 with a damaged manufacturer's grille 31 comprises a damaged, larger-outer parabolic bar 32, a small-inner parabolic bar 33, an outer peripheral parabolic bar 34, a minor, undamaged and polygon-based interlocking mesh system 35a, and a major, damaged polygon-based interlocking mesh system 35b with an emblem 21a embedded within the polygon-based interlocking mesh system. Still referring to FIG. 1A, an identical pre-installed automotive grille overlay with complete surround of the present invention 36 comprises a corresponding and an undamaged, larger-outer parabolic surround bar 37, a corresponding and an undamaged, smaller-inner parabolic surround bar 38, a corresponding peripheral parabolic bar surround member 39, a corresponding and a minor, undamaged and polygon-based surround interlocking mesh system 40a, a corresponding and a major, undamaged and polygon-based surround interlocking mesh system 40b, and a corresponding emblem snap-on overlay surround 21b of the present invention. Therefore, as shown in FIG. 1B, an improved automotive grille overlay with complete surround 36 of the present invention with identical configuration of a damaged manufacturer's automotive grille 31 is securely snapped on into place over the latter, thereby providing the appearance of a new or enhanced manufacturers automotive grille, without the need of removing said damaged manufacturer's automotive grille 31.

Figure 2A:
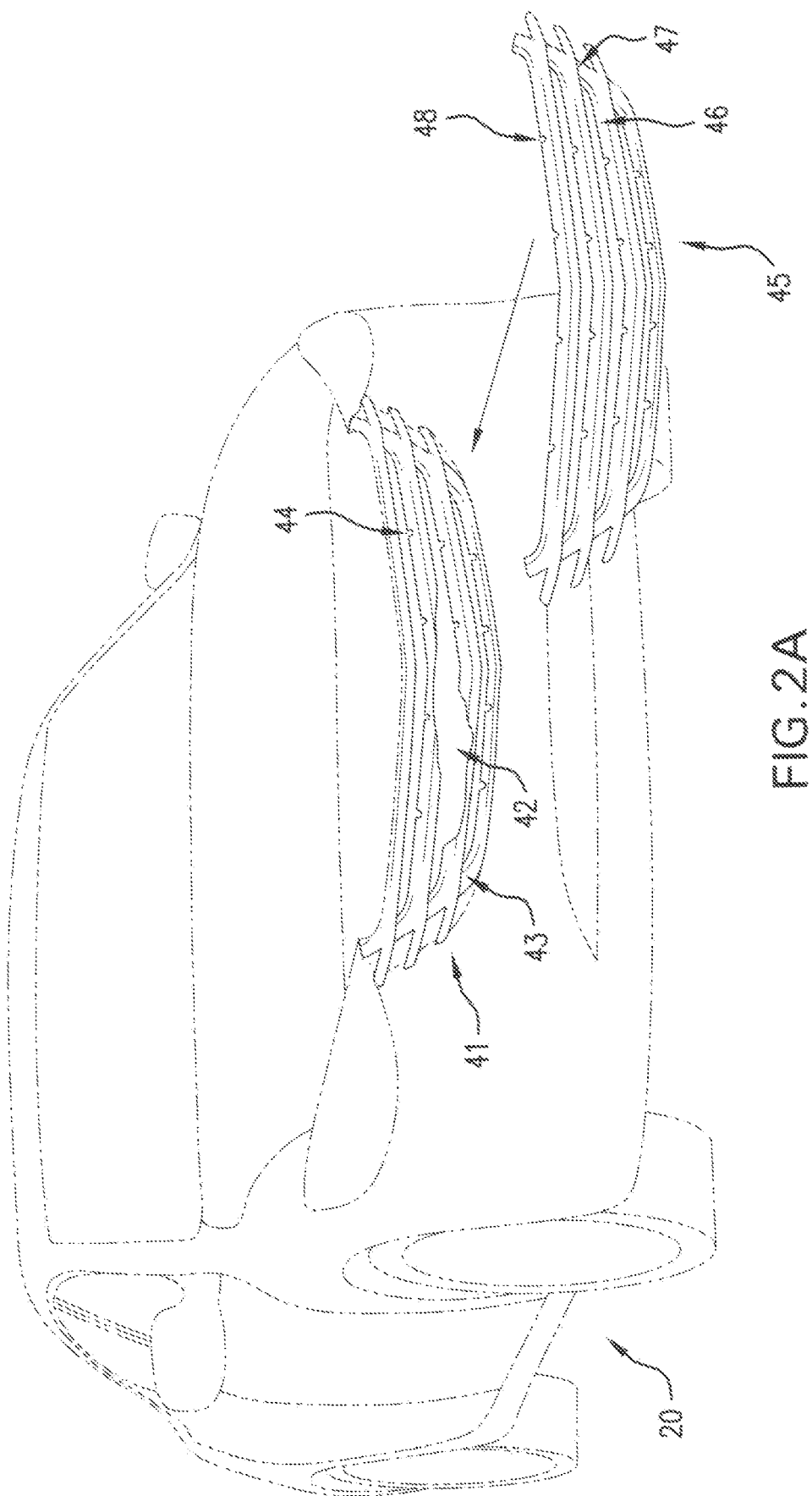
FIG. 2A illustrates a front elevated perspective view of the prior art automotive grille overlay insert without a surround prior to installation, and having horizontal slats and vertical bars interlocking system.
Figure 2B:
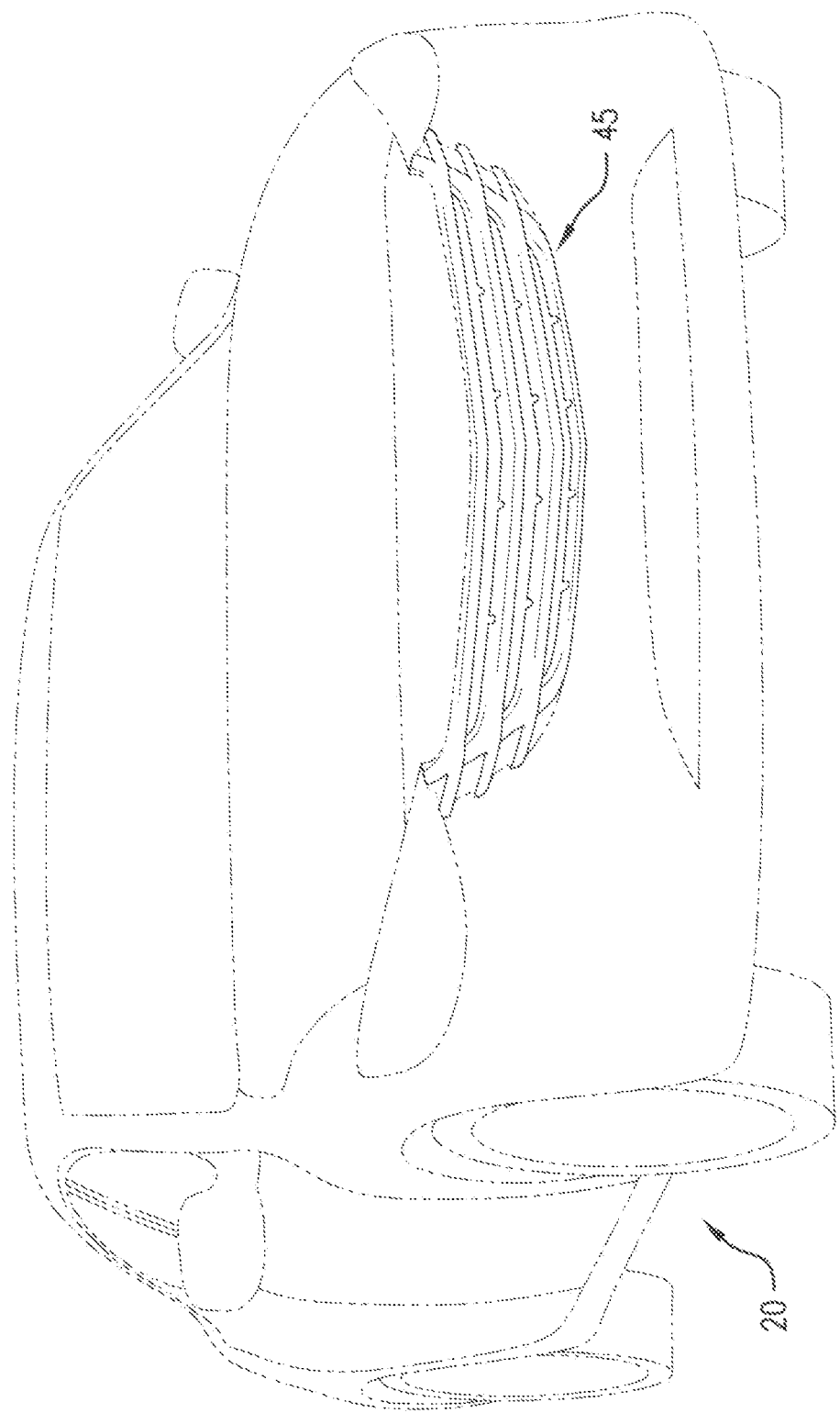
FIG. 2B illustrates a front elevated perspective view of the prior art automotive grille overlay insert without a surround post installation, and having horizontal slats and vertical bars interlocking system.

FIG. 2A illustrates an automobile 20 with a damaged manufacturer's grille 41 which comprises a damaged inner horizontal slat 42, an outer peripheral-vertical parabolic bar 43 and a sample groove 44 used for attaching said manufacturer's grille to the frame of an automobile with clips or other fasteners, etc. Still referring to FIG. 2A, a pre-installed prior art automotive grille overlay insert without a surround 45 comprises multiple, undamaged horizontal slats wherein one slat is represented as 46, an outer peripheral-vertical parabolic bar 47 and a sample groove 48 used for attaching said grille of the present invention to the frame of an automobile with clips or other fasteners, etc. As shown in FIG. 2B, a prior art automotive grille overlay insert 45 of the present invention with identical configuration of said damaged manufacturers automotive grille 41 is securely snapped on into place over the latter with clips, thereby providing the appearance of a new or enhance manufacturer's automotive grille without the need of removing said damaged manufacturer's automotive grille 41.

Still referring to the embodiment of this present invention, FIG. 3A illustrates an automobile 20 with a damaged manufacturer's grilled 51 which comprises a damaged inner representative horizontal slat 52, a smaller-inner and peripheral-hexagonal member 53 and a larger-outer and peripheral-hexagonal member 54, which in combination form an interlocking grille system with multiple parabolic openings represented as 55. Still referring to FIG. 3A, a pre-installed automotive grille overlay with complete surround of the present invention 56 comprises multiple, undamaged inner horizontal surround slats represented as 57, a smaller-inner and peripheral-hexagonal surround member 58 and a larger-outer and peripheral-hexagonal surround member 59, which in combination form an interlocking grille system with surround of the present invention with multiple parabolic openings represented as 60. As shown in FIG. 3B, an automotive grille overlay with complete surround 56 of the present invention with identical configuration of said damaged manufacturer s automotive grille 51 is securely snapped on into place over the latter, thereby providing the appearance of a new or enhance manufacturer's automotive grille without the need of removing said damaged manufacturers automotive grille 51.

Figure 4A:
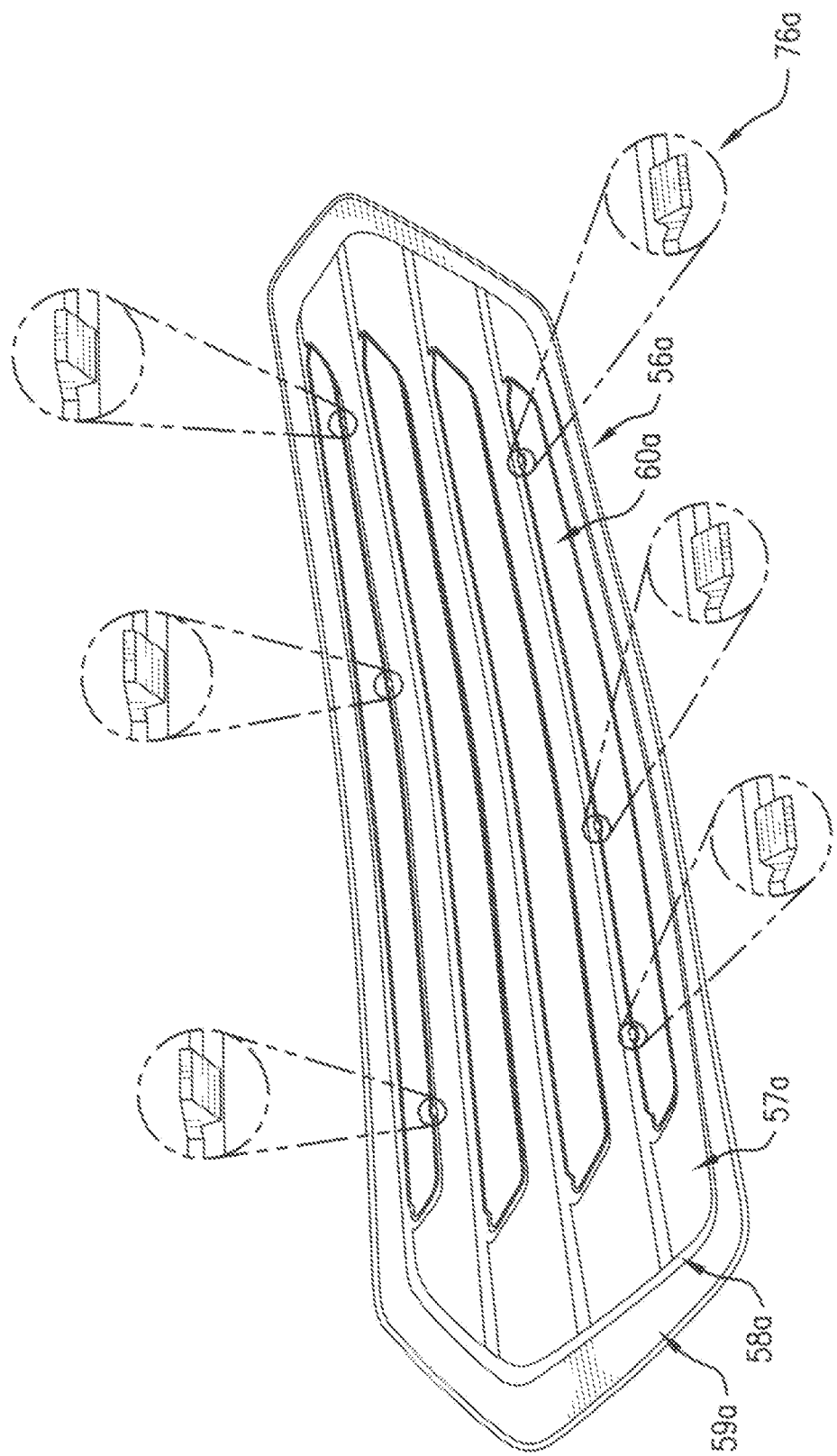
FIG. 4A illustrates a mar elevated perspective view of the improved snap-on automotive grille overlap with complete surround of the present invention having horizontal slats and peripheral-hexagonal sideway parabolic surround members and a plurality of configuration of prior art clips.

Yet again referring to the embodiment of this present invention. FIG. 4A illustrates a rear elevated perspective view of the improved snap-on automotive grille overlay with complete surround of the present invention 56a which comprises a rear view of multiple inner horizontal surround slats represented as 57a, a rear view of a smaller-inner and peripheral-hexagonal surround member 58a and a rear view of a larger-outer and peripheral-hexagonal surround member 59a, which in combination form an interlocking grille surround system of the present invention, with multiple parabolic openings represented as 60a through which air flows between an automobile's engine and the environment. As shown in FIG. 4A are prior art clips represented as 76a which may or may not be used in conjunction with the hook-shaped members of the present invention to affix the automotive grille with complete surround of the present invention over an existing manufacturer's automotive grille.

Figure 4B:
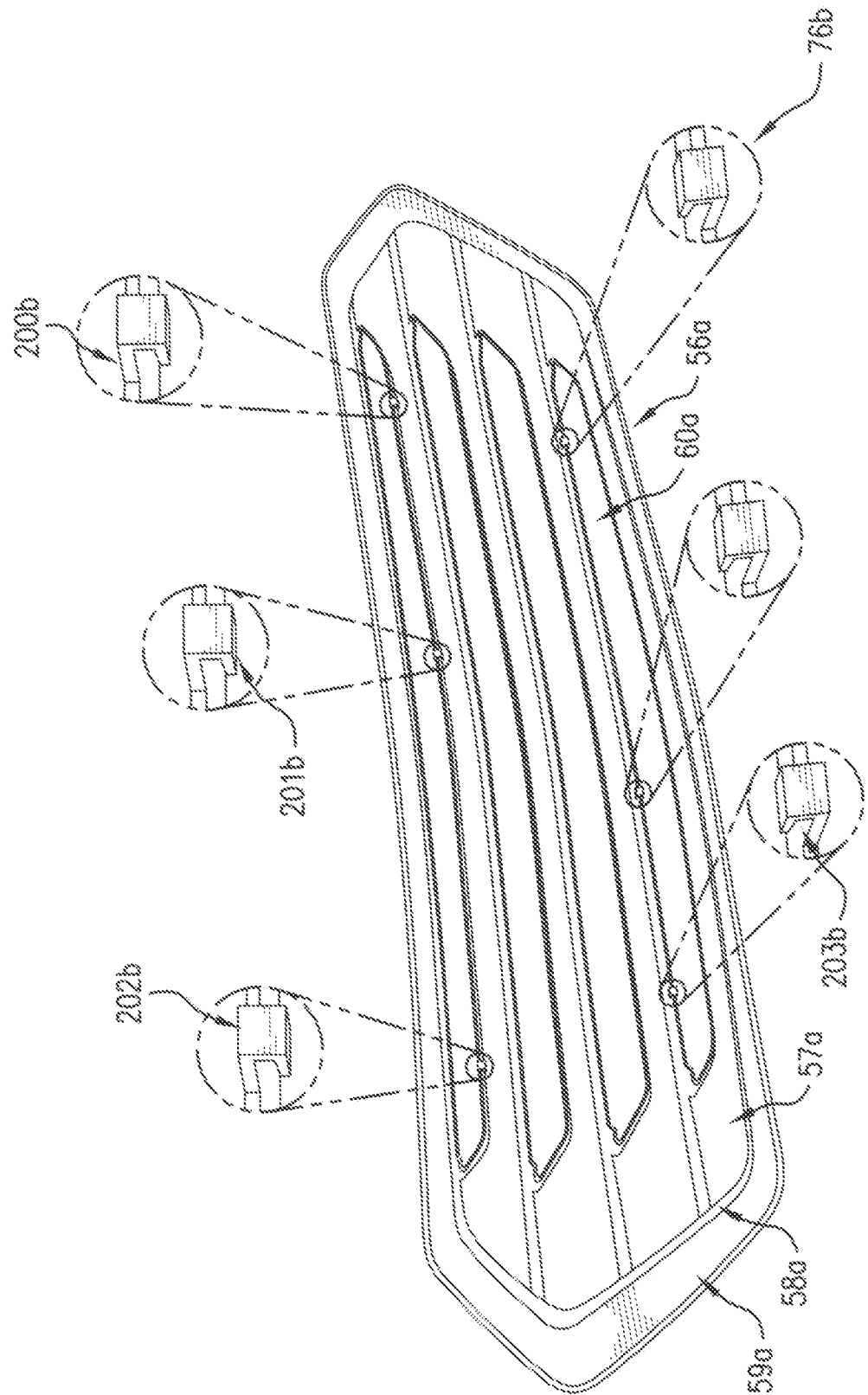
FIG. 4B illustrates a tear elevated perspective view of the improved snap-on automotive grille overlay with complete surround of the present invention having horizontal slats and peripheral-hexagonal sideway parabolic members and a plurality of configuration of hook-shaped members of the present invention.

Yet still referring to the embodiment of this present invention, FIG. 4B illustrates a rear elevated perspective view of the improved snap-on automotive grille overlay with complete surround of the present invention 56a which comprises a rear view of multiple inner horizontal surround slats represented as 57a, a rear view of a smaller-inner and peripheral-hexagonal surround member 58a and a rear view of a larger-outer and peripheral-hexagonal surround member 59a, which in combination form an interlocking grille surround system of the present invention, with multiple parabolic openings represented as 60a through which air flows between an automobile's engine and the environment. As shown in FIG. 4B are hooked-shaped members represented as 76b of the present invention to affix the automotive grille with complete surround of the present invention over an existing and damaged manufacturer's automotive grille. Said hooked-shaped members 76b are comprised of a rigid polymer longitudinal upper lip arm 200b connected to a rigid polymer longitudinal lower lip arm 201b, wherein said rigid polymer longitudinal upper lip arm and rigid polymer longitudinal lower lip arm are connected by a rigid polymer perpendicular member 202b to form a continuous rigid polymer surface and a rigid polymer interior region 203b used for snapping on an automotive grille overlay with complete surround of the present, invention over an existing manufacturer's automotive grille. Said snap-on longitudinal lower lip arm is at most 90% of the length of said snap-on longitudinal upper lip arm.

Figure 4C:
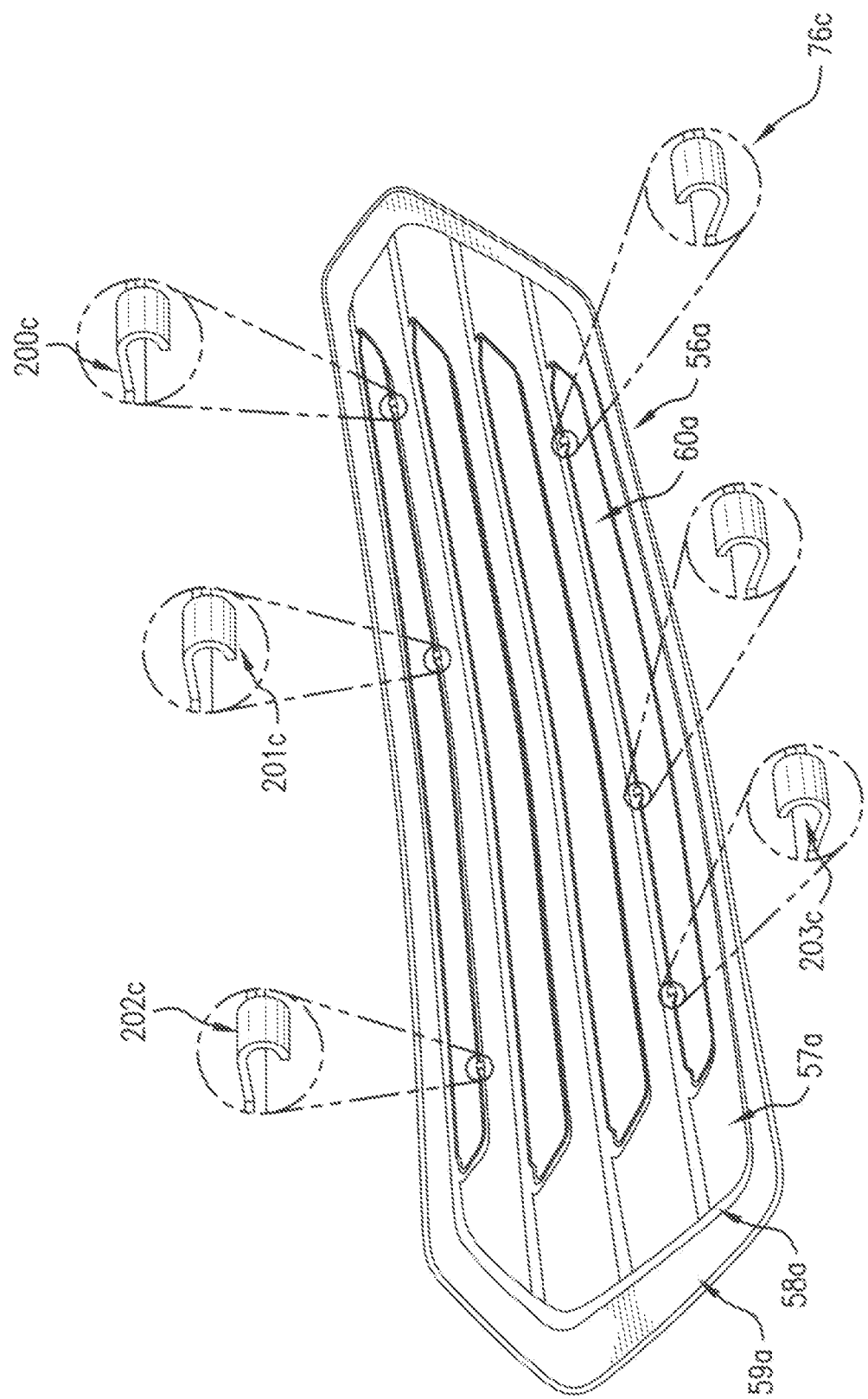
FIG. 4C illustrates a rear elevated perspective view of the improved snap-on automotive grille overlay with complete surround of the present invention having horizontal slats and peripheral-hexagonal sideway parabolic members and a plurality of configuration of hook-shaped members of the present invention.

Yet still referring to the embodiment of this present invention, FIG. 4C illustrates a rear elevated perspective view of the improved snap-on automotive grille overlay with complete surround of the present invention 56a which comprises a rear view of multiple inner horizontal surround slats represented as 57a, a rear view of a smaller-inner and peripheral-hexagonal surround member 58a and a rear view of a larger-outer and peripheral-hexagonal surround member 59a, which in combination form an interlocking grille surround system of the present invention, with multiple parabolic openings represented as 60a through which air flows between an automobile's engine and the environment. As shown in FIG. 4C are hook-shaped members represented as 76c of the present invention to affix the automotive grille with complete surround of the present invention over an existing and damaged manufacturer's automotive grille. Said hook-shaped members 76c are comprised of a rigid polymer longitudinal upper lip arm 200c connected to a rigid polymer longitudinal lower lip arm 201c, wherein said rigid polymer longitudinal upper lip arm and rigid polymer longitudinal lower lip arm are connected by a rigid polymer acutely curved member 202c to form a continuous rigid polymer surface and a rigid polymer interior region 203c used for snapping on an automotive grille overlay with complete surround of the present invention over an existing manufacturer's automotive grille. Said rigid polymer longitudinal lower lip arm is at most 90% of the length of said rigid polymer longitudinal upper lip arm.

Yet still referring to the embodiment of this present invention. FIG. 4D illustrates a rear elevated perspective view of the improved snap-on automotive grille overlay with complete surround of the present invention 56a which comprises a rear view of multiple inner horizontal surround slats represented as 57a, a rear view of a smaller-inner and peripheral-hexagonal surround member 58a and a rear view of a larger-outer and peripheral-hexagonal surround member 59a, which in combination form an interlocking grille surround system of the present invention, with multiple parabolic openings represented as 60a through which air flows between an automobile's engine and the environment. As shown in FIG. 4D are hook-shaped members represented as 76d of the present invention to affix the automotive grille with complete surround of the present invention over an existing manufacturer's automotive grille. Said hook-shaped members 76d are comprised of a rigid polymer longitudinal upper lip arm 200d connected to a rigid polymer longitudinal lower lip arm 201d wherein said rigid polymer longitudinal upper lip arm and rigid polymer longitudinal lower lip arm are connected by a rigid polymer perpendicular member 202d to form a continuous rigid polymer surface and a rigid polymer interior region 203d used for snapping on an automotive grille overlay with complete surround of the present invention over an existing and damaged manufacturer's automotive grille. Said rigid polymer longitudinal lower lip arm is at most 90% of the length of said rigid polymer longitudinal upper lip arm. In addition, said rigid polymer perpendicular member 202b of FIG. 4B is at most 90% in length of said rigid polymer perpendicular member 202d of FIG. 4D. That therefore said rigid polymer interior region's surface area 203b of FIG. 4B is at most 90% of said rigid polymer interior region's surface area 203d of FIG. 4D.

Figure 4E:
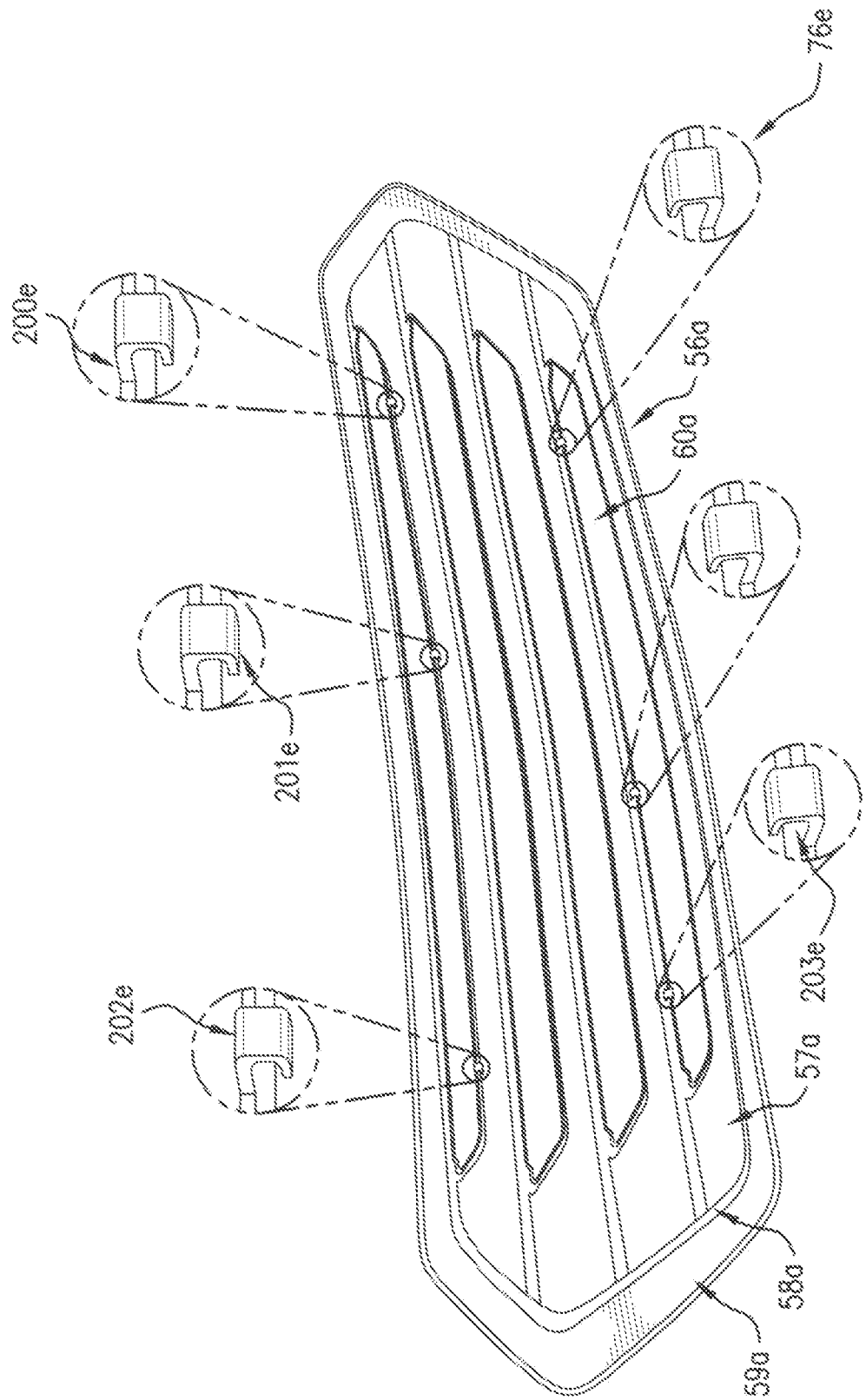
FIG. 4E illustrates a rear elevated perspective view of the improved snap-on automotive grille overlay with complete surround of the present invention having horizontal slats and peripheral-hexagonal sideway parabolic members and a plurality of configuration of hook-shaped members of the present invention.

Yet still referring to the embodiment of this present invention. FIG. 4E illustrates a rear elevated perspective view of the improved snap-on automotive grille overlay with surround of the present invention 56a which comprises a rear view of multiple inner horizontal surround slats represented as 57a, a rear view of a smaller-inner and peripheral-hexagonal surround member 58a and a rear view of a larger-outer and peripheral-hexagonal surround member 59a, which in combination form an interlocking grille surround system of the present invention, with multiple parabolic openings represented as 60a through which air flows between an automobile's engine and the environment. As shown in FIG. 4E are hooked-shaped members represented as 76e of the present invention to affix the automotive grille with complete surround of the present invention over an existing and damaged manufacturer's automotive grille. Said hook-shaped members 76e are comprised of a rigid polymer longitudinal upper lip arm 200e connected to a rigid polymer longitudinal lower lip arm 201e, wherein said rigid polymer longitudinal upper lip arm and rigid polymer longitudinal lower lip arm are connected by a rigid polymer rightly curved or obtusely curved member 202e to form a continuous rigid polymer surface and a rigid polymer interior region 203e used for snapping on an automotive grille overlay with complete surround of the present invention over an existing and damaged manufacturer's automotive grille. Said rigid polymer longitudinal lower lip arm is at most 90% of the length of said rigid polymer longitudinal upper lip arm. In addition, said rigid polymer curved member 202c of FIG. 4C is at most 90% in length of said rightly curved or obtusely curved member 202e of FIG. 4E. That therefore said rigid polymer interior region's surface area 203c of FIG. 4C is at most 90% of said rigid polymer interior region's surface area 203e of FIG. 4K.

Figure 5A:
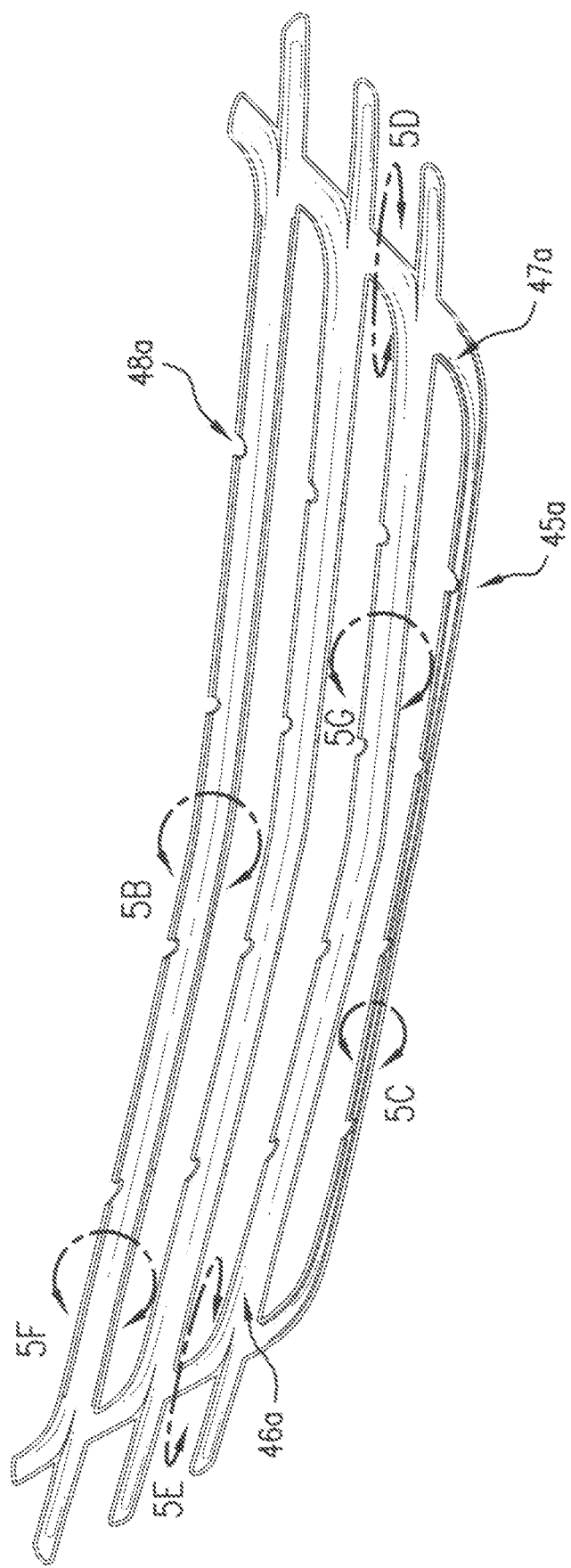
FIG. 5A illustrates a front elevated perspective view of the prior art automotive grille overlay insert without a surround and having horizontal slats and vertical bars interlocking system with grooves for inserting a plurality of configuration of prior an clips.

FIG. 5A is a rear elevation view of a pre-installed prior art automotive grille overlay insert without surround 45a which comprises a rear view of multiple inner horizontal slats represented as 46a, a rear view of an outer peripheral-vertical parabolic bar 47a and a rear view of a sample groove 48a used for attaching said prior art grille overlay insert without surround to a damaged manufacturer's grille with clips or other fasteners, etc. FIGS. 5B, 5C, 5D, 5E, 5F and 5G are cross-sectional views taken along a section of FIG. 5A illustrating various positions where a polymer hook-shaped member of the snap-on technology unique to the present invention can be inserted, so as to enhance and transform the prior art's snap-on capabilities when installing said prior art overlay insert without surround depicted in FIG. 5A.

Figure 5C:
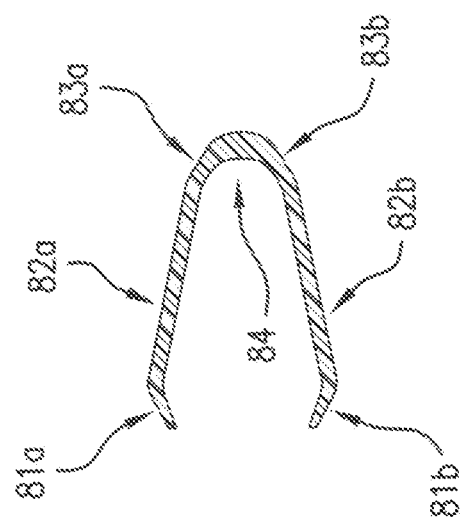
FIG. 5C illustrates a hook-shaped member of the snap-on technology of the present invention capable of being inserted in a cross-sectional area taken along an interior region of a section of FIG. 5A, thereby transforming the prior art insert without a surround with the hook-shaped member snap-on technology of the present invention.
Figure 5B:
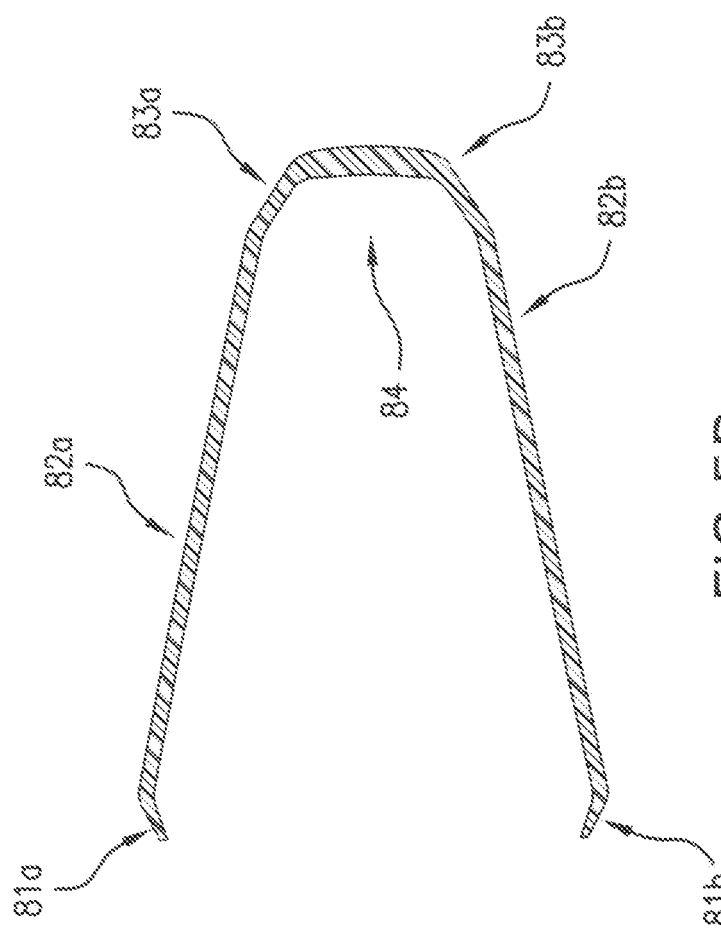
FIG. 5B illustrates a hook-shaped member of the snap-on technology of the present invention capable of being inserted in a cross-sectional area taken along an interior region of a section of FIG. 5A, thereby transforming the prior art insert without a surround with the hook-shaped member snap-on technology of the present invention.

Specifically referring to the cross sectional area of FIG. 5B of an interior regions of a horizontal slat 46a of FIG. 5A, is described a polymer hook-shaped member of the snap-on technology of the present invention, which can be installed within said cross sectional area and used for snapping over a corresponding horizontal slat section of a damaged manufacturer's existing grille comprising a rigid polymer upper lip 81a protruding continuously along a rigid polymer upper longitudinal edge 82a, which is continuously connected to a rigid polymer curved upper arm edge 83a. Still referring to the cross sectional area of FIG. 5B of an interior region of the horizontal slat 46a of FIG. 5A, there is described said polymer hook-shaped member of the snap-on technology of the present invention with a corresponding rigid polymer lower lip 81b protruding continuously along a rigid polymer lower longitudinal edge 82b, which is continuously connected to a rigid polymer curved lower arm edge 83b. That the interior regions of the rigid polymer curved upper arm edge 83a and the rigid polymer curved lower arm edge 83b are connected by a rigid polymer continuous region 84, which is capable of having a curved shape, an oval shape, a parabolic shape, a linear shape, a polygon shape, a perpendicular shape or having any combination of shapes to accommodate said horizontal slats 46a interior regions when installed therein. Ail the interior regions are elongated and are composed of rigid polymer materials.

Specifically referring to the cross sectional area of FIG. 5C of an interior region of the horizontal slat 46a of FIG. 5A, is described another polymer hook-shaped member of the snap-on technology of the present invention, which can be installed within said cross sectional area and used for snapping over a corresponding horizontal slat section of a damaged manufacturer's existing grille comprising a rigid polymer upper lip 81a protruding continuously along a rigid polymer upper longitudinal edge 82a, which is continuously connected to a rigid polymer curved upper arm edge 83a. Still referring to the cross sectional area of FIG. 5C of an interior region of the horizontal slat 46a of FIG. 5A, there is described said polymer hook-shaped member of the snap-on technology of the present invention with a corresponding rigid polymer lower lip 81b protruding continuously along a rigid polymer lower longitudinal edge 82b, which is continuously connected to a rigid polymer curved lower arm edge 83b. That the interior regions of the rigid polymer curved upper arm edge 83a and the rigid polymer curved lower arm edge 83b are connected by a rigid polymer continuous region 84, which is capable of having a curved shape, an oval shape, a parabolic shape, a linear shape, a polygon shape, a perpendicular shape or having any combination of shapes to accommodate said horizontal slats 46a interior regions when installed therein. All the interior regions are elongated and are composed of rigid polymer materials.

Figure 5D:
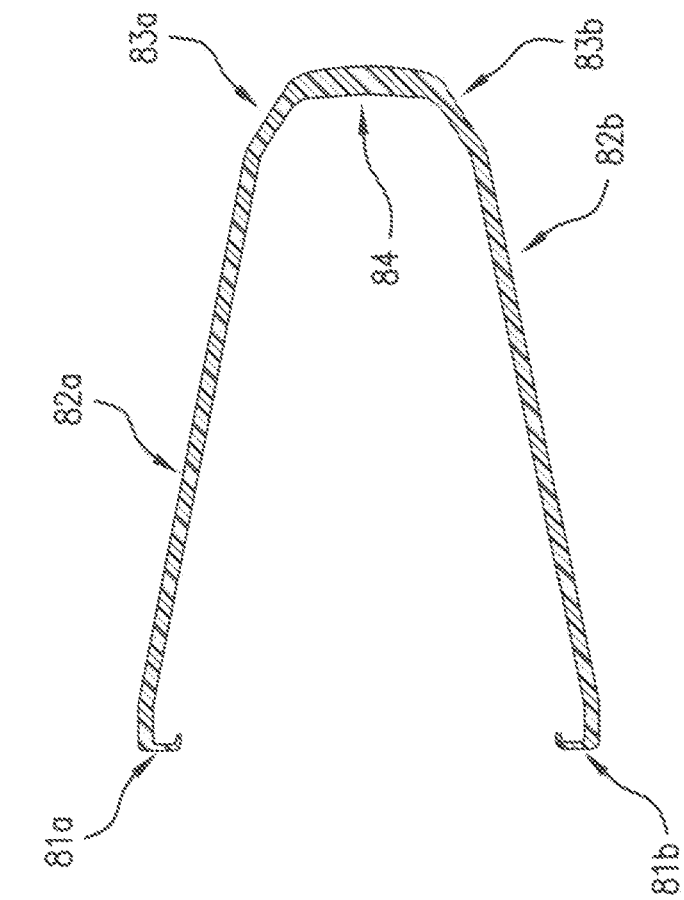
FIG. 5D illustrates a hook-shaped member of the snap-on technology of the present invention capable of being inserted in a cross-sectional area taken along an interior region of a section of FIG. 5A, thereby transforming the prior art insert without a surround with the hook-shaped member snap-on technology of the present invention.

Specifically referring to the cross sectional area of FIG. 5D of an interior regions of the outer peripheral-vertical parabolic bar 47a of FIG. 5A, is described a polymer hook-shaped member of the snap-on technology of the present invention, which can be installed within said cross sectional area and used for snapping over a corresponding outer peripheral-vertical parabolic bar 47a section of a damaged manufacturer's existing grille comprising a rigid polymer perpendicular hook-shaped upper lip 81a protruding continuously along a rigid polymer upper longitudinal edge 82a, which is continuously connected to a rigid polymer curved upper arm edge 83a. Still referring to the cross sectional area of FIG. 5D of the interior regions of the outer peripheral-vertical parabolic bar 47a of FIG. 5A, there is described said polymer hook-shaped member of the snap-on technology of the present invention with a corresponding rigid polymer perpendicular hook-shaped lower lip 81b protruding continuously along a rigid polymer lower longitudinal edge 82b, which is continuously connected to a rigid polymer curved lower arm edge 83b. That the interior regions of the rigid polymer curved upper arm edge 83a and the rigid polymer curved lower arm edge 83b are connected by a rigid polymer continuous region 84, which is capable of having a curved shape, an oval shape, a parabolic shape, a linear shape, a polygon shape, a perpendicular shape or having any combination of shapes to accommodate said horizontal slats 46*a* interior regions when installed therein. All the interior regions are elongated and are composed of rigid polymer materials.

Figure 5E:
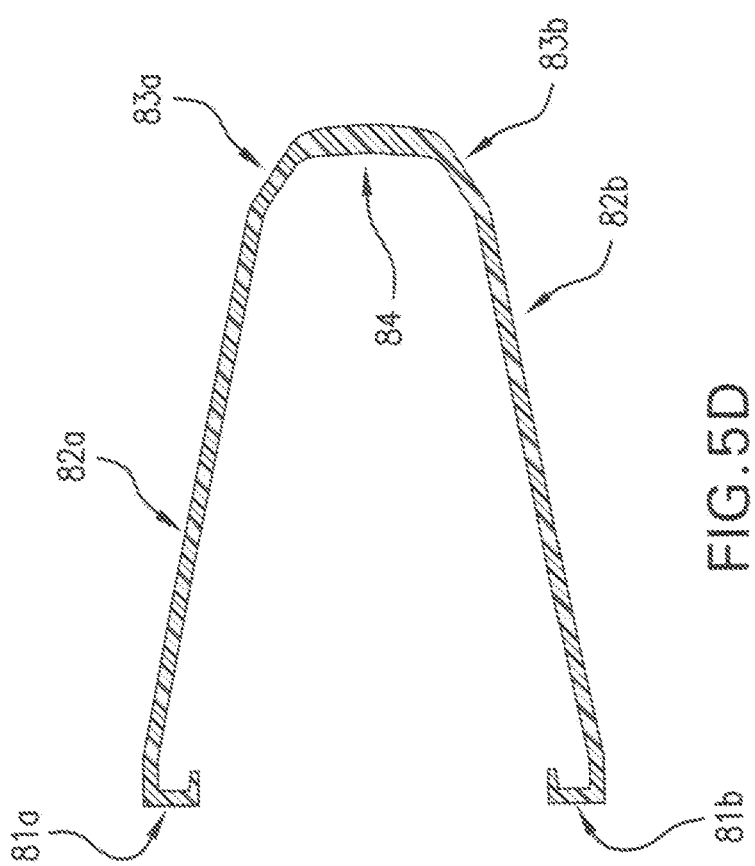
FIG. 5E illustrates a hook-shaped member of the snap-on technology of the present invention capable of being inserted in a cross-sectional area taken along an interior region of a section of FIG. 5A, thereby transforming the prior art insert without a surround with the hook-shaped member snap-on technology of the present invention.

Specifically referring to the cross sectional area of FIG. 5E of the interior regions of the outer peripheral-vertical parabolic bar 47*a* of FIG. 5A, is described a polymer hooked-shaped member of the snap-on technology of the present invention, which can be installed within said cross sectional area and used for snapping over a corresponding outer peripheral-vertical parabolic bar 47*a* section of a damaged manufacturer's existing grille comprising a rigid polymer perpendicular hook-shaped upper lip 81*a* protruding continuously along a rigid polymer upper longitudinal edge 82*a*, which is continuously connected to a rigid polymer curved upper arm edge 83*a*. Still referring to the cross sectional area of FIG. 5E of the outer peripheral-vertical parabolic bar 47*a* of FIG. 5A, there is described said polymer hook-shaped member of the snap-on technology of the present invention with a corresponding rigid polymer perpendicular hook-shaped lower lip 81*b* protruding continuously along a rigid polymer lower longitudinal edge 82*b*, which is continuously connected to a rigid polymer curved lower arm edge 83*b*. That the interior regions of the rigid polymer curved upper arm edge 83*a* and the rigid polymer curved lower arm edge 83*b* are connected by a rigid polymer continuous region 84, which is capable of having a curved shape, an oval shape, a parabolic shape, a linear shape, a polygon shape, a perpendicular shape or having any combination of shapes to accommodate said horizontal slats 46*a* interior regions when installed therein. All the interior regions are elongated and are composed of rigid polymer materials.

Specifically referring to the cross sectional area of FIG. 5F of an interior regions of a horizontal slat 46*a* of FIG. 5A, is described another polymer hooked-shaped member of the snap-on technology of the present invention, which can be installed within said cross sectional area and used for snapping over a corresponding horizontal slat section of a damaged manufacturer's existing grille comprising a rigid polymer curve-shaped upper lip 81*a* protruding continuously along a rigid polymer upper longitudinal edge 82*a*, which is continuously connected to a rigid polymer curved upper arm edge 83*a*. Still referring to the cross sectional area of MG. 5F of the horizontal slat 46*a* of FIG. 5A, there is described said polymer hook-shaped member of the snap-on technology of the present invention with a corresponding rigid polymer curve-shaped lower lip 81*b* protruding continuously along a rigid polymer lower longitudinal edge 82*b*, which is continuously connected to a rigid polymer curved lower arm edge 83*b*. That the interior regions of the rigid polymer curved upper arm edge 83*a* and the rigid polymer curved lower arm edge 83*b* are connected by a rigid polymer continuous region 84, which is capable of having a curved shape, an oval shape, a parabolic shape, a linear shape, a polygon shape, a perpendicular shape or having any combination of shapes to accommodate said horizontal slats 46*a* interior regions when installed therein. All the interior regions are elongated and are composed of rigid polymer materials.

Specifically referring to the cross sectional area of FIG. 5G of an interior regions of a horizontal slat 46*a* of FIG. 5A, is described another polymer hooked-shaped member of the snap-on technology of the present invention, which can be installed within said cross sectional area and used for snapping over a corresponding horizontal slat section of a damaged manufacturer's existing grille comprising a rigid polymer perpendicular hook-shaped upper lip 81*a* protruding continuously along a rigid polymer upper longitudinal edge 82*a*, which is continuously connected to a rigid polymer curved upper arm edge 83*a*. Still referring to the cross sectional area of the horizontal slat 46*a* of FIG. 5A, there is described said polymer hook-shaped member of the snap-on technology of the present invention with a corresponding rigid polymer perpendicular hook-shaped lower lip 81*b* protruding continuously along a rigid polymer lower longitudinal edge 82*b*, which is continuously connected to a rigid polymer curved lower arm edge 83*b*. That the interior regions of the rigid polymer curved upper arm edge 83*a* and the rigid polymer curved lower arm edge 83*b* are connected by a rigid polymer continuous region 84, which is capable of having a curved shape, an oval shape, a parabolic shape, a linear shape, a polygon shape, a perpendicular shape or having any combination of shapes to accommodate said horizontal slats 46*a* interior regions when installed therein. All the interior regions are elongated and are composed of rigid polymer materials.

During installation of the improved automotive grille overlay insert without surround of the present invention, as depicted in the prior art FIG. 5A alter first being transformed through the addition of the polymer hook-shaped members of the snap-on technology of the present invention as depicted in FIGS. 5B, 5C, 5D, 5E, 5F and 5G, the snap-on technology is used for overlaying the transformed prior art automotive grille overlay insert bearing the snap-on technology by snapping over corresponding regions of a damaged manufacturers existing grille. The snap-on process is accomplished by using said rigid polymer interior regions of the transformed insert overlay to grippingly engage corresponding interior regions of a damaged manufacturer's existing grille, and when installed is comprised of an upper rigid polymer hook-shaped member that protrudes along the entire upper lip and defines an interior region which grippingly engages an upper portion of an existing damaged manufacturer's grille, a lower rigid polymer hook-shaped member that protrudes along the entire lower lip and defines and interior region which grippingly engages a lower portion of an existing, damaged manufacturer's grille, and a connecting rigid polymer hook-shaped member (which connects the upper rigid polymer hook-shaped member to the lower rigid polymer hook-shaped member) that protrudes along the entire connecting lip and defines an interior region which grippingly engages a connecting portion of an existing, damaged manufacturer's grille when installed. As such alter installation, the rigid polymer interior regions of the present invention containing the snap-on technology engages corresponding regions of a manufacturer's damaged existing grille by improved automotive grille overlay containing, the snap-on technology, wherein upon engagement of said rigid polymer upper lip and said rigid polymer lower lip and said rigid polymer interior regions of the present invention's improved automotive grille overlay insert with the corresponding portions of a damaged existing manufacturer's grille, the present invention's improved automotive grille overlay insert is firmly affixed to said manufacturer's grille insert leaving no room for vibrations or interplay when art automobile is in motion.

Figure 6A:
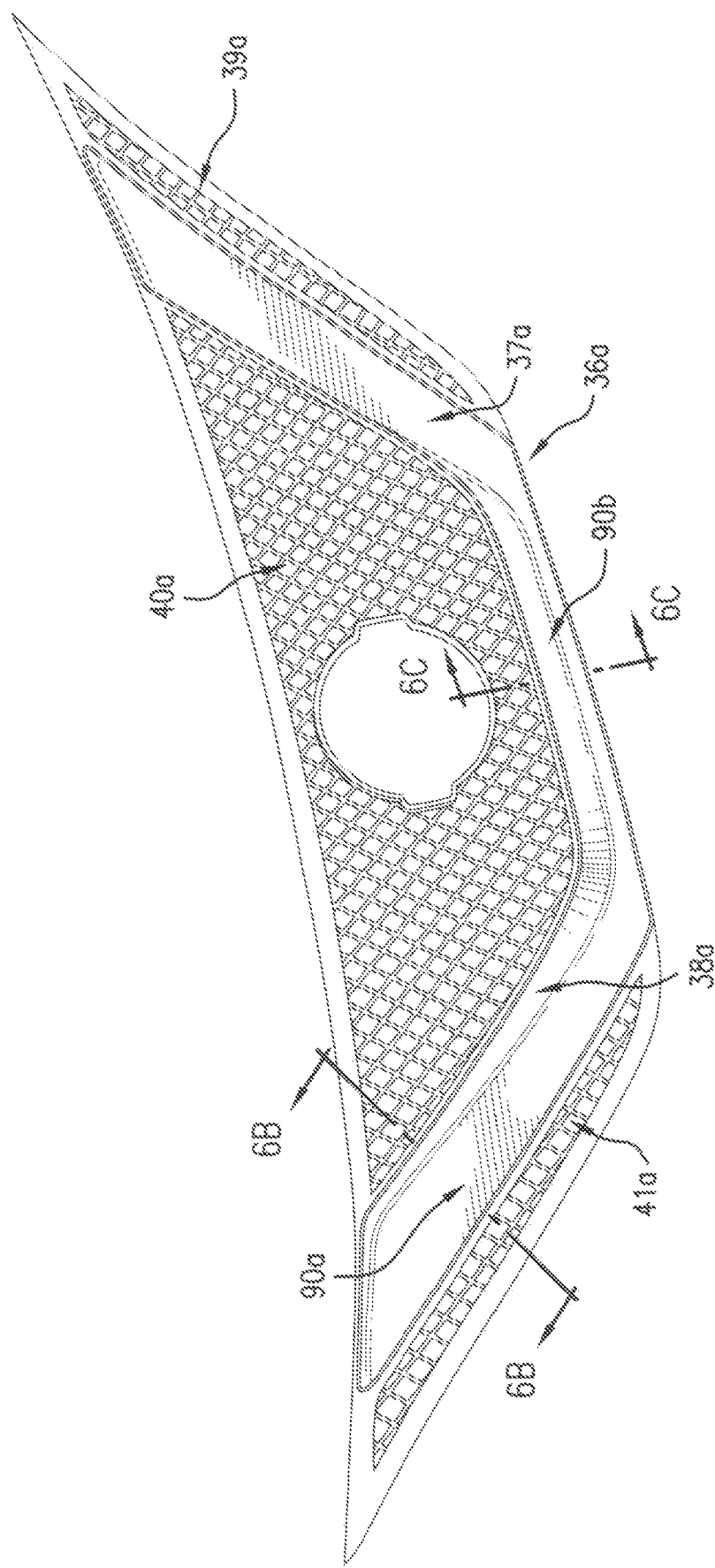
FIG. 6A illustrates a rear elevated perspective view of the improved snap-on automotive grille overlay with complete surround of the present invention having an inner parabolic bar, an outer peripheral parabolic bar, a polygon-based interlocking mesh system and an opening for an automotive emblem.

Referring to FIG. 6A of the present invention is a rear elevated perspective view of the improved snap-on automotive grille overlay with complete surround 36*a* which comprises the rear surface of a larger-outer parabolic surround bar 37*a*, the rear surface of a smaller-inner parabolic surround bar 38*a*, the rear surface of an outer peripheral parabolic surround bar 39*a*, the rear surface of a major polygon-based interlocking mesh system 40*a*, and the rear surface of a minor polygon-based interlocking mesh system 41*a*.

Figure 6B:
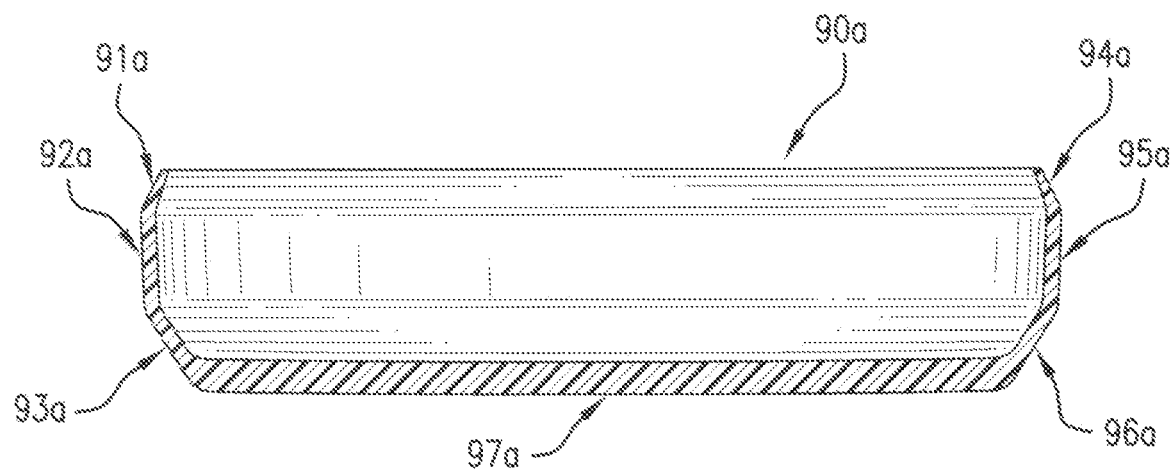
FIG. 6B illustrates a hook-shaped member of the snap-on technology of the present invention capable of being inserted in a cross-sectional area taken along an interior region of a section of FIG. 6A containing the hook-shaped member snap-on technology of the present invention.

Specifically referring to the cross sectional area of FIG. 6B, the interior regions of the slanted vertical portion of the larger outer parabolic surround bar 37*a* of FIG. 6A of the present invention's automotive improved grille overlay with complete surround, therein is installed the snap-on technology of the present invention used for snapping over a corresponding slanted vertical portion of the larger-outer parabolic bar of a damaged manufacturer's existing grille. The hook-shaped member span-on technology 90*a* as depicted in FIG. 6B comprises a rigid polymer upper lip 91*a* protruding continuously along a rigid polymer upper longitudinal edge 92*a* and a rigid polymer upper arm edge 93*a* which is capable of having a curved shape, an oval shape, a parabolic shape, a linear shape, a perpendicular shape or a polygon shape with respect to the upper longitudinal edge. Still referring to the interior regions of the vertical portion of the larger-outer parabolic surround bar 37*a* of FIG. 6A of the present invention's improved automotive grille overlay with complete surround, there is a corresponding rigid polymer opposite lower lip 94*a* protruding continuously along a rigid polymer lower longitudinal edge 95*a* and a rigid polymer lower arm edge 96*a* which is capable of having a curved shape, an oval shape, a linear shape, a perpendicular shape, a parabolic shape or having a polygon shape with respect to the lower longitudinal edge. That along the rigid polymer interior regions of the vertical portion of the larger-outer parabolic surround bar 37*a* of FIG. 6A, the rigid polymer interior regions of the upper lip 91*a*, the upper longitudinal edge 92*a* and the upper arm edge 93*a* are connected to interior regions of the lower lip 94*a*, the lower longitudinal edge 95*a* and the lower arm edge 96*a* by a continuous rigid polymer connecting interior region 97*a*, which is capable of having a curved shape, an oval shape, a parabolic shape, a linear shape, a polygon shape or a perpendicular shape, etc.

Figure 6C:
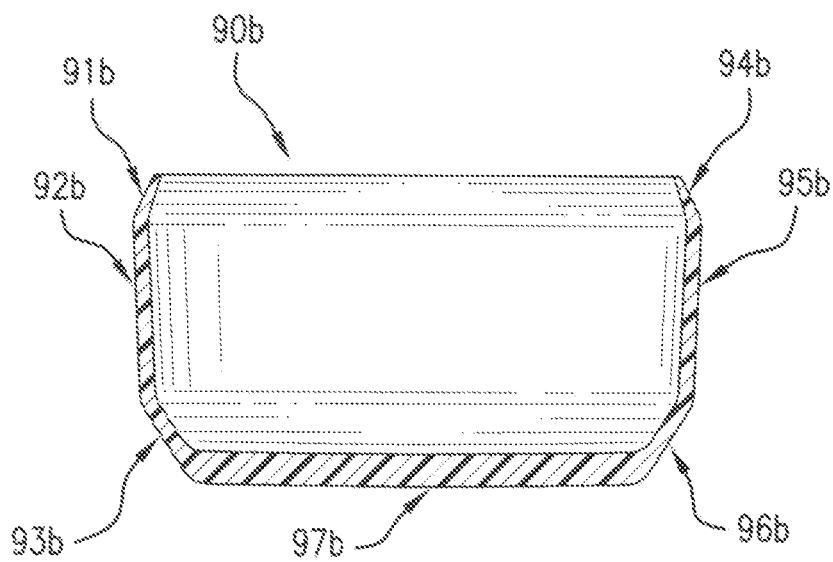
FIG. 6C illustrates a hook-shaped member of the snap-on technology of the present invention capable of being inserted in a cross-sectional area taken along an interior region oi a section of FIG. 6A containing the hook-shaped member snap-on technology of the present invention.

Specifically referring to the cross sectional area of FIG. 6C, the interior regions of the horizontal portion of the larger-outer parabolic surround bar 37*a* of FIG. 6A of the present invention's automotive improved grille overlay with complete surround, therein is installed the snap-on technology of the present invention used for snapping over a corresponding horizontal portion of the larger-outer parabolic bar of a damaged manufacturer's existing grille. The hook-shaped member span-on technology 90*b* as depicted in FIG. 6C comprises a rigid polymer upper lip 91*b* protruding continuously along a rigid polymer upper longitudinal edge 92*b* and a rigid polymer upper arm edge 93*b* which is capable of having a curved shape, an oval shape, a parabolic shape, a linear shape, a perpendicular shape or a polygon shape with respect to tire upper longitudinal edge. Still referring to the cross sectional area of FIG. 6C, the interior regions of the horizontal portion of the larger-outer parabolic surround bar 37*a* of FIG. 6A of the present invention's improved automotive grille overlay, there is a corresponding rigid polymer opposite lower lip 94*b* protruding continuously along a rigid polymer lower longitudinal edge 95*b* and a rigid polymer lower arm edge 96*b* which is capable of having a curved shape, an oval shape, a linear shape, a perpendicular shape, a parabolic shape or having a polygon shape with respect to the lower longitudinal edge. That along the rigid polymer interior regions of the horizontal portion of the larger-outer parabolic surround bar 37*a* of FIG. 6A, the rigid polymer interior regions of the upper lip 91*b*, the upper longitudinal edge 92*b* and the upper arm edge 93*b* are connected to interior regions of the lower lip 94*b*, the lower longitudinal edge 95*b* and the lower arm edge 96*b* by a continuous rigid polymer connecting interior region 97*b* is capable of having a curved shape, an oval shape, a parabolic shape, a linear shape, a polygon shape or a perpendicular shape, etc.

The snap-on process is accomplished by using said rigid polymer interior regions of the rigid polymer hook-shaped member of the present invention to grippingly engage corresponding exterior regions of a damaged manufacturers existing grille when installed, which wherein the rigid polymer interior region of the rigid polymer hook-shaped member of the present invention grippingly engages corresponding exterior region of a damaged manufacturer's existing grille when installed. As such after installation, the rigid polymer interior regions of the present invention containing the snap-on technology engages corresponding regions of a manufacturer's damaged existing grille, such that the present invention's improved automotive grille overlay with complete surround is firmly affixed to said manufacturer's damaged grille leaving no room for vibrations or interplay when air automobile is in motion.

Figure 7A:
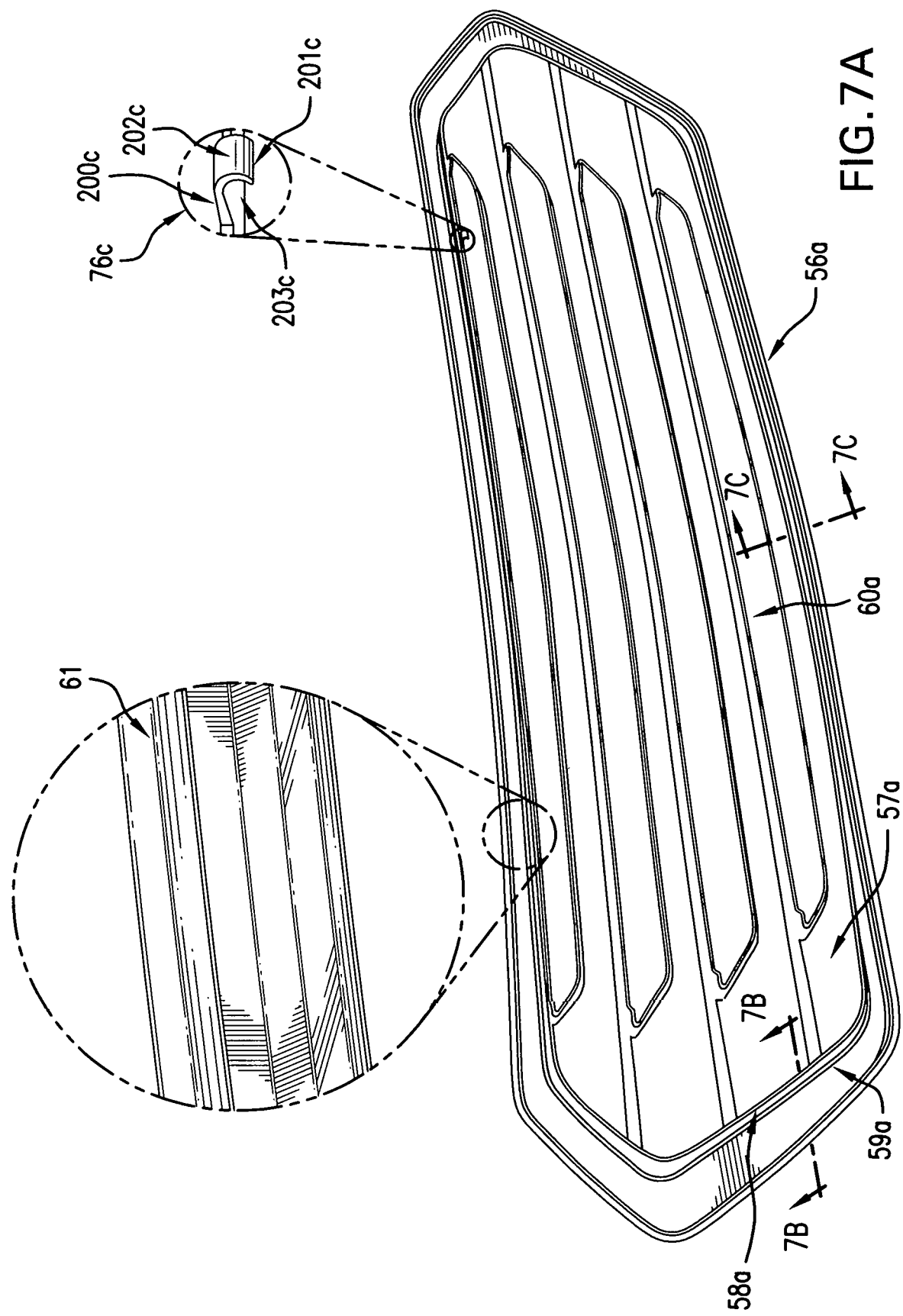
FIG. 7A illustrates a rear elevated perspective view of the improved snap-on automotive grille overlay with complete surround of the present invention having horizontal slats, peripheral-hexagonal sideway parabolic members and a region for using tape during installation in combination with a region for using a hook-shaped member of the snap-on technology of the present invention.

Still, referring to the embodiment of this present invention, FIG. 7A illustrates a rear elevated perspective view of the improved snap-on automotive grille overlay with complete surround 56*a* which comprises a rear view of multiple inner horizontal slats represented as 57*a*, a rear view of a smaller-inner and peripheral-hexagonal surround member 58*a* and a rear view of a larger-outer and peripheral-hexagonal surround member 59*a*, which in combination form an interlocking grille system of the present invention, with multiple parabolic openings represented as 60*a*. The improved snap-on automotive grille overlay with complete surround 56*a* is fitted over a damaged existing, manufacturer's automotive grille by lacing the interior regions 61 of the surround of the present invention with, for example, 3M tape well known in the prior art.

In addition, the snap-on automotive grille overlay with surround 56*a* of FIG. 7A can be secured to an existing manufacturer's automotive grille with hook-shaped members, such as 76*c*, etc. of the present invention. Said hook-shaped members 76*c* are comprised of a rigid polymer longitudinal upper lip arm 200*c* connected to a rigid polymer longitudinal lower lip arm 201*c*, wherein said rigid polymer longitudinal upper lip arm and rigid polymer longitudinal lower lip arm are connected by a rigid polymer acutely curved member 202*c* to form a continuous rigid polymer surface and a rigid polymer interior region 203*c* used for snapping on an automotive grille overlay with complete surround of the present invention over an existing manufacturer's automotive grille. Said rigid polymer longitudinal lower lip arm is at most 90% of the length of said rigid polymer longitudinal upper lip arm.

Figure 7B:
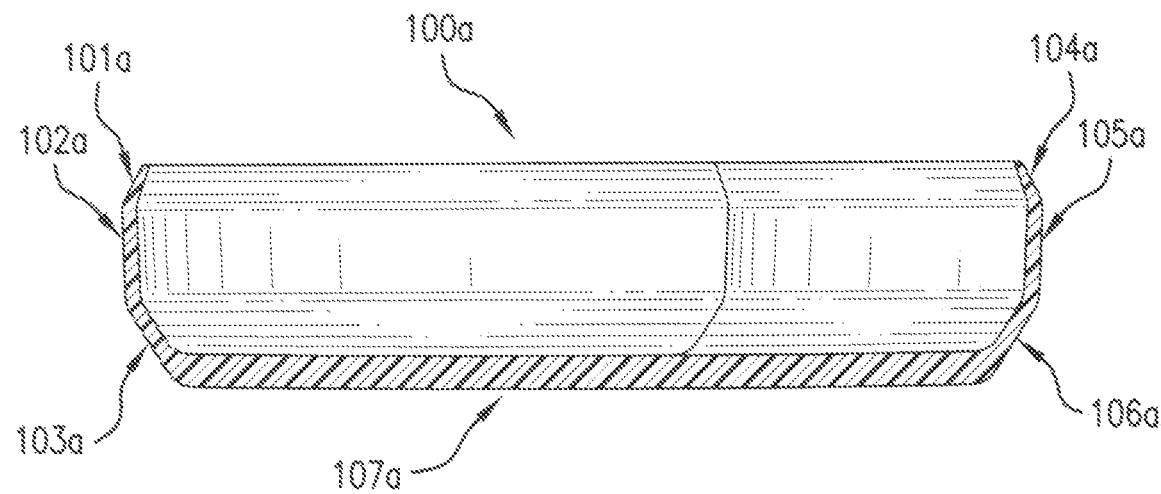
FIG. 7B illustrates a hook-shaped member of the snap-on technology of the present invention capable of being inserted in a cross-sectional area taken along an interior region of a section of FIG. 7A containing the snap-on technology of the present invention.

Specifically referring to the cross sectional area of FIG. 7B, the interior regions of the slanted vertical portion of the larger outer and peripheral-hexagonal surround bar 59*a* of FIG. 7A of the rear elevated perspective view of the snap-on automotive grille overlay with complete surround of the present invention therein is installed the snap-on technology of the present invention used for snapping over a corresponding larger outer and peripheral-hexagonal bar of a damaged manufacturer's existing grille. The hook-shaped member span-on technology 100*a* as depicted in FIG. 7B comprises a rigid polymer longitudinal upper lip 101*a* protruding continuously along a rigid polymer upper longitudinal edge 102*a* and a rigid polymer longitudinal upper arm edge 103*a* which is capable of having a curved shape, an oval shape, a parabolic shape, a linear shape, a perpendicular shape or a polygon shape with respect to the upper longitudinal edge. Still referring to the cross sectional area of FIG. 7B, interior regions of the slanted vertical portion of the larger outer and peripheral-hexagonal surround bar 59a of FIG. 7A of the rear elevated perspective view of the snap-on automotive grille overlay with complete surround of the present invention, there is a corresponding opposite rigid polymer longitudinal lower lip 104a protruding continuously along a rigid polymer lower longitudinal edge 105a and a rigid polymer lower longitudinal arm edge 106a which is capable of having a curved shape, an oval shape, a linear shape, a parabolic shape, a perpendicular shape or having a polygon shape with respect to the lower longitudinal edge. That along the slanted vertical portion of the larger outer and peripheral-hexagonal surround bar 59a of FIG. 7A, the rigid polymer interior regions of the rigid polymer longitudinal upper lip 101a, the rigid polymer upper longitudinal edge 102a and the rigid polymer upper longitudinal arm edge 103a are connected to interior regions of the rigid polymer longitudinal lower lip 104a, the rigid polymer lower longitudinal edge 105a and the rigid polymer lower longitudinal arm edge 106a by a continuous rigid polymer connecting interior region 107a, which is capable of having a curved shape, an oval shape, a parabolic shape, a linear shape, a polygon shape or a perpendicular shape, etc.

Figure 7C:
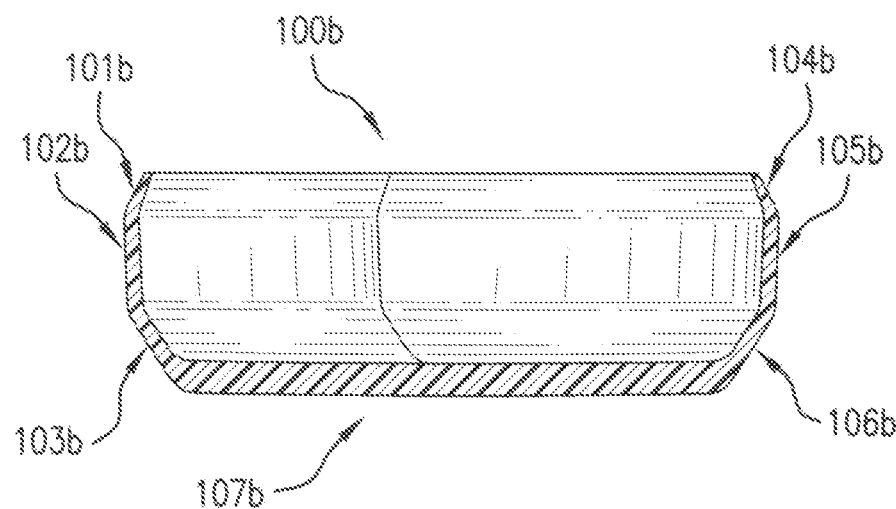
FIG. 7C illustrates a hook-shaped member of the snap-on technology of the present invention capable of being inserted in a cross-sectional area taken along an interior region of a section of FIG. 7A containing the hook-shaped member snap-on technology of the present invention.

Specifically referring to the cross sectional area of FIG. 7C, the interior regions of the horizontal portion of the larger-outer and peripheral-hexagonal surround bar 59a of FIG. 7A of the rear elevated perspective view of the snap-on automotive grille overlay with complete surround of the present invention therein is installed the snap-on technology of the present invention used for snapping over a corresponding larger outer and peripheral-hexagonal bar of a damaged manufacturer's existing grille. The hook-shaped member snap-on technology 100b as depicted in FIG. 7B comprises a rigid polymer longitudinal upper lip 101b protruding continuously along a rigid polymer upper longitudinal edge 102b and a rigid polymer longitudinal upper arm edge 103b, which is capable of having a curved shape, an oval shape, a parabolic shape, a linear shape, a perpendicular shape or a polygon shape with respect to the upper longitudinal edge. Still referring to the interior regions of the horizontal portion of the larger outer and peripheral-hexagonal surround bar 59a of FIG. 7A of the rear elevated perspective view of the snap-on automotive grille overlay with complete surround of the present invention, there is a corresponding opposite rigid polymer lower longitudinal lip 104b protruding continuously along a rigid polymer lower longitudinal edge 105b and a rigid polymer lower longitudinal arm edge 106b, which is capable of having a curved shape, an oval shape, a linear shape, a perpendicular shape, a parabolic shape or having a polygon shape with respect to the lower longitudinal edge. That along the horizontal portion of the larger-outer and peripheral-hexagonal surround bar 59a of FIG. 7A, the rigid polymer interior regions of the rigid polymer upper longitudinal lip 101b, the rigid polymer upper longitudinal edge 102b and the rigid polymer tipper longitudinal arm edge 105b are connected to interior regions of the rigid polymer lower longitudinal lip 104b, the lower longitudinal edge 105b and the lower longitudinal arm edge 106b by a continuous rigid polymer connecting interior region 107b, which is capable of having a curved shape, an oval shape, a parabolic shape, a linear shape, a polygon shape or a perpendicular shape, etc.

The snap-on process is accomplished by using said rigid polymer interior regions of the rigid polymer hook-shaped member of the present invention to grippingly engage corresponding exterior regions of a damaged manufacturer s existing grille when installed, which wherein the rigid polymer interior region of the rigid polymer hook-shaped member of the present invention grippingly engages corresponding exterior region of a damaged manufacturers existing grille when installed. As such after installation, the rigid polymer interior regions of the present invention containing the snap-on technology engages corresponding regions of a manufacturer's damaged existing grille, such that the present invention's improved automotive grille overlay with surround is firmly affixed to said manufacturers damaged grille leaving no room for vibrations or interplay when an automobile is in motion.

Figure 8A:
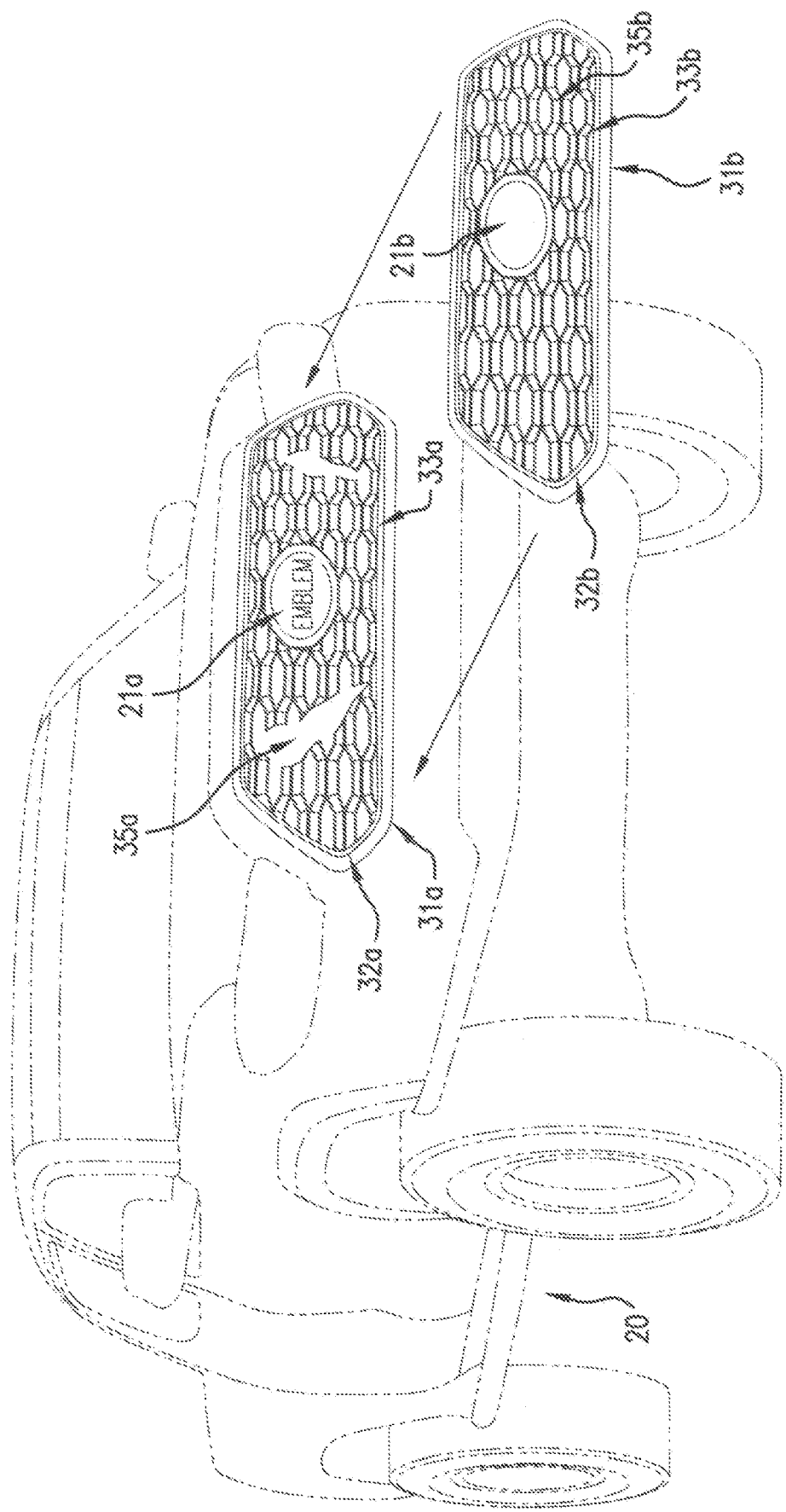
FIG. 8A illustrates a front elevated perspective view of the improved snap-on automotive grille overlay with complete surround of the present invention prior to snap-on installation, and having sideways parabolic surround members with polygon-based hexagonal interlocking mesh system and with an opening for an automotive emblem.
Figure 8B:
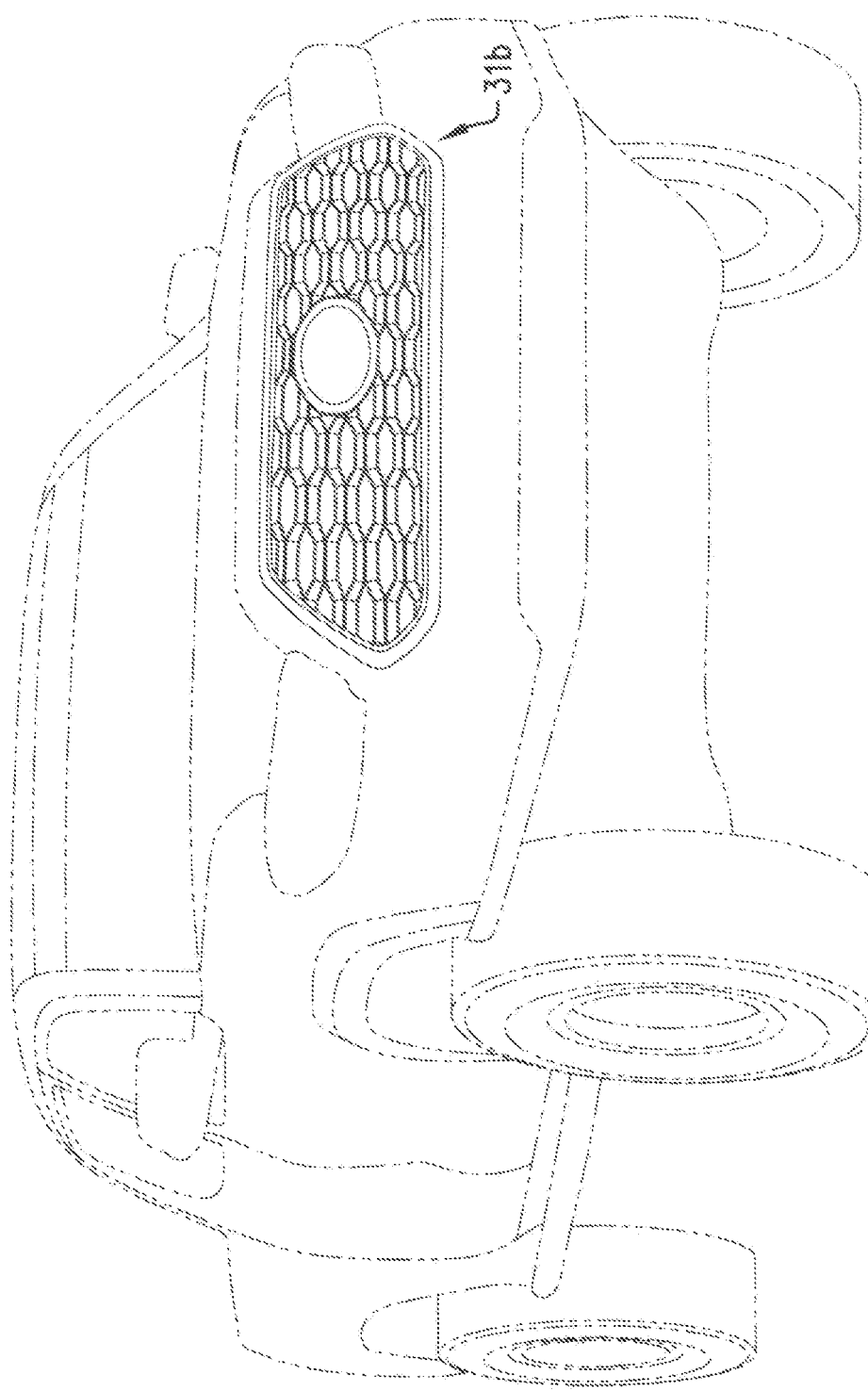
FIG. 8B illustrates a front elevated perspective view of the improved snap-on automotive grille overlay with complete surround of the present invention after snap-on installation, and having sideways parabolic surround members with polygon-based hexagonal interlocking mesh system and with an opening for an automotive emblem.

Still referring to an embodiment of the present invention, as shown in FIG. 8A, an automobile 20 with a damaged manufacturers grille 31a comprises a undamaged, larger-outer parabolic bar 32, a smaller-inner parabolic bar 33a, a damaged hexagonal-based interlocking mesh system 35 and an emblem 21a embedded within the hexagonal-based interlocking mesh. Still referring to FIG. 8A, an identical pre-installed snap-on automotive grille overlay with complete surround of the present invention 31b comprises an undamaged, larger-outer parabolic surround bar 32b, an undamaged, smaller-inner parabolic surround bar 33b, an undamaged hexagonal-based interlocking mesh system 35b with an embedded emblem snap-on overlay surround 21b of the present invention. Therefore, as shown in FIG. 8B, an improved automotive grille overlay with complete surround 31b of the present invention with identical configuration of a damaged manufacturer's automotive grille 31a is securely snapped on into place over the latter, thereby providing the appearance of a new or enhanced manufacturer's automotive grille, without the need of removing said damaged manufacturer's automotive grille 31a.

Figure 9A:
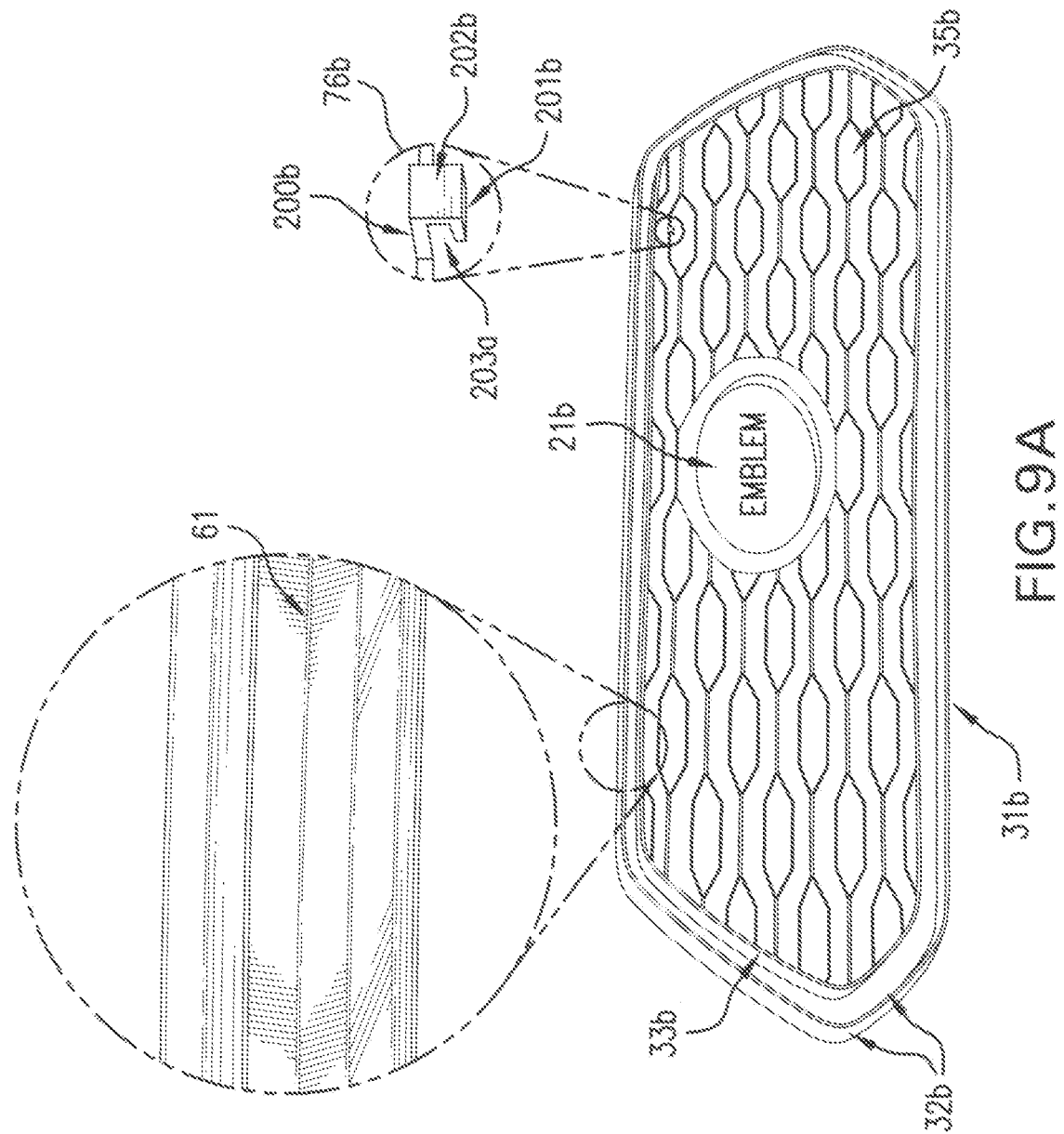
FIG. 9A illustrates a front elevated perspective view of the improved snap-on automotive grille overlay with complete surround, and having sideways parabolic surround members with polygon-based hexagonal interlocking mesh system, with an opening for an automotive emblem, and an exploded view of a region where tape is used during installation in combination with an exploded view of a region showing where a hook-shaped member of the snap-on technology of the present invention is used during installation.

Still, referring to the embodiment of this present invention, FIG. 9A illustrates a pre-installed snap-on automotive grille overlay with complete surround of the present invention 31b comprising a larger-outer parabolic surround bar 32b, a smaller-inner parabolic surround bar 33b, a hexagonal-based interlocking mesh system 35b with an embedded emblem snap-on overlay surround 21b of the present invention. The improved snap-on automotive grille overlay with complete surround 31b is fitted over a damaged existing manufacturers automotive grille by lacing the interior regions 61 of the surround of the present invention with, for example, 3M tape well known in the prior art.

Still referring to FIG. 9A, the snap on automotive grille overlay with surround 31b can be secured to an existing manufacturer's automotive grille with hook shaped members, such as 76b, etc. of the present invention. Said hook-shaped members 76b are comprised of a rigid polymer upper longitudinal lip arm 200b connected to a rigid polymer lower longitudinal lip arm 201b, wherein said rigid polymer upper longitudinal lip arm and rigid polymer lower longitudinal lip arm are connected by a rigid polymer perpendicular member 202b to form a continuous rigid polymer surface and a rigid polymer interior region 203b used for snapping on an automotive grille overlay with surround of the present invention over an existing manufacturer's automotive grille. Said rigid polymer lower longitudinal lip is at most 90% of the length of said rigid polymer upper longitudinal lip arm.

Referring to the embodiment of this present invention, FIG. OB illustrates a pre-installed snap-on automotive grille overlay with surround of the present invention 31b comprising a larger-outer parabolic surround bar 32b, a smaller-inner parabolic surround bar 33b, a hexagonal-based interlocking mesh system 35*b* with an embedded emblem snap-on overlay surround 21*b* of the present invention. The improved snap-on automotive grille overlay with surround 31*b* is fitted over a damaged existing manufacturers automotive grille by lacing the interior regions 61 of the surround of the present invention with, for example, 3M tape well known in the prior art.

Figure 9B:
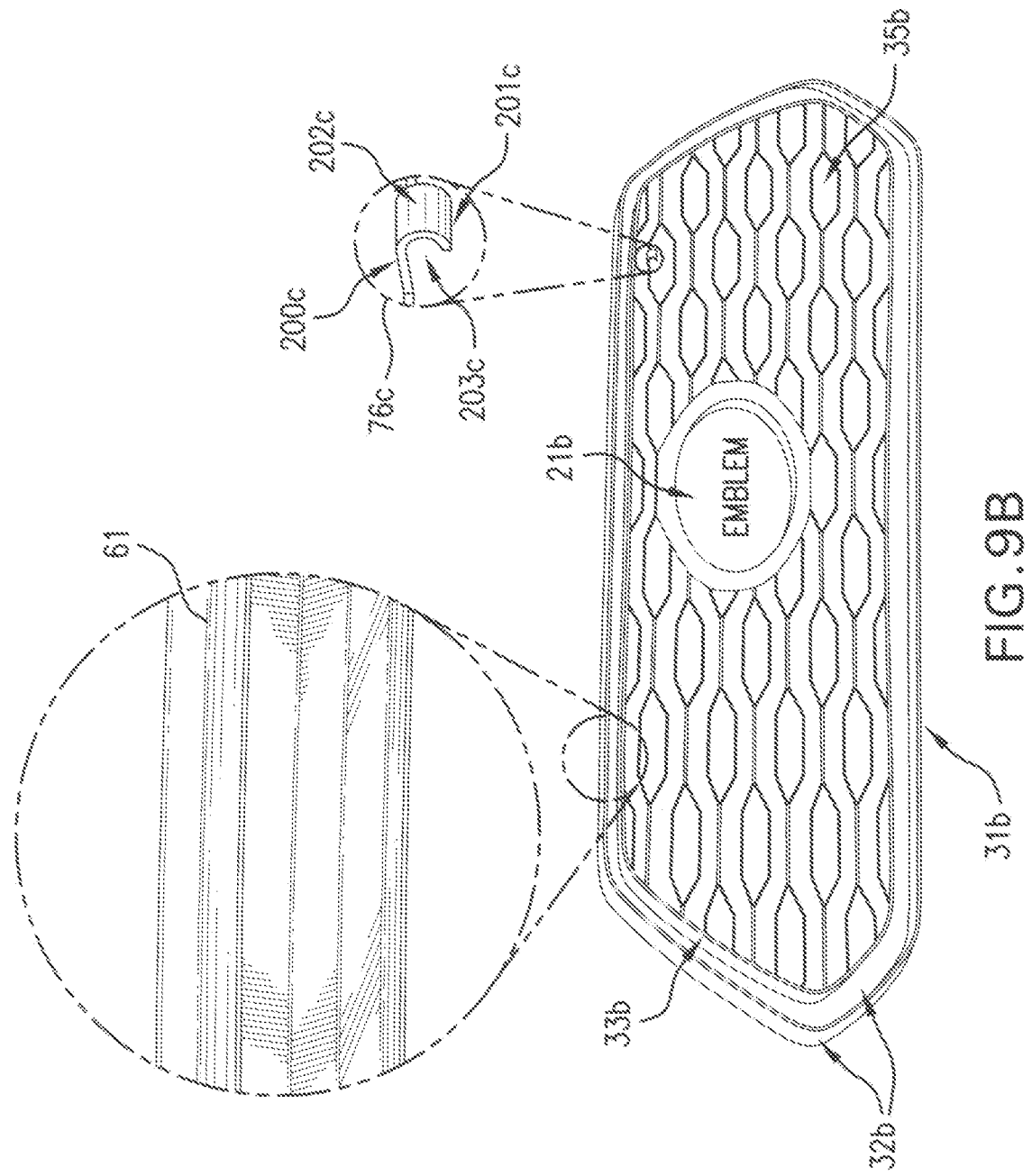
FIG. 9B illustrates a front elevated perspective view of the improved snap-on automotive grille overlay with complete surround and having sideways parabolic surround members with polygon-based hexagonal interlocking mesh system, with an opening for an automotive emblem, and an exploded view of a region where tape is used during installation in combination with an exploded view of a region showing where a hook-shaped member of the snap-on technology of the present invention is used during installation.

Still referring to FIG. 9B, the snap-on automotive grille overlay with complete surround 31*b* can be secured to an existing manufacturer's automotive grille with hook shaped members, such as 76*c*, etc. of the present invention. Said hook-shaped members 76*c* are comprised of a rigid polymer upper longitudinal lip arm 200*c* connected to a rigid polymer lower longitudinal lip arm 201*c*, wherein said rigid polymer upper longitudinal lip arm and rigid polymer lower longitudinal lip arm are connected by a rigid polymer acutely curved member 202*c* to form a continuous rigid polymer surface and a rigid polymer interior region 203*c* used for snapping on an automotive grille overlay with surround of the present invention over an existing manufacturers automotive grille. Said rigid polymer lower longitudinal lip is at most 90% of the length of said rigid polymer upper longitudinal lip arm.

Referring to the embodiment of this present invention, FIG. 9C illustrates a pre-installed snap-on automotive grille overlay with complete surround of the present invention 31*b* comprising a larger-outer parabolic surround bar 32*b*, a smaller-inner parabolic surround bar 33*b*, a hexagonal-based interlocking mesh system 35*b* with an embedded emblem snap-on overlay surround 21*b* of the present invention. The improved snap-on automotive grille overlay with surround 31*b* is fitted over a damaged existing manufacturer's automotive grille by lacing the interior regions 61 of the surround of the present invention with, for example, 3M tape well known in the prior art.

Still referring to FIG. 9C, the snap-on automotive grille overlay with surround 31*b* can be secured to an existing manufacturer's automotive grille with hook shaped members, such as 76*d*, etc. of the present invention. Said hook-shaped members 76*d* are comprised of a rigid polymer upper longitudinal lip arm 200*d* connected to a rigid polymer lower longitudinal lip arm 201*d*, wherein said rigid polymer upper longitudinal lip arm and rigid polymer lower longitudinal lip arm are connected by a rigid polymer acutely perpendicular member 202*d* to form a continuous rigid polymer surface and a rigid polymer interior region 203*d* used for snapping on an automotive grille overlay with surround of the present invention over an existing manufacturer's automotive grille. Said rigid polymer lower longitudinal lip is at most 90% of the length of said rigid polymer upper longitudinal lip arm.

Figure 9D:
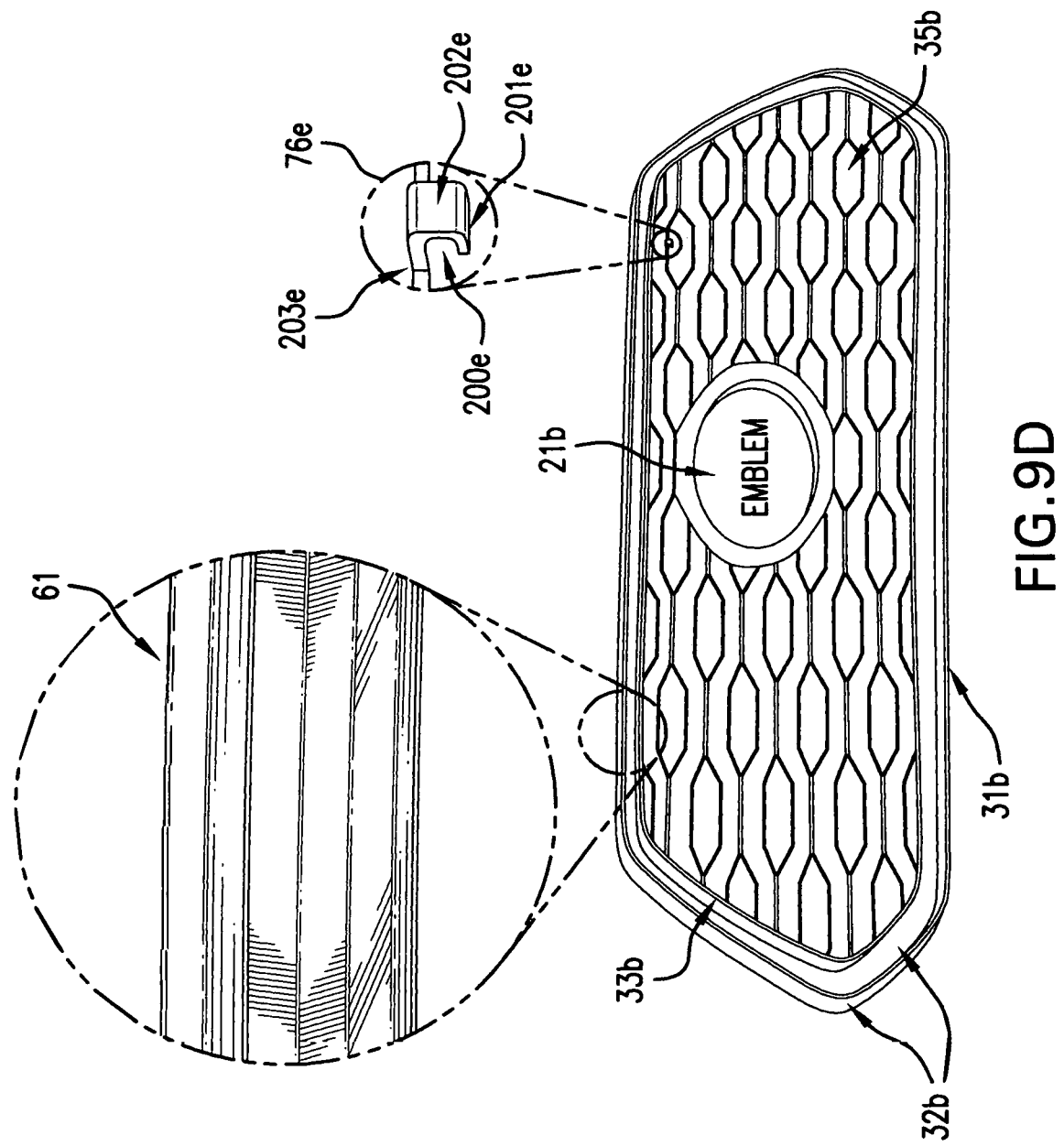
FIG. 9D illustrates a front elevated perspective view of the improved snap-on automotive grille overlay with complete surround, and having sideways parabolic surround members with polygon-based hexagonal interlocking mesh system, with an opening for an automotive emblem, and an exploded view of a region where tape is used during installation in combination with an exploded view of a region showing where a hook-shaped member of the snap-on technology of the present invention is used during installation.

Referring to the embodiment of this present invention, FIG. 9D illustrates a pre-installed snap-on automotive grille overlay with complete surround of the present invention 31*b* comprising a larger-outer parabolic surround bar 32*b*, a smaller-inner parabolic surround bar 33*b*, a hexagonal-based interlocking mesh system 35*b* with an embedded emblem snap-on overlay surround 21*b* of the present invention. The improved snap-on automotive grille overlay with complete surround 31*b* is fitted over a damaged existing manufacturer's automotive grille by lacing the interior regions 61 of the surround of the present invention with, for example, 3M tape well known in the prior art.

Still referring to FIG. 9D, the snap-on automotive grille overlay with complete surround 31*b* can be secured to an existing manufacturer's automotive grille with hook-shaped members, such as 76*e*, etc. of the present invention. Said hook-shaped members 76*e* are comprised of a rigid polymer upper longitudinal lip arm 200*e* connected to a rigid polymer lower longitudinal lip arm 201*e*, wherein said rigid polymer upper longitudinal lip arm and rigid polymer lower longitudinal lip arm are connected by a rigid polymer perpendicular member 202*e* to form a continuous rigid polymer surface and a rigid polymer interior region 203*e* used for snapping on an automotive grille overlay with complete surround of the present invention over an existing manufacturer's automotive grille. Said rigid polymer lower longitudinal lip is at most 60% of the length of said rigid polymer upper longitudinal lip arm.

Figure 10A:
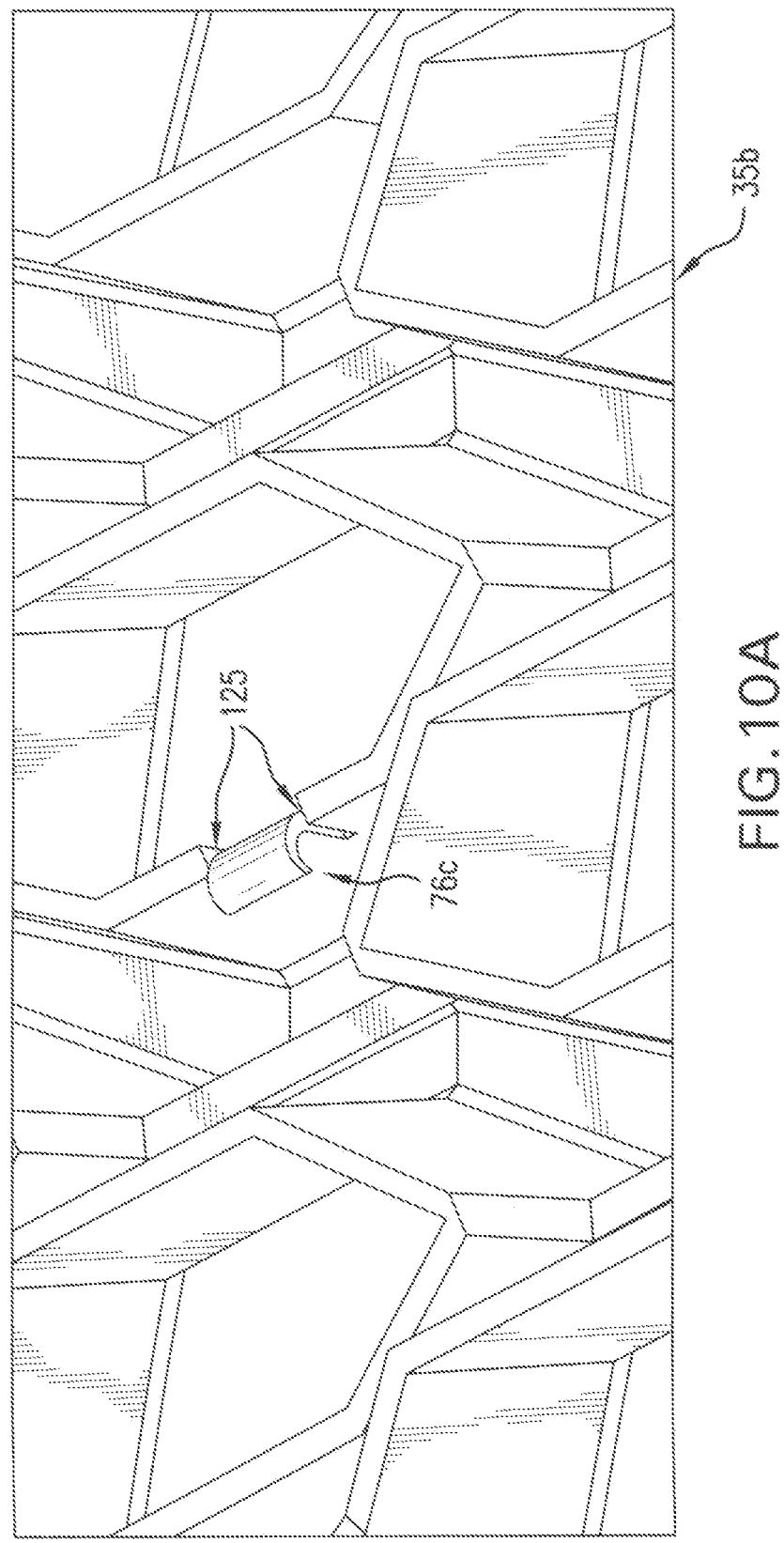
FIG. 10A illustrates an exploded frontal perspective view of a polygon-based hexagonal interlocking mesh system showing a sample hook-shaped member of the snap-on technology of the present invention designed in said interlocking mesh system with a pre-cut section.
Figure 10B:
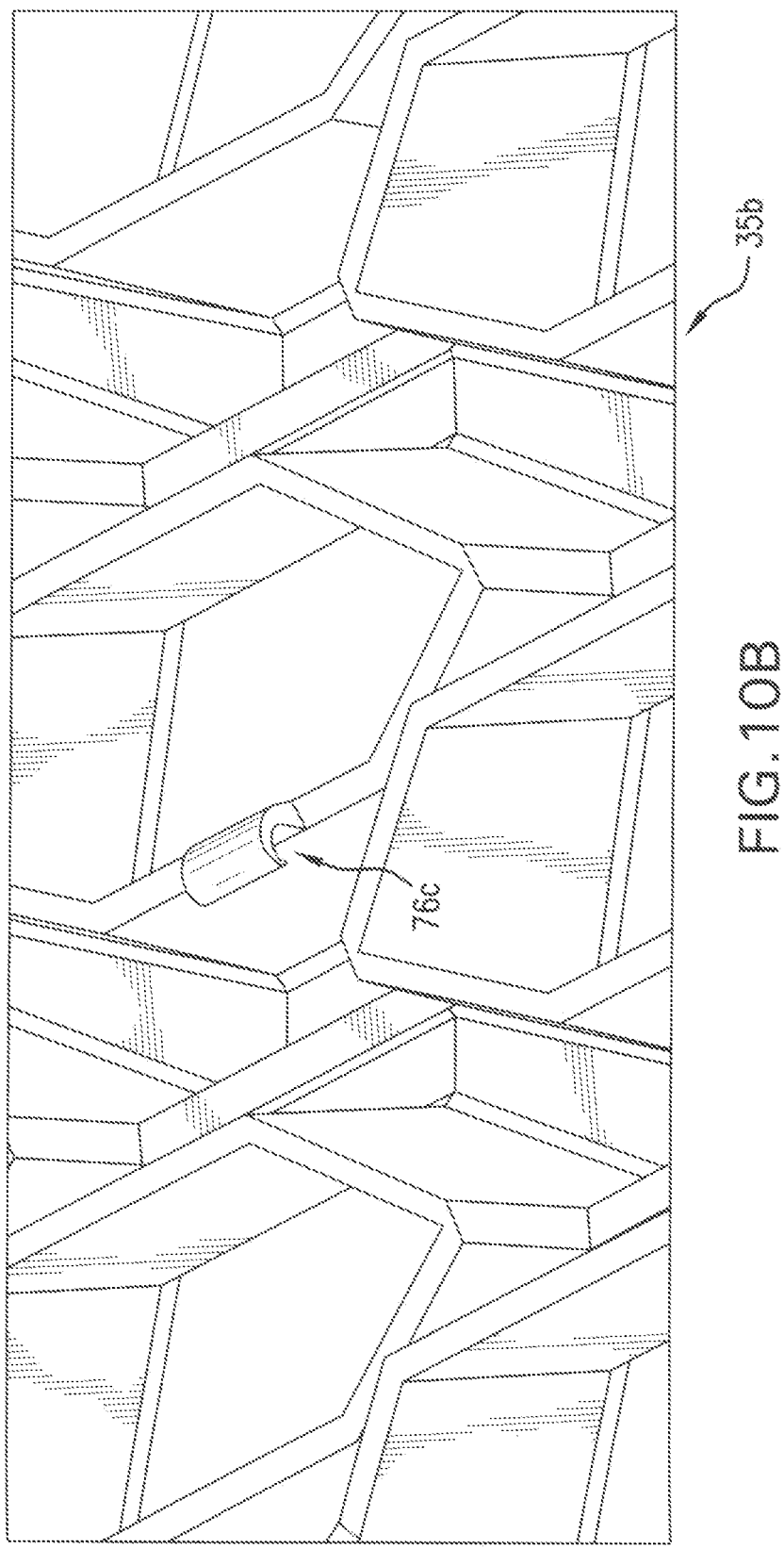
FIG. 10B illustrates an exploded frontal perspective view of a polygon-based hexagonal interlocking mesh system showing a sample hook-shaped member of the snap-on technology of the present invention designed in said interlocking mesh system without a pre cut section.

FIG. 10A is a enlarged front perspective view of the hexagonal-based interlocking mesh system 35*b* with a hook-shaped member such as 76*e* of FIG. 7A embedded therein. Said embedded hook-shaped member is installed in a precut section 125 within the hexagonal-based interlocking mesh, which assist with unsnapping the hook-shaped member with the aid of a screw driver or similar tools, and by extension unsnapping a previously installed snap-on automotive grille overlay with complete surround of the present invention. FIG. 10B is an enlarged front perspective view of the hexagonal-based interlocking mesh system 35*b*, which is similar to FIG. 10A except that the former has a hook-shaped member such as 76*c* of FIG. 7A installed without a precut section 125 as depicted in FIG. 10B, whereas the latter has a hook-shaped member such as 76*c* of FIG. 7A with a precut section 125 as depicted in FIG. 10A.

Figure 11B:
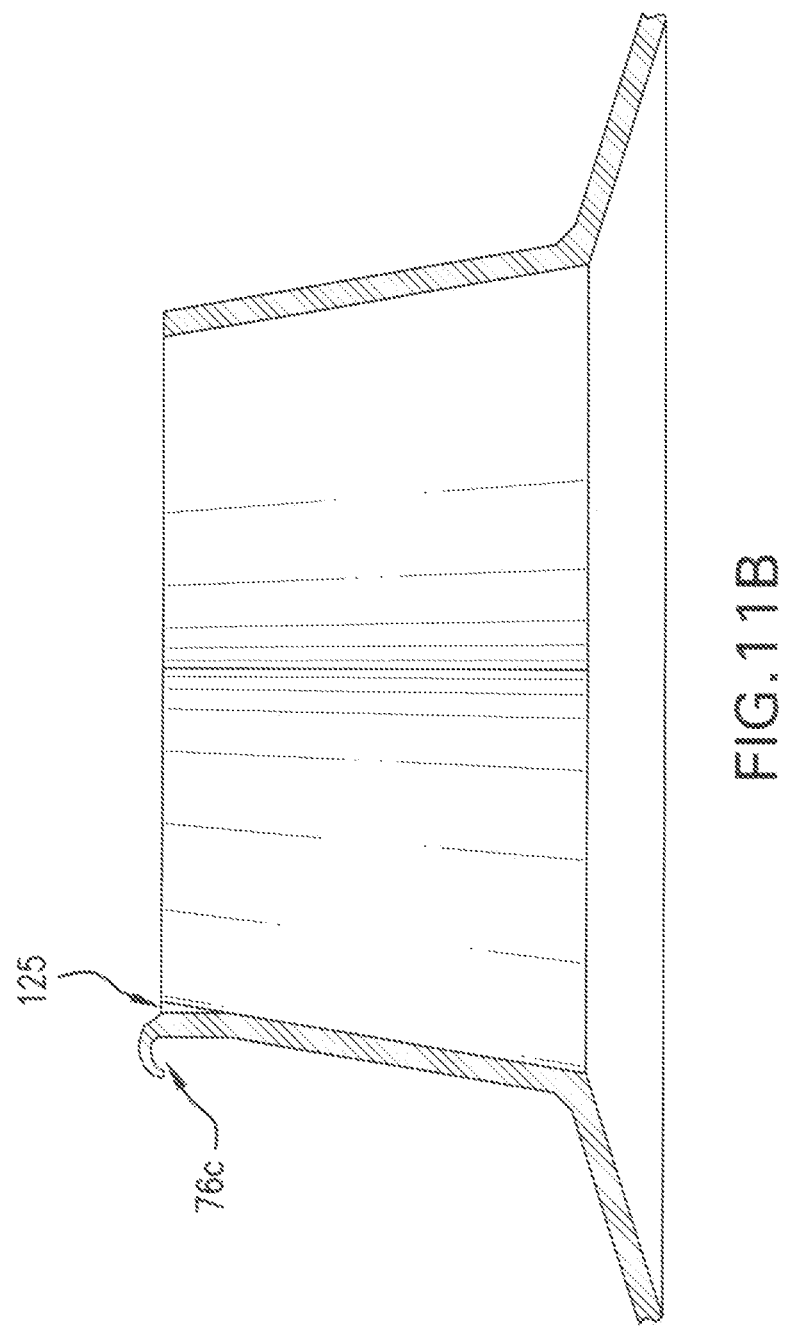
FIG. 11B illustrates an enlarged cross sectional area of FIG. 11A, which shows an enlarged view of a pre-cut section area bearing a hook-shaped member of the present invention.

FIG. 11A is an enlarged rear perspective view of the hexagonal-based interlocking mesh system 35*b* with a hook-shaped member such as 76*c* of FIG. 7A embedded therein. Said embedded hook-shaped member is installed in a precut section 125 within the hexagonal-based interlocking mesh, which assist with unsnapping the hook-shaped member with the aid of a screw driver or similar tools, and by extension unsnapping a previously installed snap-on automotive grille overlay with complete surround of the present invention. FIG. 11B is a perspective cross sectional view of FIG. 11A depicting the hook-shaped member 76*e* of FIG. 7A and the precut section 125 within the hexagonal-based interlocking mesh 35*b*.

Figure 12A:
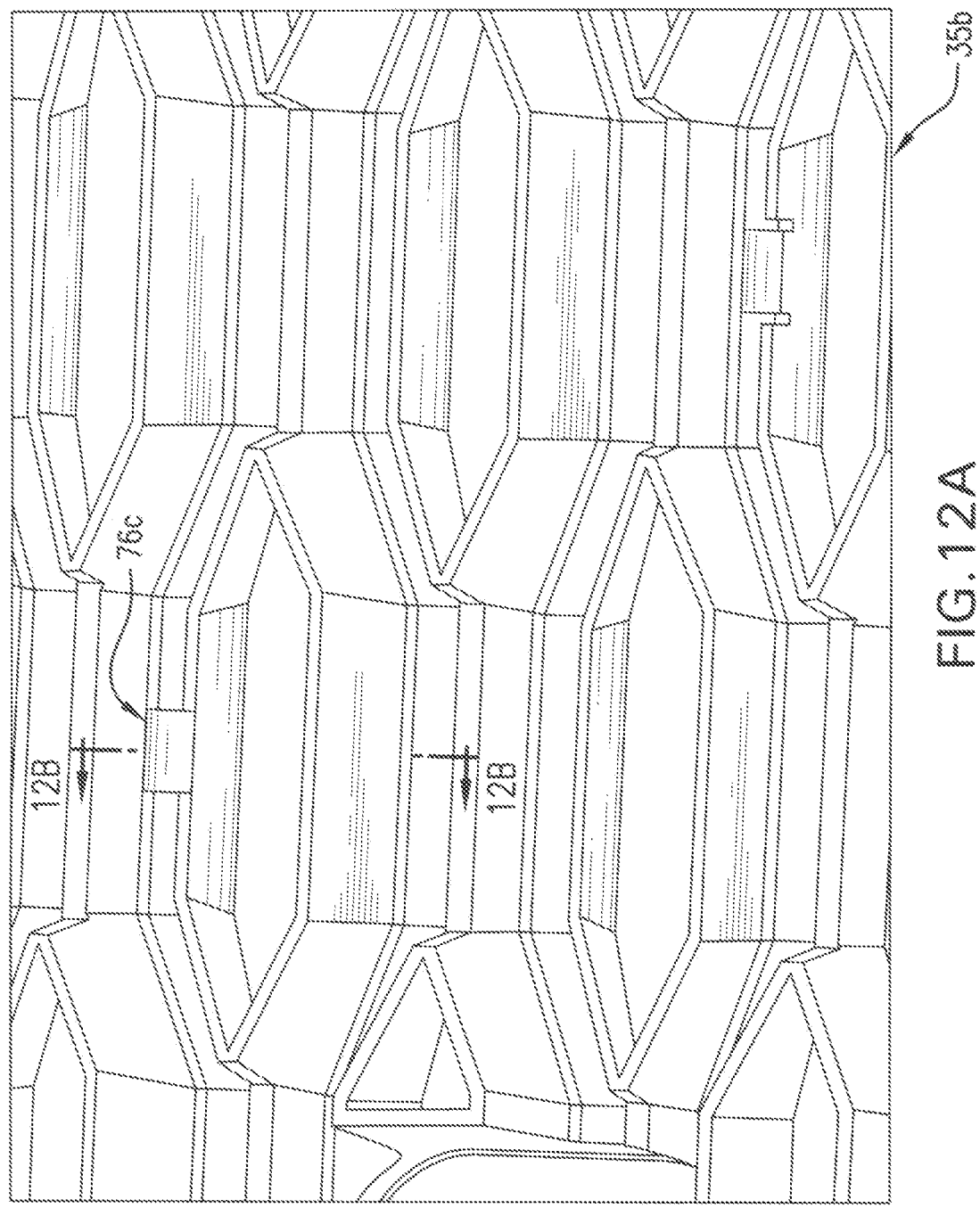
FIG. 12A illustrates an exploded rear cross sectional view of FIG. 10B with a polygon-based hexagonal interlocking mesh system showing a sample hook-shaped member of the snap-on technology of the present invention designed in said interlocking mesh system with no pre-cut section.
Figure 12B:
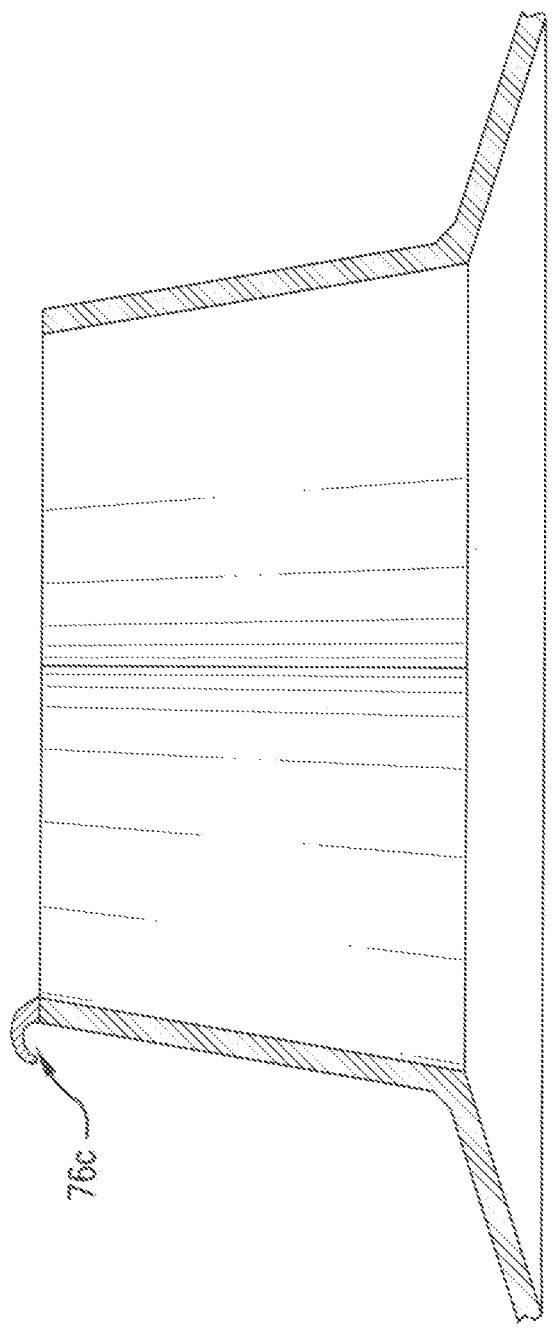
FIG. 12B illustrates an enlarged cross sectional area of FIG. 12A, which shows an enlarged view with no pre-cut section area bearing a hook-shaped member of the present invention.

FIG. 12A is an enlarged rear perspective view of the hexagonal-based interlocking mesh system 35*b* with a hook-shaped member such as 76*c* of FIG. 7A embedded therein. Said embedded hook-shaped member is installed without a precut section 125 within the hexagonal-based interlocking mesh. FIG. 12B Is a perspective cross sectional view of FIG. 12A depicting the hook-shaped member 76*c* of FIG. 7A with no precut section 125 within the hexagonal-based interlocking mesh 35*b*.

Figure 13:
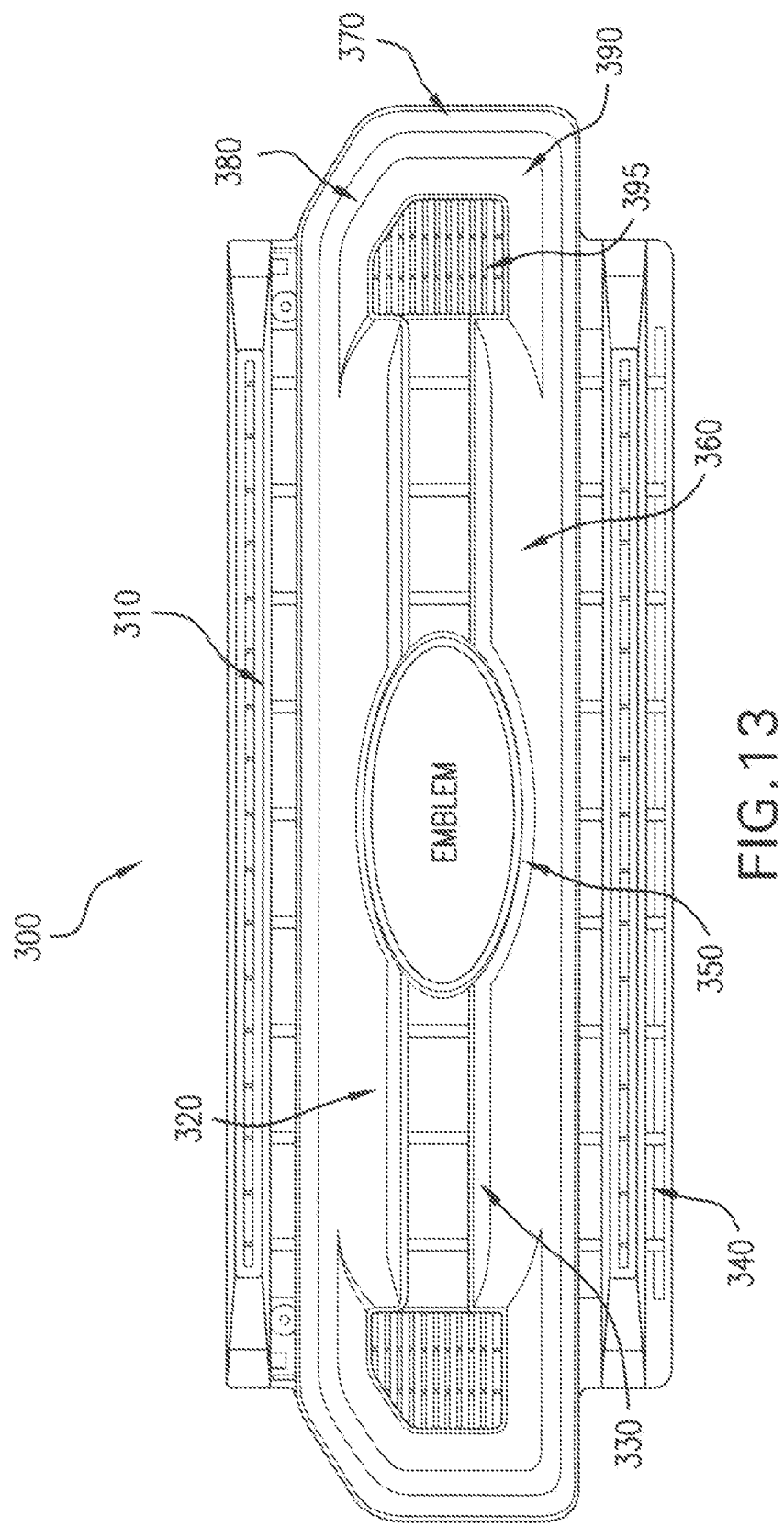
FIG. 13 illustrates a front elevated perspective view of the improved snap-on automotive grille overlay with complete surround having an opening for an automotive emblem, and whom interior regions are capable of being fitted with hook-shaped members of the snap-on technology of the present invention.

Referring to a preferred embodiment of this invention. FIG. 13 illustrates a pre-installed snap-on automotive grille overlay with surround complete of the present invention 300 comprising a upper level surround panel 310, a lower level surround panel 340, a central upper longitudinal surround panel 320, a central middle longitudinal surround panel 330, an emblem overlay surround panel 350, a central lower longitudinal surround panel 360, a primary boundary peripheral surround panel 370, a secondary boundary peripheral surround panel 380, a tertiary boundary peripheral surround panel 390, and mesh insert overlay surround panel.

Figure 14:
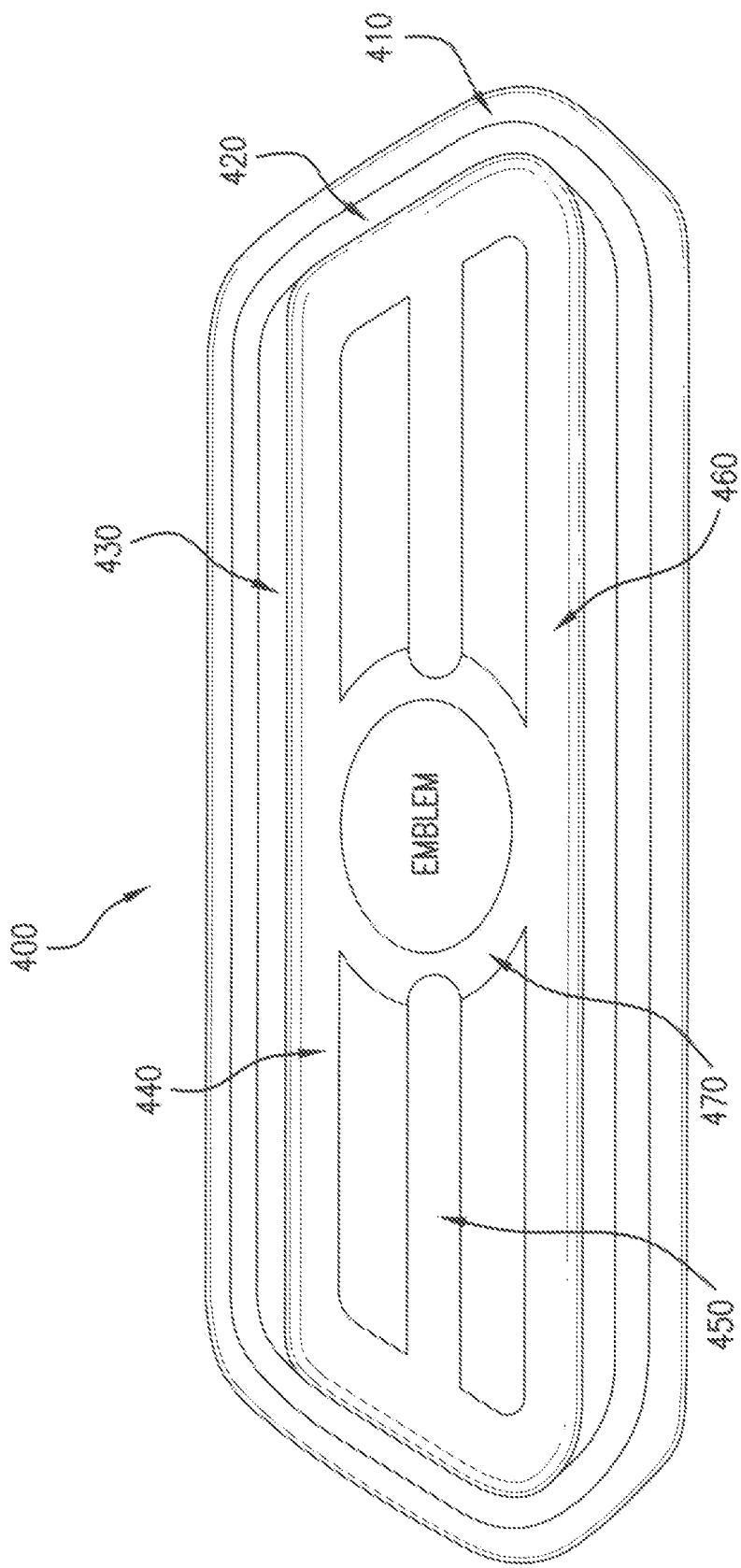
FIG. 14 illustrates a front elevated perspective view of the improved snap-on automotive grille overlay with complete surround having an opening for an automotive emblem, and whom interior regions are capable of being fitted with hook-shaped members of the snap-on technology of the present invention.

FIG. 14 is another preferred embodiment of this invention, which illustrates a pre-installed snap-on automotive grille overlay with complete surround of the present invention 400 comprising a primary boundary peripheral surround panel 410, a secondary boundary peripheral surround panel 420, a ternary boundary peripheral surround panel 430, a central upper longitudinal surround panel 440, a central middle longitudinal surround panel 450, a central lower longitudinal surround panel 460 and an emblem overlay surround panel.

Each surround panel of FIG. 13 and FIG. 14 are made of rigid polymer. The snap-on process is accomplished by using said rigid polymer rear and boundary interior regions of the snap-on grille overlay with complete surround of the present invention to grippingly engage corresponding exterior regions of a damaged manufacturer's existing grille. That is, precisely engineered and rigid polymer hook-shaped members that protrudes along pre-determined boundary interior regions of the snap-on grille overlay with complete surround engages corresponding and frontal portions of an existing damaged manufacturer's grille. As such after installation, the rigid polymer interior regions of the present invention containing the snap-on technology engage corresponding regions of a manufacturer's damaged existing grille, wherein upon engagement of corresponding portions of a damaged existing manufacturers grille, the present invention's automotive grille overlay with complete surround is firmly affixed to said manufacturer's grille insert leaving no room for vibrations or interplay when an automobile is in motion.

Figure 15A:
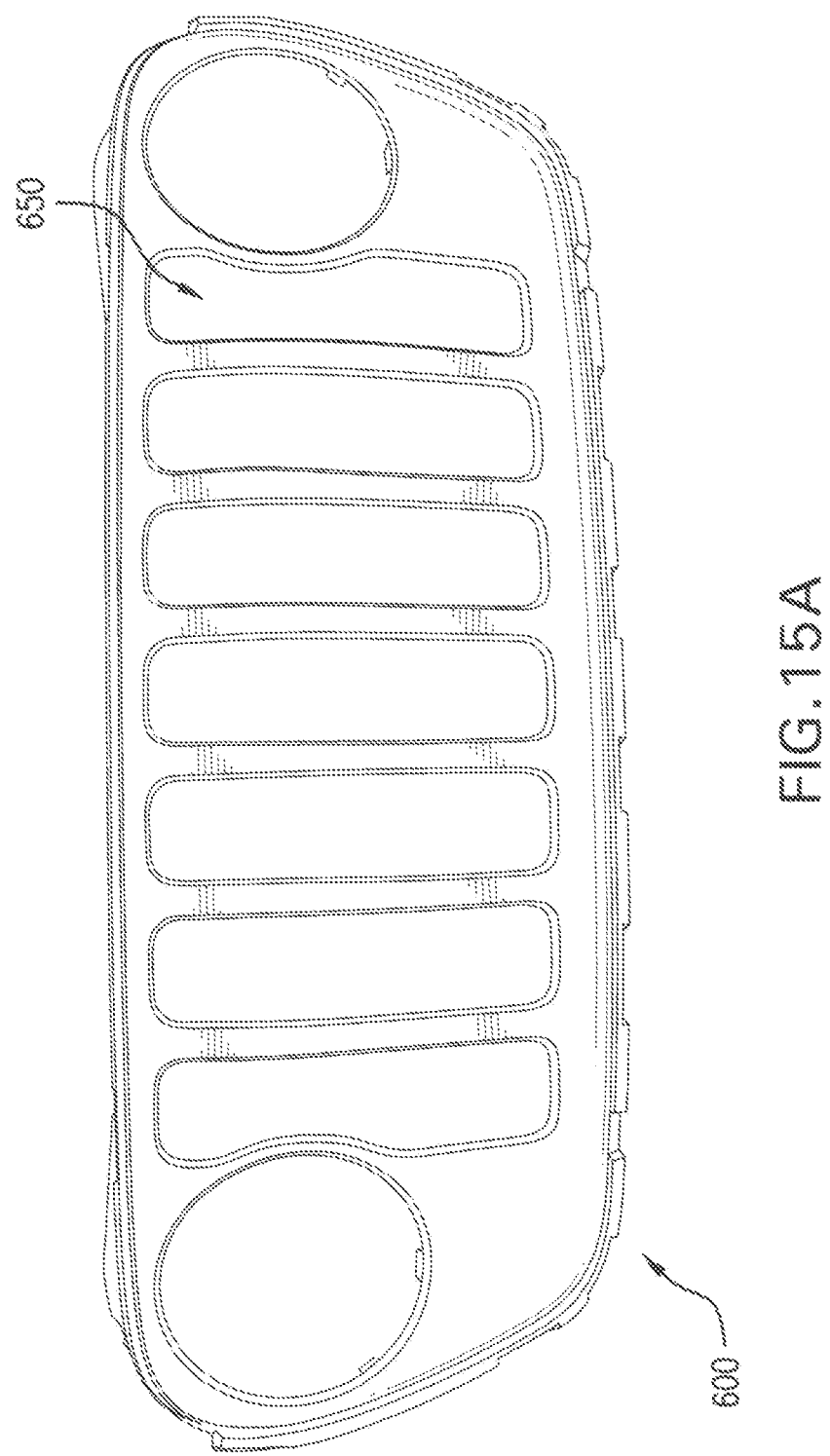
FIG. 15A illustrates a front elevated perspective view of the improved snap-on automotive grille overlay with complete surround of the present invention with opening for convective air flow between the engine and the environment.

FIG. 15A illustrates a front elevated perspective view of the improved snap-on automotive grille overlay with complete surround 600 of the present invention comprising an oval rectangular opening 650 for convective air flow between the engine and the environment. FIG. 15B shows the improved automotive grille overlay with complete surround 600 with said opening 650 described in FIG. 15A prior to snap-on installation over an identical damaged manufacturer's grille 601.

Figure 15C:
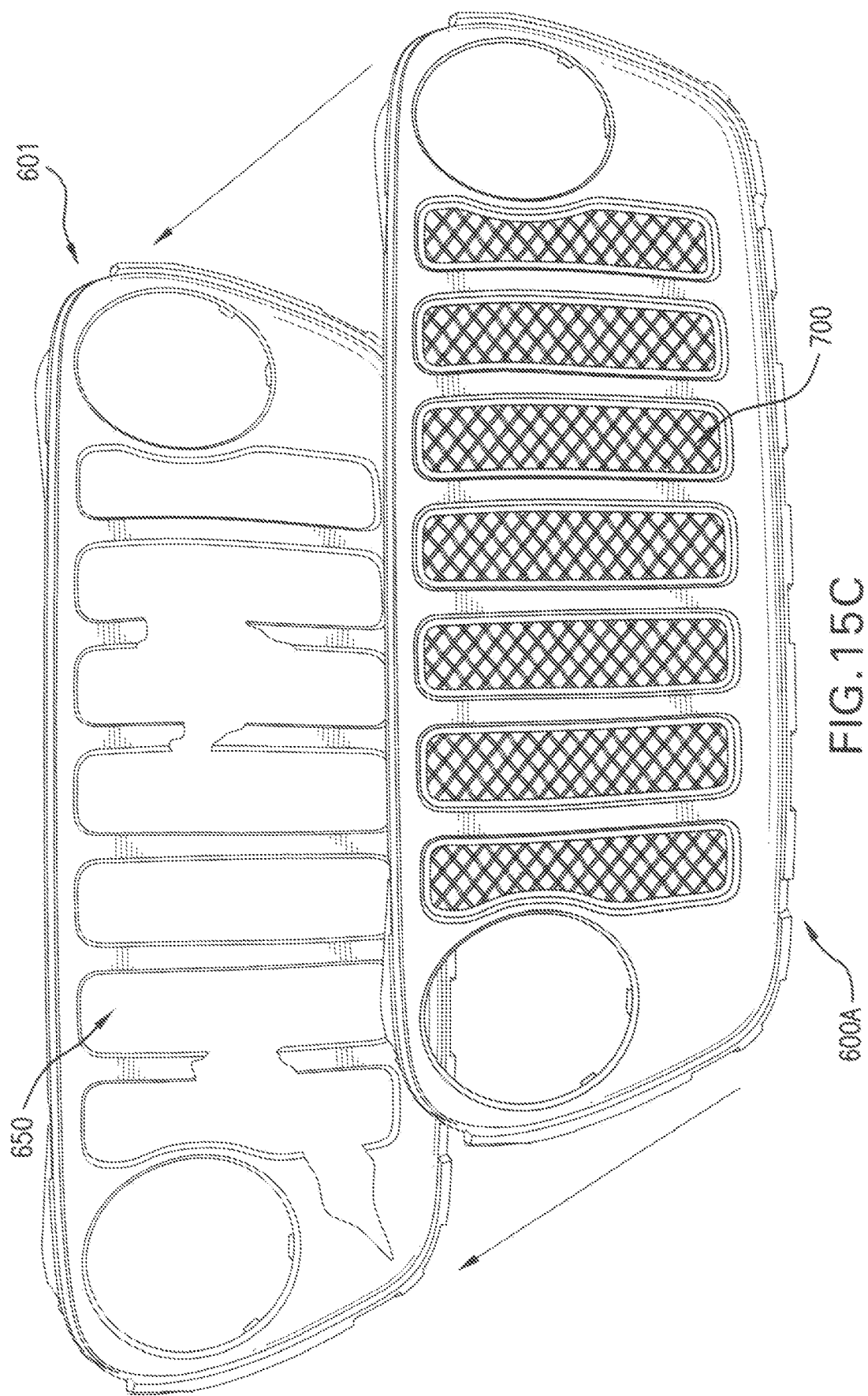
FIG. 15C illustrates a front elevated perspective view of the improved snap-on automotive grille overlay with complete surround of the present invention prior to snap-on installation over a damaged manufacturer's grille, and having a mesh screen for convective air How between the engine and the environment.

Still referring to the embodiment of this present invention, FIG. 15C illustrates a front elevated perspective view of the improved snap-on automotive grille overlay with complete surround 600A of the present invention comprising a mesh screen fitted in the opening 650 described in FIG. 15A used for convective air flow between the engine and the environment. Said improved snap-on automotive grille overlay with complete surround 600 and mesh screen 700 is seen prior to installation over a damaged manufacturers grille 601 without a mesh, such that the mesh portion 700 of the improved snap-on automotive grille overlay with complete surround 600 covers the oval rectangular opening 650 of the damaged manufacturer's grille in its entirety with no room for displacement.

Figure 16A:
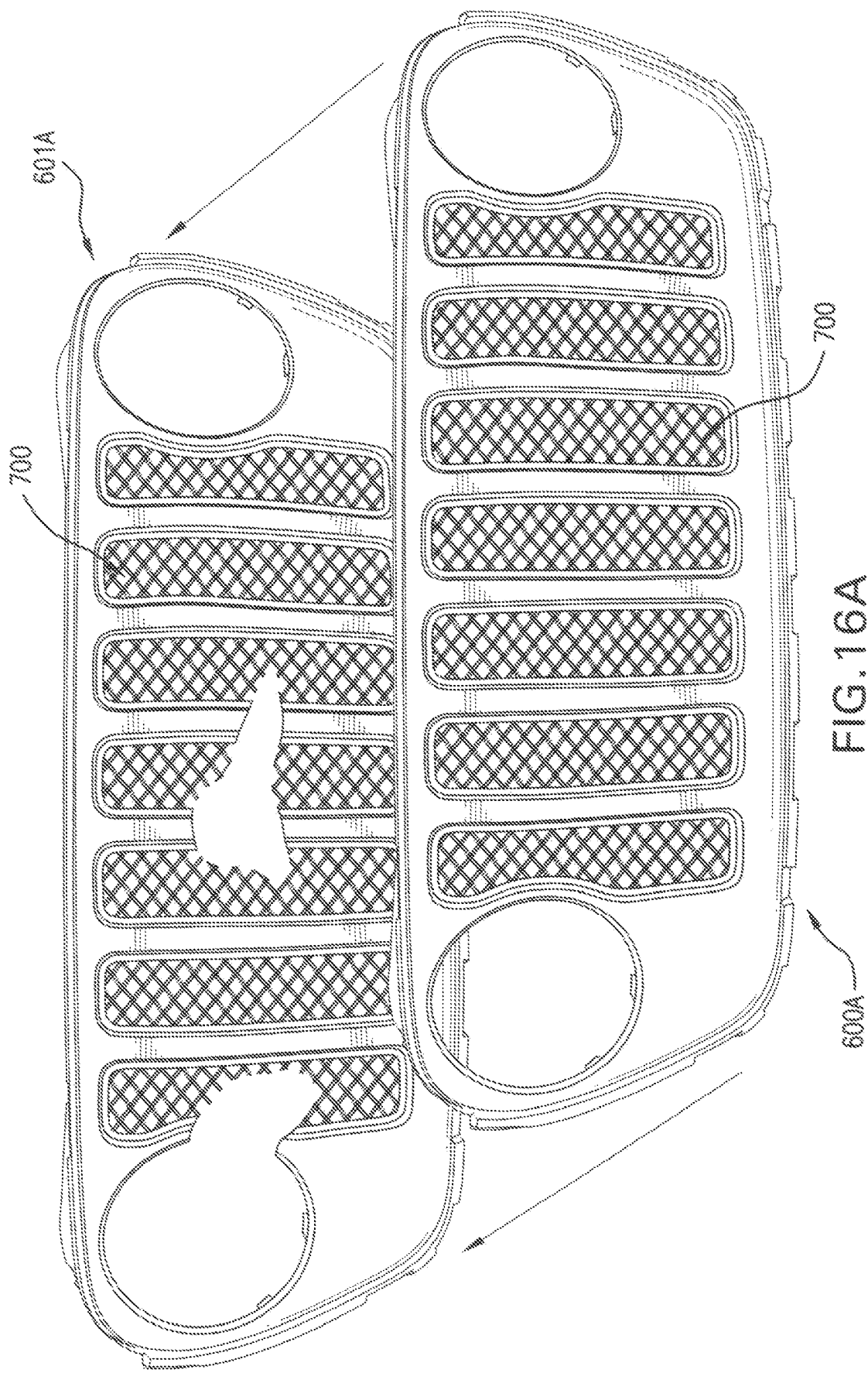
FIG. 16A illustrates a front elevated perspective view of the improved snap-on automotive grille overlay with complete surround of the present invention having a mesh screen for convective air flow prior to snap-on installation over an identical damaged manufacturer's grille.

FIG. 16A illustrates a front elevated perspective view of the improved snap-on automotive grille overlay with complete surround 600A of the present invention comprising a mesh screen fitted in the oval-rectangular opening 650 described in FIG. 15A, wherein said improved snap-on automotive grille overlay with complete surround of the present invention is seen prior to installation over a damaged manufacturer's grille 601A with a mesh 700, such that corresponding portions of the improved snap-on automotive grille overlay with complete surround 600A is snapped over and affixed firmly to corresponding portions of the damaged manufacturer's grille 601A.

Figure 16B:
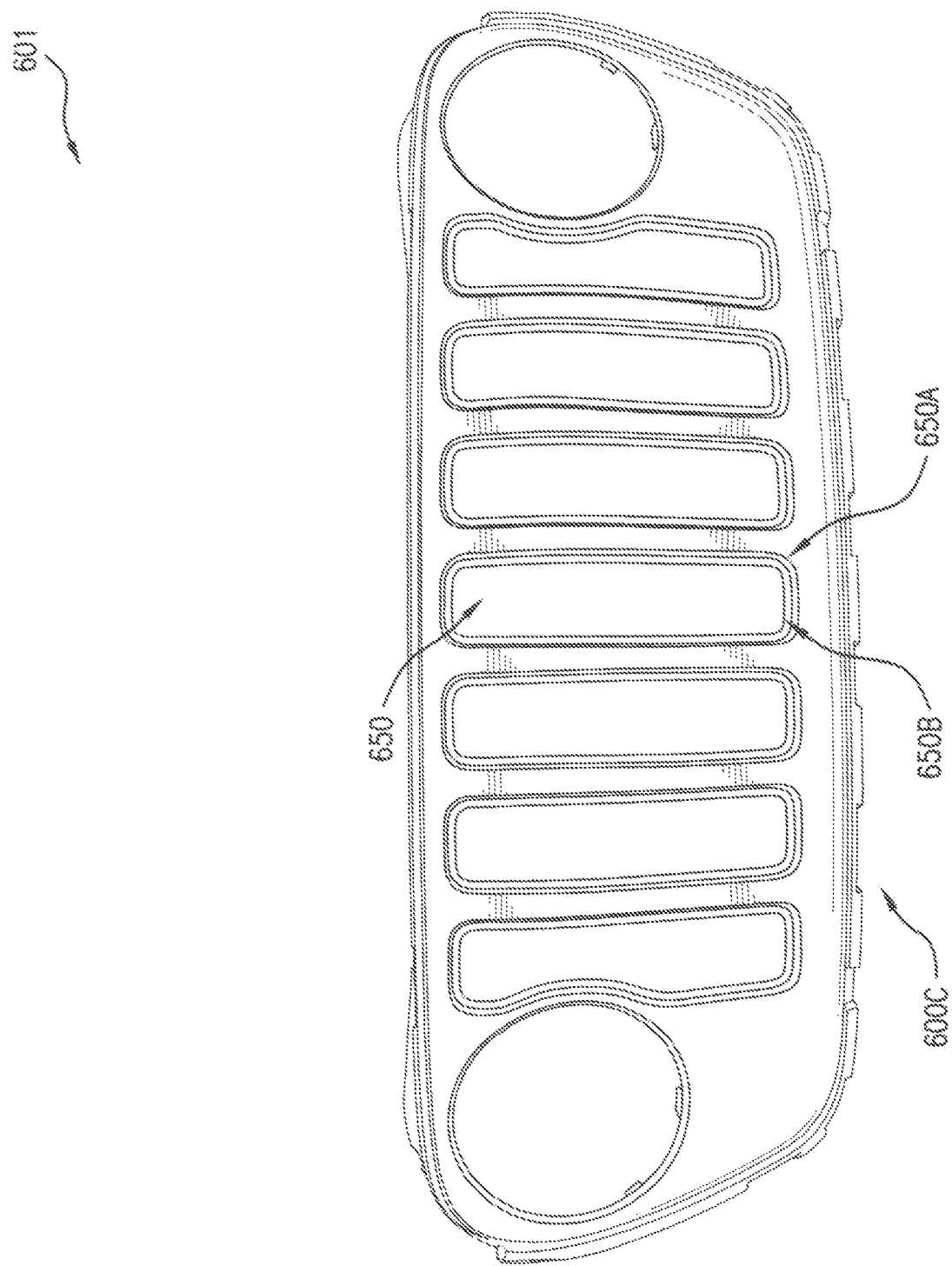
FIG. 16B illustrates a front elevated perspective view of the improved snap-on automotive grille overlay with complete surround having openings for convective air flow and oval surround inserts without meshes installed along the circumference of said openings, wherein said oval surround inserts art capable of being chromed to exhibit a decorative finish.

FIG. 16B illustrates a front elevated perspective view of the improved snap-on automotive grille overlay with complete surround of the present invention 600C comprising an oval-rectangular opening 650, a peripheral boundary wall of said opening 650A and an oval-rectangular surround insert 650B fated along the perimeter of the peripheral boundary wall 650A of said oval rectangular opening 650. Said surround insert 650B is capable of being fitted with a decorative finish.

Figure 17B:
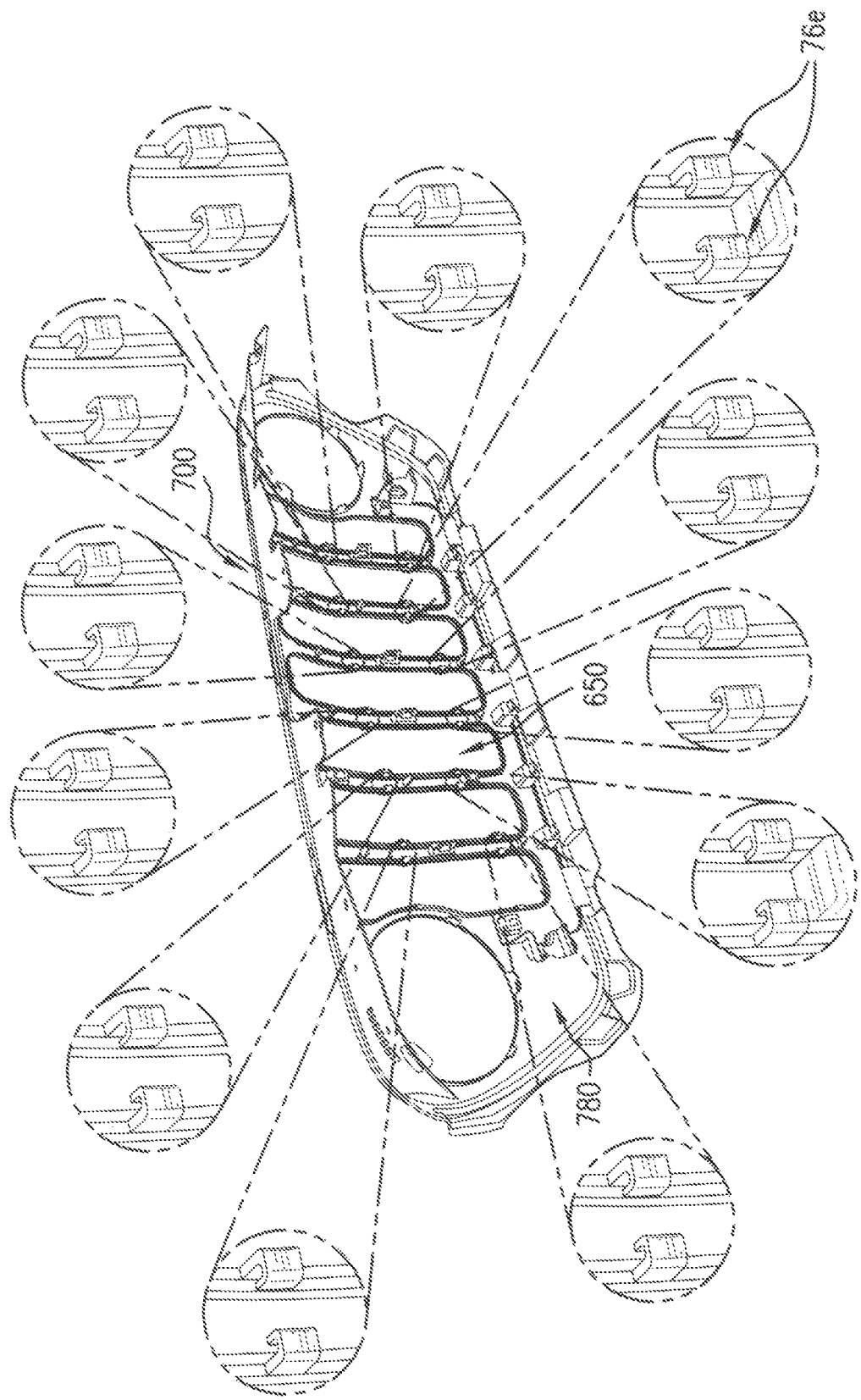
FIG. 17B illustrate a rear elevated perspective view of the automotive grille overlay with complete surround and having hook-shaped members of the present invention used to firmly affix said grille over a damaged manufacturer's grille during installation.
Figure 17C:
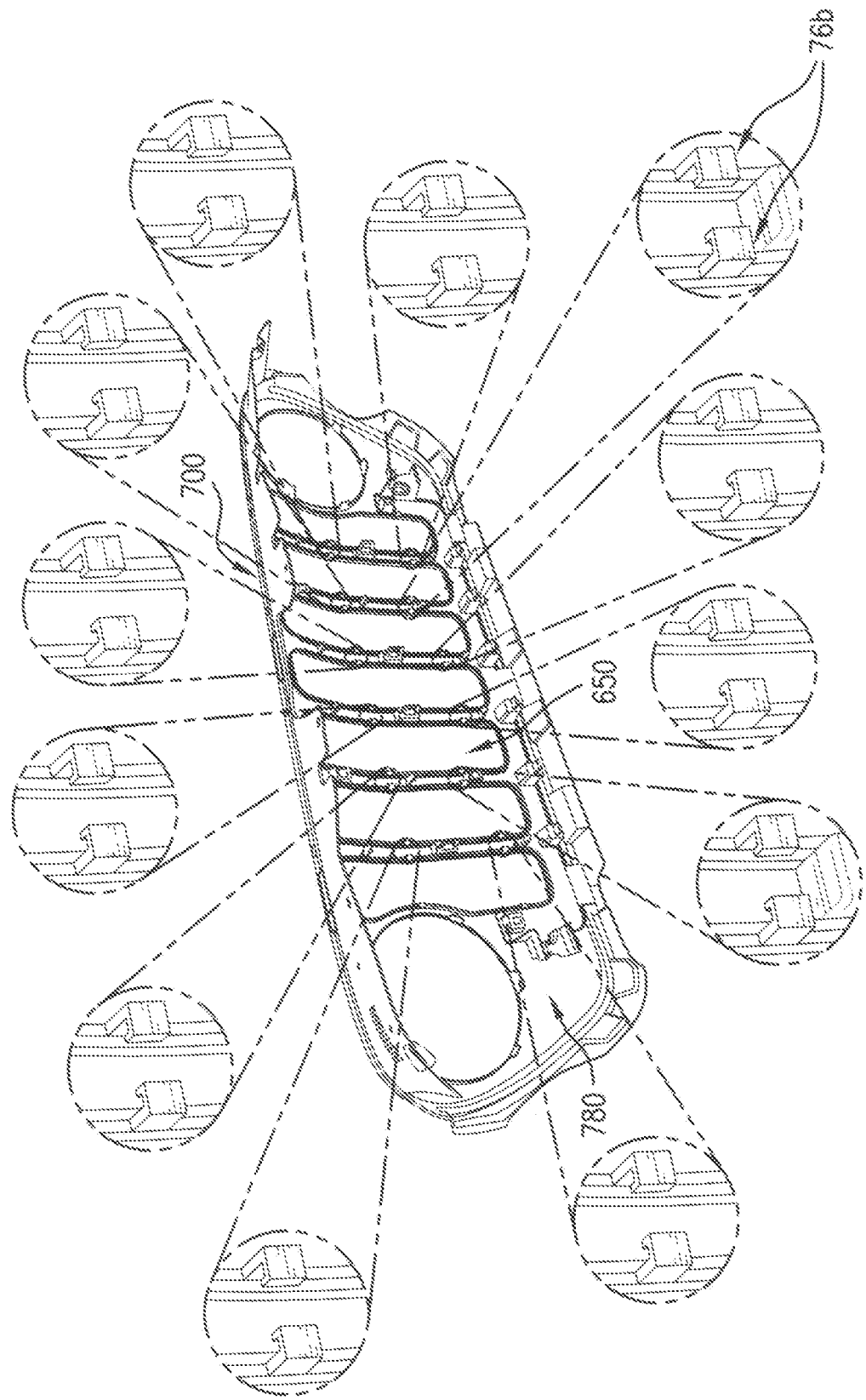
FIG. 17A illustrate a rear elevated perspective view of the automotive grille overlay with complete surround and having hook-shaped members of the present invention used to firmly affix said grille over a damaged manufacturer's grille during installation.
Figure 17D:
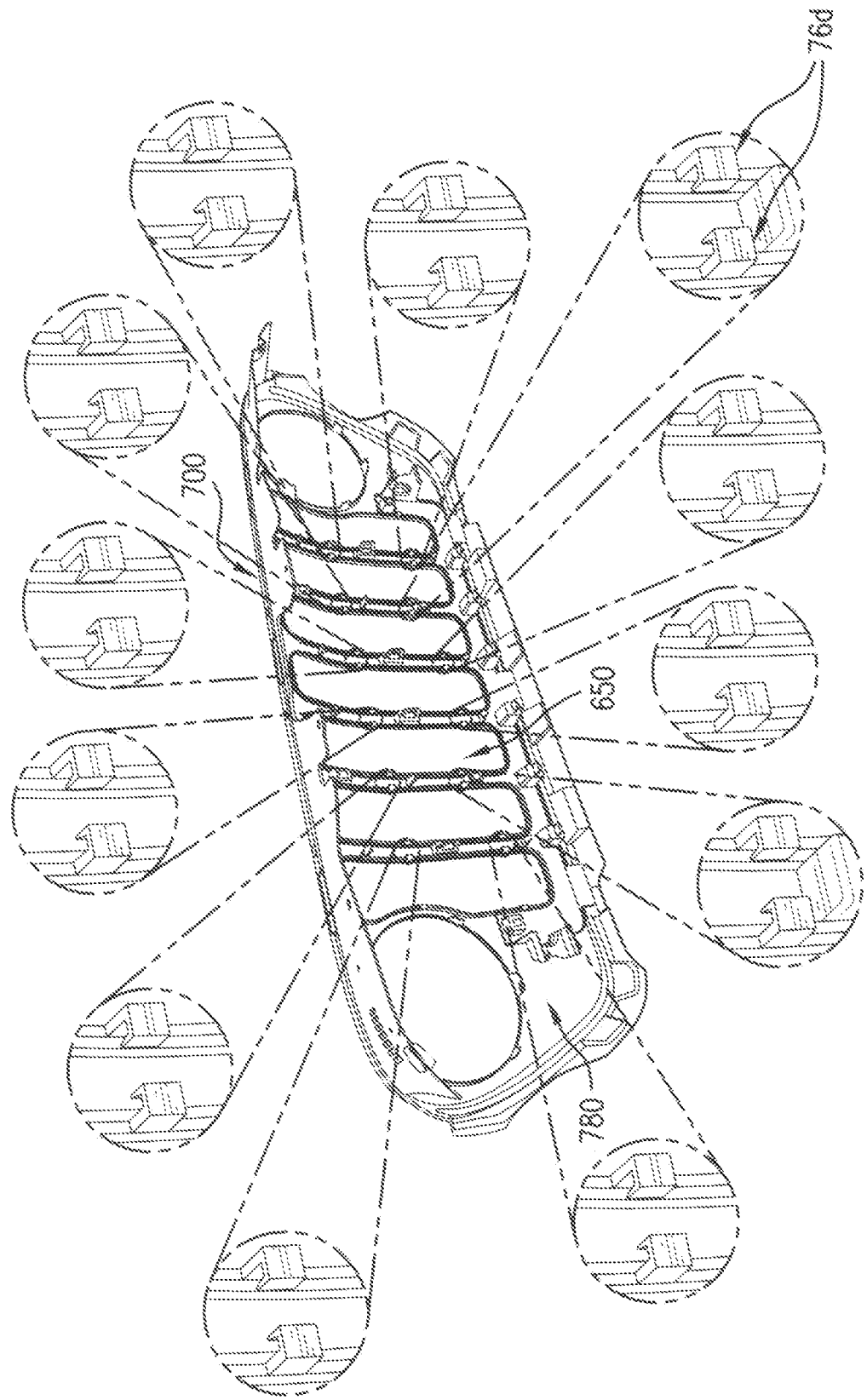

FIG. 17A illustrates a rear perspective view of a pre-installed snap-on automotive grille overlay with surround of the present invention 700 comprising a rigid polymer rear panel surface 780, an opening 650, which may or may not contain a mesh insert overlay surround, and rigid polymer hook-shaped members 76c as depicted in FIG. 4C of the present invention. FIG. 17B illustrates a rear perspective view of a pre-installed snap-on automotive grille overlay with surround of the present invention 700 comprising a rigid polymer rear panel surface 780, an opening 650, which may or may not contain a mesh insert overlay surround, and rigid polymer hook-shaped members 76e as depicted in FIG. 4E of the present invention. FIG. 17C illustrates a rear perspective view of a pre-installed snap-on automotive grille overlay with surround of the present invention 700 comprising a rigid polymer rear panel surface 780, an opening 650, which may or may not contain a mesh insert overlay surround, and rigid polymer hook-shaped members 76b as depicted in FIG. 4B of the present invention. FIG. 17D illustrates a rear perspective view of a pre-installed snap on automotive grille overlay with surround of the present invention 700 comprising a rigid polymer rear panel surface 780, an opening 650, which may or may not contain a mesh insert overlay surround, and rigid polymer hook-shaped members 76d as depicted in FIG. 4D of the present invention.

The snap-on process is accomplished by using said rigid polymer rear and boundary interior regions of the snap-on grille overlay with surround of the present invention to grippingly engage corresponding exterior regions of a damaged manufacturer's existing grille. That is, precisely engineered and rigid polymer hook-shaped members that protrude along pre-determined boundary interior regions of the snap-on grille overlay with surround and occasionally, such as depicted in FIGS. 17A, 17B. 17C and 17D, said rigid polymer hook-shaped members are engineered to protrude from interior regions within the surround of the present invention engaging corresponding and frontal portions of an existing damaged manufacturer's grille. As such after installation, the rigid polymer interior regions of the present invention containing the snap-on technology engage corresponding regions of a manufacturer's damaged existing grille, wherein upon engagement of corresponding portions of a damaged existing manufacturers grille, the present invention's automotive grille overlay with surround is firmly affixed to said manufacturer's grille insert leaving no room for vibrations or interplay when an automobile is in motion.

That to produce the finished embodiment described in the specification, suitable polymer materials well known in the art are first selected and tested for strength, durability, malleability and resistance, etc. to meet after-market standards and particularly to meet the rigid original equipment manufacturer (OEM) standards demanded by established automobile manufacturers and distributors. Suitable rigid polymer materials are used straightly and without mixing or proportionally in percentile combination with other polymer materials, including but not limited to, polypropylene, polystyrene, polyethylene, poly vinyl chloride, and acrylonitrile butadeine styrene. Although rigid polymer materials are preferred, other possible non-polymer materials envisioned by the inventor are wood, metal, fiber glass, stainless steel, and carbon fabric, etc.

First, these materials (prior to being chrome plated and after being chrome plated) are placed through thermal cycle test(s) and exposed to predetermined temperature to examine for dimensional changes, deformation, clearance gaps, waviness, unevenness, creases, split, crack, breakage, blister, peeling and discoloration, etc. Second, these materials (prior to being chrome plated and after being chrome plated) are placed through chemical resistance test(s) and exposed to predetermined chemical concentrations, such as artificial perspiration, detergent, insect repellent, sun tan oil, sun screening cream and liquid paraffin, etc. to examine for dissolving, cloudiness, stains, discoloration, deformation, uneven surfaces, blooming, sticky surfaces, contamination, glossiness, cracking, breakage, softening, hardening, swelling, thinning and shrinkage, etc. Third, these materials (prior to being chrome plated and after being chrome plated) are placed failing ball impact test(s) by dropping a steel ball from a predetermined height to examine for cracks, breakage, detrimental deformation on the materials visible surface, and for conforming, etc. Fourth, these materials (prior to being chrome plated and after being chrome plated) are placed through pencil scratch test(s) and exposed to predetermined variable models of pencils, so as to examine for surface hardness and scratch resistance, etc. Fifth, these materials (prior to being chrome plated and after being chrome plated) are placed through abrasion resistance test(s) or FABER and exposed to predetermined abrasion wheels, load and rotation speed, etc. so as to examine for glossiness before gloss, after gloss and overall gloss retention. Sixth, these materials (prior to being chrome plated and after being chrome plated) are placed through scratch resistance test(s) and exposed to predetermined load, scratching speed and scratch length using sand paper, glass bead and abrasion tester to examine for based surface exposure, flaw observation rank and the difference between gloss value after test and initial gloss value.

After the suitable materials are selected and tested as describe above, a three dimensional (3D) scanned imaging of foe individual embodiment component parts are generated. Next, the three dimensional scanned imaging of said individual embodiment component parts are transferred to an injection molding computer to generate the injection molding designed precisely corresponding to each individual component parts of the three embodiments of the present invention. Next, the desired material (preferably, but not limited to, rigid polymer material) is placed in the injection molding to form the individual component parts. After the individual component parts are formed from the injection molding, a line tuning/finishing process ensues where the component parts are smoothed to remove all/any sharp and/or rough edges. Finally, the individual component parts of the present invention are chromed to obtain the final product.

It is to be understood that the invention is not limited in its application to the details set forth in the description contained herein or illustrated in the drawings. The invention is capable of other embodiments and of being, practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter. The snap-on technology of this present invention with variation and unique contours can be used for other car accessories such as wheels, view mirrors, side mirrors, license plate covers, etc. These accessories are capable of being fitted with LEDs as deemed necessary and appropriate and consistent with various regulations.

Those skilled in the art will readily appreciate that various modifications and changes can be applied to the embodiment of the invention as herein before described without departing from its scope, defined in and by the appended claims.

What is claimed is:

1. An improved snap-on automotive grille overlay with complete surround comprising:
    at least one larger-outer parabolic surround bar,
    at least one smaller-inner parabolic surround bar,
    at least one peripheral parabolic surround bar,
    at least one polygon-based surround interlocking mesh system,
    at least one emblem overlay surround panel,
    at least one smaller-inner and peripheral-hexagonal surround member,
    at least one larger-outer and peripheral-hexagonal surround member,
    at least one parabolic opening, and
    wherein the complete surround forms a final border or final edging around the larger-outer parabolic surround bar, the smaller-inner parabolic surround bar, the peripheral parabolic surround bar, the polygon-based surround interlocking mesh system, the emblem overlay surround panel, the smaller-inner and peripheral-hexagonal surround member, the larger-outer and peripheral-hexagonal surround member, and the parabolic opening,
    at least one horizontal slat having a polymer interior region forming an interior region hook-shaped member comprising
    a rigid polymer upper lip protruding continuously along the entirety of a rigid polymer upper longitudinal edge which is continuously connected to a rigid polymer curved upper arm edge;
    a rigid polymer lower lip protruding continuously along the entirety of a rigid polymer lower longitudinal edge which is continuously connected to a rigid polymer curved lower arm edge;
    wherein said polymer interior region grippingly engages corresponding upper and lower exterior regions of an existing damaged manufacturer's automotive grille during installation.

2. The improved snap-on automotive grille overlay with complete surround as in claim 1, further comprising
    independent intermittent hooked-shaped members used for affixing said improved snap-on automotive grille overlay with complete surround over the existing damaged manufacturer's automotive grille, and
    a precut section used for placing a screwdriver in between the interlocking mesh system to uncouple and separate the grille overlay with complete surround from the existing damaged manufacturer's automotive grille upon which said grille overlay and complete surround was previously affixed tightly after installation.

3. The improved snap-on automotive grille overlay with complete surround as in claim 2,
    wherein said independent intermittent hook-shaped members are comprised of
    a rigid polymer longitudinal upper lip arm and
    a rigid polymer longitudinal lower lip arm which are connected by a rigid polymer curved member to form
    a continuous rigid polymer surface and a rigid polymer interior region used for snapping on the improved snap-on automotive grille overlay with complete surround over the existing damaged manufacturer's automotive grille during installation.

4. The improved snap-on automotive grille overlay with complete surround as in claim 2,
wherein said independent intermittent hook-shaped members are comprised of
a rigid polymer longitudinal upper lip arm and
a rigid polymer longitudinal lower lip arm which are connected by a rigid polymer perpendicular member to form
a continuous rigid polymer surface and a rigid polymer interior region used for snapping on the improved snap-on automotive grille overlay with complete surround over the existing damaged manufacturer's automotive grille during installation.

5. The improved snap-on automotive grille overlay with complete surround as in claim 4,
wherein said longitudinal lower lip arm is at most 90% of the length of said rigid polymer longitudinal upper lip arm.

6. An improved snap on automotive grille overlay with complete surround comprising:
at least one upper level surround panel,
at least one lower level surround panel,
at least one central upper longitudinal surround panel,
at least one central middle longitudinal surround panel,
at least one emblem overlay surround panel,
at least one central lower longitudinal surround panel,
at least one primary boundary peripheral surround panel,
at least one secondary boundary peripheral surround panel,
at least one tertiary boundary peripheral surround panel,
at least one mesh insert overlay surround panel,
at least one oval rectangular opening for convective air flow the engine and the environment,
at least one oval-rectangular surround insert capable of being fitted with a decorative finish, and
at least one interlocking mesh system,
wherein the complete surround forms a final border or final edging around the upper level surround panel, the lower level surround panel, the central upper longitudinal surround panel, the central middle longitudinal surround panel, the emblem overlay surround panel, the central lower longitudinal surround panel, the primary boundary peripheral surround panel, the secondary boundary peripheral surround panel, the tertiary boundary peripheral surround panel, the mesh insert overlay surround panel, the oval rectangular opening for convective air flow the engine and the environment, the oval-rectangular surround insert capable of being fitted with a decorative finish, and the interlocking mesh system,
at least one larger outer and peripheral-hexagonal surround bar having a polymer interior region forming an interior region hook-shaped member comprising
a rigid polymer upper lip protruding continuously along the entirety of a rigid polymer upper longitudinal edge which is continuously connected to a rigid polymer curved upper arm edge;
a rigid lower lip protruding continuously along the entirety of a rigid polymer lower longitudinal edge which Ls continuously connected to a rigid polymer curved lower arm edge;
wherein said polymer interior region grippingly engages corresponding exterior regions of an existing damaged manufacturer's automotive grille during installation.

7. The improved snap-on automotive grille overlay with complete surround as in claim 6, further comprising
independent intermittent hooked-shaped members used for affixing said improved snap-on automotive grille overlay with complete surround over the existing damaged manufacturer's automotive grille, and
a precut section used tor placing a screwdriver in between the interlocking mesh system to uncouple and separate the grille overlay with complete surround from the existing damaged manufacturer's automotive grille upon which said grille overlay and complete surround was previously affixed tightly after installation.

8. The improved snap-on automotive grille overlay with complete surround as in claim 7,
wherein said independent intermittent hook-shaped members are comprised of
a rigid polymer longitudinal upper lip arm and
a rigid polymer longitudinal lower lip arm which are connected by a rigid polymer curved member to form
a continuous rigid polymer surface and a rigid polymer interior region used for snapping on the improved snap-on automotive grille overlay with complete surround over the existing damaged manufacturer's automotive grille during installation.

9. The improved snap-on automotive grille overlay with complete surround as in claim 7,
wherein said independent intermittent hook-shaped members are comprised of
a rigid polymer longitudinal upper lip arm and
a rigid polymer longitudinal lower lip arm which are connected by a rigid polymer perpendicular member to form
a continuous rigid polymer surface and a rigid polymer interior region used for snapping on the improved snap-on automotive grille overlay with complete surround over the existing damaged manufacturers automotive grille during installation.

10. The improved snap-on automotive grille overlay with complete surround as in claim 8,
wherein said longitudinal lower lip arm is at most 90% of the length of said rigid polymer longitudinal upper lip arm.

11. An improved snap on automotive grille overlay with complete surround comprising:
at least one larger-outer parabolic surround bar,
at least one smaller-inner parabolic surround bar,
at least one peripheral parabolic surround bar,
at least one polygon-based surround interlocking mesh system,
at least one emblem surround,
a smaller-inner and peripheral-hexagonal surround member,
a larger-outer and peripheral-hexagonal surround member,
an interlocking grille system,
a parabolic opening,
an upper level surround panel,
a lower level surround panel,
a central upper longitudinal surround panel,
a central middle longitudinal surround panel,
an emblem overlay surround panel,
a central lower longitudinal surround panel,
a primary boundary peripheral surround panel,
a secondary boundary peripheral surround panel,
a tertiary boundary peripheral surround panel,
a mesh insert overlay surround panel, an oval rectangular opening for convective air flow between the engine and the environment and an oval-rectangular surround insert capable of being fitted with a decorative finish, wherein the complete surround forms a final border or final edging around the larger-outer parabolic surround bar, the smaller-inner parabolic surround bar, tire peripheral parabolic surround bar, the polygon-based surround interlocking mesh system, the emblem surround, the smaller-inner and peripheral-hexagonal surround member, the larger-outer and peripheral-hexagonal surround member, the interlocking grille system, the parabolic opening, the upper level surround panel, the lower level surround panel, the central upper longitudinal surround panel, the central middle longitudinal surround panel, the emblem overlay surround panel, the central lower longitudinal surround panel, the primary boundary peripheral surround panel, the secondary boundary peripheral surround panel, the tertiary boundary peripheral surround panel, the mesh insert overlay surround panel, the oval rectangular opening for convective air flow between the engine and the environment and the oval-rectangular surround insert capable of being fitted with a decorative finish, at least one peripheral-vertical parabolic surround bar having a polymer interior region forming an interior portion hook-shaped member comprising a rigid polymer upper lip protruding continuously along the entirety of a rigid polymer upper longitudinal edge which is continuously connected to a rigid polymer curved upper arm edge, a rigid lower lip protruding continuously along the entirety of a rigid polymer lower longitudinal edge which is continuously connected to a rigid polymer curved lower arm edge, wherein said interior region grippingly engages corresponding exterior regions of an existing damaged manufacturer's automotive grille during installation.

12. The improved snap-on automotive grille overlay with complete surround as in claim 11, further comprising independent intermittent hooked-shaped members used for affixing said improved snap-on automotive grille overlay with complete surround over the existing damaged manufacturer's automotive grille, and a precut section used for placing a screwdriver in between the interlocking mesh system to uncouple and separate the grille overlay with complete surround from the existing damaged manufacturer's automotive grille upon which said grille overlay and complete surround was previously affixed tightly after installation.

13. The improved snap-on automotive grille overlay with complete surround as in claim 12, wherein said independent intermittent hook-shaped members are comprised of a rigid polymer longitudinal upper lip arm and a rigid polymer longitudinal lower lip arm which are connected by a rigid polymer curved member to form a continuous rigid polymer surface and a rigid polymer interior region used for snapping on the improved snap-on automotive grille overlay with complete surround over the existing damaged manufacturer's automotive grille during installation.

14. The improved snap-on automotive grille overlay with complete surround as in claim 12, wherein said independent intermittent hook-shaped members are comprised of a rigid polymer longitudinal upper lip arm and a rigid polymer longitudinal lower lip arm which are connected by a rigid polymer perpendicular member to form a continuous rigid polymer surface and a rigid polymer interior region used for snapping on the improved snap-on automotive grille overlay with complete surround over the existing damaged manufacturer's automotive grille during installation.

15. The improved snap-on automotive grille overlay with complete surround as in claim 14, wherein said longitudinal lower lip arm is at most 90% of the length of said rigid Polymer longitudinal upper lip arm.

16. The improved snap on automotive grille overlay with complete surround of claim 11, manufactured by a process comprising the steps of:

a) providing a three dimensional scanned imaging of individual component parts;

b) transferring said three dimensional scanned imaging of said individual component parts to an injection molding computer to generate precise corresponding design of said component parts;

c) placing rigid polymer material in an injection molding to form said individual component parts;

d) finishing said component parts by smoothing said parts and removing all sharp and rough edges; and e) chroming said component parts.

17. The improved snap-on automotive grille overlay with complete surround as in claim 16, wherein said improved snap-on automotive grille overlay with complete surround is contoured to precisely conform to a visible surface of the existing damaged manufacturer's automotive grille such that upon engagement said improved snap-on automotive grille overlay with complete surround is neatly snapped-on and flush against the existing damaged manufacturer's automotive grille.

* * * * *

UNITED STATES PATENT AND TRADEMARK OFFICE
CERTIFICATE OF CORRECTION

PATENT NO.         : 11,046,257 B1
APPLICATION NO.    : 17/132909
DATED              : June 29, 2021
INVENTOR(S)        : Naje Fattouche It is certified that error appears in the above-identified patent and that said Letters Patent is hereby corrected as shown below:

On the Title Page

In the Abstract, Line 9, "manufacturers" should be changed to -- manufacturer's --

In the Abstract, Line 17, "parts" should be changed to -- part --

In the Drawings

Sheet 25, FIG. 9D, the reference numeral "203e" should be deleted and replaced with -- 200e --

Sheet 25, FIG. 9D, the reference numeral "200e" should be deleted and replaced with -- 203e --

In the Specification

In Column 1, Line 15, "360 degrees" should be changed to -- 360 degree --

In Column 1, Line 24, "360 degrees" should be changed to -- 360 degree --

In Column 1, Line 41, "grille" should be changed to -- grilles --

In Column 2, Line 23, "a" should be changed to -- an --

In Column 2, Line 32, "leaching" should be changed to -- teaching --

In Column 2, Line 40, "Nunes." should be changed to -- Nunes, --

In Column 2, Line 48, "foe" should be changed to -- the --

In Column 3, Line 62, "manufacturers" should be changed to -- manufacturer's --

Signed and Sealed this
Seventeenth Day of September, 2024

Katherine Kelly Vidal
*Director of the United States Patent and Trademark Office*

CERTIFICATE OF CORRECTION (continued)
U.S. Pat. No. 11,046,257 B1

In Column 4, Line 8, "degrees" should be changed to -- degree --

In Column 4, Line 11, "enhance" should be changed to -- enhanced --

In Column 4, Line 34, "manufacturers" should be changed to -- manufacturer's --

In Column 4, Line 45, "tor" should be changed to -- for --

In Column 4, Line 50, "inventions" should be changed to -- invention's --

In Column 4, Line 52, "tor" should be changed to -- for --

In Column 4, Line 60, "hooked-shaped" should be changed to -- hook-shaped --

In Column 5, Line 10, "manufacturers" should be changed to -- manufacturer's --

In Column 5, Line 12, " disclose" should be changed to -- disclosed --

In Column 5, Line 18, "hooked-shaped" should be changed to -- hook-shaped --; "hooked" should be changed to -- hook --

In Column 5, Line 30, "hooked-shaped" should be changed to -- hook-shaped --; "hooked-shaped" should be changed to -- hook-shaped --

In Column 5, Line 33, "flush" should be changed to -- flushed --; "manufacturers" should be changed to -- manufacturer's --

In Column 5, Line 50, "manufacturers" should be changed to -- manufacturer's --

In Column 5, Line 52, "hooked-shaped" should be changed to -- hook-shaped --; "hooked-shaped" should be changed to -- hook-shaped --

In Column 5, Line 54, "manufacturers" should be changed to -- manufacturer's --

In Column 5, Line 66, "hooked-shaped" should be changed to -- hook-shaped --; "hooked-shaped" to -- hook-shaped --

In Column 6, Line 39, "mar" should be changed to -- rear --

In Column 6, Line 44, "tear" should be changed to -- rear --

In Column 7, Line 56, "oi" should be changed to -- of --

In Column 8, Line 45, "show ing" should be changed to -- showing --

CERTIFICATE OF CORRECTION (continued)
U.S. Pat. No. 11,046,257 B1

In Column 9, Line 40, "damage" should be changed to -- damaged --

In Column 9, Line 47, "How" should be changed to -- flow --

In Column 9, Line 59, "art" should be changed to -- are --

In Column 9, Line 61, "illustrate" should be changed to -- illustrates --

In Column 9, Line 66, "illustrate" should be changed to -- illustrates --

In Column 10, Line 4, "illustrate" should be changed to -- illustrates --

In Column 10, Line 7, "manufacturers" should be changed to -- manufacturer's --

In Column 10, Line 9, "illustrate" should be changed to -- illustrates --

In Column 10, Line 58, "manufacturers" should be changed to -- manufacturer's --

In Column 11, Line 8, "manufacturers" should be changed to -- manufacturer's --

In Column 11, Line 10, "enhance" should be changed to -- enhanced --

In Column 11, Line 31, "manufacturers" should be changed to -- manufacturer's --

In Column 11, Line 33, "enhance" should be changed to -- enhanced --

In Column 11, Lines 34 and 35, "manufacturers" should be changed to -- manufacturer's --

In Column 11, Line 65, "hooked-shaped" should be changed to -- hook-shaped --

In Column 12, Line 2, "hooked-shaped" should be changed to -- hook-shaped --

In Column 12, Line 10, "present, invention" should be changed to -- present invention --

In Column 13, Line 20, "hooked-shaped" should be changed to -- hook-shaped --

In Column 13, Line 41, "4K" should be changed to -- 4E --

In Column 13, Line 58, "regions" should be changed to -- region --

In Column 14, Line 14, "Ail" should be changed to -- All --

In Column 15, Line 8, "hooked-shaped" should be changed to -- hook-shaped --

In Column 15, Line 36, "hooked-shaped" should be changed to -- hook-shaped --

CERTIFICATE OF CORRECTION (continued)
U.S. Pat. No. 11,046,257 B1

In Column 15, Line 45, "MG" should be changed to -- FIG. --

In Column 15, Line 62, "regions" should be changed to -- region --

In Column 15, Line 63, "hooked-shaped" should be changed to -- hook-shaped --

In Column 16, Line 23, "alter" should be changed to -- after --

In Column 16, Line 48, "alter" should be changed to -- after --

In Column 18, Line 21, "air" should be changed to -- an --

In Column 18, Line 62, "span-on" should be changed to -- snap-on --

In Column 19, Line 57, "tipper" should be changed to -- upper --

In Column 19, Line 58, "105b" should be changed to -- 103b --

In Column 20, Line 1, "manufacturer s" should be changed to -- manufacturer's --

In Column 20, Line 5, "manufacturers" should be changed to -- manufacturer's --

In Column 20, Line 11, "manufacturers" should be changed to -- manufacturers --

In Column 20, Line 16, "manufacturers" should be changed to -- manufacturer's --

In Column 20, Line 18, "35" should be changed to -- 35a --

In Column 20, Line 44, "manufacturers" should be changed to -- manufacturer's --

In Column 20, Line 49, "hook shaped" should be changed to -- hook-shaped --

In Column 20, Line 64, "FIG. OB" should be changed to -- FIG. 9B --

In Column 21, Line 4, "manufacturers" should be changed to -- manufacturer's --

In Column 21, Line 10, "hook shaped" should be changed to -- hook-shaped --

In Column 21, Line 20, "manufacturers" should be changed to -- manufacturer's --

In Column 22, Line 13, "a" should be changed to -- an --

In Column 22, Line 18, "assist" should be changed to -- assists --

In Column 22, Line 47, "Is" should be changed to -- is --

CERTIFICATE OF CORRECTION (continued)
U.S. Pat. No. 11,046,257 B1

In Column 22, Line 53, "surround complete" should be changed to -- complete surround --

In Column 22, Line 67, "ternary" should be changed to -- tertiary --

In Column 23, Line 44, "manufacturers" should be changed to -- manufacturer's --

In Column 23, Line 67, "fated" should be changed to -- fitted --

In Column 25, Line 15, "placed failing ball impact test(s)" should be changed to -- placed through falling ball impact test(s) --

In Column 25, Line 37, "of for individual" should be changed to -- of individual --

In Column 27, Line 36, "flow the engine and the environment" should be changed to -- flow between the engine and the environment --

In Column 27, Line 50, "flow the engine and the environment" should be changed to -- flow between the engine and the environment --

In Column 27, Line 63, "Ls" should be changed to -- is --

In Column 28, Line 7, "tor" should be changed to -- for --

In Column 29, Line 7, "tire" should be changed to -- the --

In Column 29, Line 42, "hooked-shaped" should be changed to -- hook-shaped --

In Column 30, Line 51, "flush" should be changed to -- flushed --